(12) United States Patent
Danner et al.

(10) Patent No.: US 8,115,729 B2
(45) Date of Patent: *Feb. 14, 2012

(54) ELECTROPHORETIC DISPLAY ELEMENT WITH FILLER PARTICLES

(75) Inventors: Guy M. Danner, Somerville, MA (US); Karl R. Amundson, Cambridge, MA (US); Craig Herb, Medford, MA (US); Libing Zhang, Sharon, MA (US)

(73) Assignee: E Ink Corporation, Cambridge, MA (US)

( * ) Notice: Subject to any disclaimer, the term of this patent is extended or adjusted under 35 U.S.C. 154(b) by 800 days.

This patent is subject to a terminal disclaimer.

(21) Appl. No.: 11/308,326

(22) Filed: Mar. 16, 2006

(65) Prior Publication Data

US 2006/0202949 A1  Sep. 14, 2006

Related U.S. Application Data

(63) Continuation-in-part of application No. 10/298,468, filed on Nov. 18, 2002, now Pat. No. 7,038,655, which is a continuation-in-part of application No. 09/564,125, filed on May 3, 2000, now Pat. No. 6,693,620.

(60) Provisional application No. 60/132,303, filed on May 3, 1999.

(51) Int. Cl.
*G09G 3/34* (2006.01)

(52) U.S. Cl. ........................................ 345/107; 359/296

(58) Field of Classification Search .................. 345/107; 359/296
See application file for complete search history.

(56) References Cited

U.S. PATENT DOCUMENTS

| | | |
|---|---|---|
| 2,800,457 A | 7/1957 | Green et al. |
| 3,036,388 A | 5/1962 | Tate |
| 3,384,488 A | 5/1968 | Tulagin et al. |
| 3,406,363 A | 10/1968 | Tate |
| 3,585,381 A | 6/1971 | Hodson et al. |
| 3,612,758 A | 10/1971 | Evans et al. |
| 3,668,106 A | 6/1972 | Ota |
| 3,670,323 A | 6/1972 | Sobel et al. |
| 3,756,693 A | 9/1973 | Ota |
| 3,767,392 A | 10/1973 | Ota |
| 3,772,013 A | 11/1973 | Wells |
| 3,792,308 A | 2/1974 | Ota |
| 3,806,893 A | 4/1974 | Ohnishi et al. |
| 3,850,627 A | 11/1974 | Wells et al. |
| 3,870,517 A | 3/1975 | Ota et al. |
| 3,886,084 A | 5/1975 | Vassiliades |
| 3,892,568 A * | 7/1975 | Ota ................................ 430/19 |
| 3,909,116 A | 9/1975 | Kohashi |
| 3,922,255 A | 11/1975 | Koestler et al. |
| 4,001,140 A | 1/1977 | Foris et al. |
| 4,041,481 A | 8/1977 | Sato |
| 4,045,327 A | 8/1977 | Noma et al. |
| 4,062,009 A | 12/1977 | Raverdy et al. |

(Continued)

*Primary Examiner* — Amare Mengistu
*Assistant Examiner* — Vinh Lam
(74) *Attorney, Agent, or Firm* — David J. Cole

(57) ABSTRACT

The invention relates to methods and materials for controlling stability and color intensity in an electrophoretic display element. Filler particles in the electrophoretic display element, serves as a medium that the electrophoretic particles must travel through during switching between optical states of the display. The filler particles provide improved control over the color intensity of the electrophoretic display element. In addition, the filler particles create resistance to the migration of the electrophoretic particles, thereby improving the bistability of the electrophoretic displays and inhibiting settling of the electrophoretic particles. Also, migration resistance provided by the filler particles can enable threshold addressing of an electrophoretic display.

24 Claims, 40 Drawing Sheets

U.S. PATENT DOCUMENTS

| | | | |
|---|---|---|---|
| 4,068,927 A | 1/1978 | White | |
| 4,071,430 A | 1/1978 | Liebert | |
| 4,088,395 A | 5/1978 | Gigila | |
| 4,093,534 A * | 6/1978 | Carter et al. | 359/296 |
| 4,104,520 A | 8/1978 | Lewis et al. | |
| 4,123,346 A | 10/1978 | Ploix | |
| 4,126,528 A | 11/1978 | Chiang | |
| 4,126,854 A | 11/1978 | Sheridon | |
| 4,143,103 A | 3/1979 | Sheridon | |
| 4,143,472 A | 3/1979 | Murata et al. | |
| 4,147,932 A | 4/1979 | Lewis | |
| 4,149,149 A | 4/1979 | Miki et al. | |
| 4,166,800 A | 9/1979 | Fong | |
| 4,196,437 A | 4/1980 | Hertz | |
| 4,201,691 A | 5/1980 | Asher et al. | |
| 4,203,106 A | 5/1980 | Dalisa et al. | |
| 4,211,668 A | 7/1980 | Tate | |
| 4,218,302 A | 8/1980 | Dalisa et al. | |
| 4,231,641 A | 11/1980 | Randin | |
| 4,261,653 A | 4/1981 | Goodrich | |
| 4,272,596 A | 6/1981 | Harbour et al. | |
| 4,283,438 A | 8/1981 | Lee | |
| 4,285,801 A | 8/1981 | Chiang | |
| 4,287,337 A | 9/1981 | Guglielmetti et al. | |
| 4,298,448 A | 11/1981 | Muller et al. | |
| 4,305,807 A | 12/1981 | Somlyody | |
| 4,311,361 A | 1/1982 | Somlyody | |
| 4,314,013 A | 2/1982 | Chang | |
| 4,324,456 A | 4/1982 | Dalisa | |
| 4,368,952 A | 1/1983 | Murata et al. | |
| 4,390,403 A | 6/1983 | Batchelder | |
| 4,418,346 A | 11/1983 | Batchelder | |
| 4,419,663 A | 12/1983 | Kohashi | |
| 4,435,047 A | 3/1984 | Fergason | |
| 4,438,160 A | 3/1984 | Ishikawa et al. | |
| 4,439,507 A | 3/1984 | Pan et al. | |
| 4,444,961 A | 4/1984 | Timm | |
| 4,450,440 A | 5/1984 | White | |
| 4,502,934 A | 3/1985 | Gazard et al. | |
| 4,522,472 A | 6/1985 | Liebert et al. | |
| 4,543,306 A | 9/1985 | Dubois et al. | |
| 4,605,284 A | 8/1986 | Fergason | |
| 4,620,916 A | 11/1986 | Zwemer et al. | |
| 4,623,706 A | 11/1986 | Timm et al. | |
| 4,643,528 A | 2/1987 | Bell, Jr. | |
| 4,648,956 A | 3/1987 | Marshall et al. | |
| 4,655,897 A | 4/1987 | DiSanto et al. | |
| 4,666,673 A | 5/1987 | Timm | |
| 4,707,080 A | 11/1987 | Fergason | |
| 4,742,345 A | 5/1988 | DiSanto et al. | |
| 4,746,917 A | 5/1988 | DiSanto et al. | |
| 4,748,366 A | 5/1988 | Taylor | |
| 4,776,675 A | 10/1988 | Takaochi et al. | |
| 4,833,464 A | 5/1989 | DiSanto et al. | |
| 4,889,603 A | 12/1989 | DiSanto et al. | |
| 4,891,245 A | 1/1990 | Micale | |
| 4,909,959 A | 3/1990 | Lemaire et al. | |
| 4,919,521 A | 4/1990 | Tada et al. | |
| 4,931,019 A | 6/1990 | Park | |
| 4,947,219 A | 8/1990 | Boehm | |
| 5,009,490 A | 4/1991 | Kouno et al. | |
| 5,017,225 A | 5/1991 | Nakanishi et al. | |
| 5,041,824 A | 8/1991 | DiSanto et al. | |
| 5,057,363 A | 10/1991 | Nakanishi | |
| 5,059,694 A | 10/1991 | Delabouglise et al. | |
| 5,059,909 A * | 10/1991 | O'Brien | 324/457 |
| 5,066,105 A | 11/1991 | Yoshimoto et al. | |
| 5,066,559 A | 11/1991 | Elmasry et al. | |
| 5,066,946 A | 11/1991 | DiSanto et al. | |
| 5,070,326 A | 12/1991 | Yoshimoto et al. | |
| 5,077,157 A | 12/1991 | DiSanto et al. | |
| 5,085,918 A | 2/1992 | Rajan et al. | |
| 5,099,256 A | 3/1992 | Anderson | |
| 5,105,185 A | 4/1992 | Nakanowatari et al. | |
| 5,106,468 A | 4/1992 | Chimenti et al. | |
| 5,119,218 A | 6/1992 | Yoshimoto et al. | |
| 5,128,226 A | 7/1992 | Hung | |
| 5,128,785 A | 7/1992 | Yoshimoto et al. | |
| 5,132,049 A | 7/1992 | Garreau et al. | |
| 5,138,472 A | 8/1992 | Jones et al. | |
| 5,149,826 A | 9/1992 | Delabouglise et al. | |
| 5,151,032 A | 9/1992 | Igawa | |
| 5,161,233 A | 11/1992 | Matsuo et al. | |
| 5,174,882 A | 12/1992 | DiSanto et al. | |
| 5,185,226 A | 2/1993 | Grosso et al. | |
| 5,187,609 A | 2/1993 | DiSanto et al. | |
| 5,204,424 A | 4/1993 | Roncali et al. | |
| 5,213,983 A | 5/1993 | Gustafsson et al. | |
| 5,216,416 A | 6/1993 | DiSanto et al. | |
| 5,216,530 A | 6/1993 | Pearlman et al. | |
| 5,223,115 A | 6/1993 | DiSanto et al. | |
| 5,223,823 A | 6/1993 | DiSanto et al. | |
| 5,233,459 A | 8/1993 | Bozler et al. | |
| 5,247,290 A | 9/1993 | DiSanto et al. | |
| 5,250,938 A | 10/1993 | DiSanto et al. | |
| 5,254,981 A | 10/1993 | DiSanto et al. | |
| 5,262,098 A | 11/1993 | Crowley et al. | |
| 5,266,098 A | 11/1993 | Chun et al. | |
| 5,266,937 A | 11/1993 | DiSanto et al. | |
| 5,268,448 A | 12/1993 | Buechner et al. | |
| 5,270,843 A | 12/1993 | Wang | |
| 5,272,238 A | 12/1993 | Garnier et al. | |
| 5,276,113 A | 1/1994 | Hashiguchi et al. | |
| 5,276,438 A | 1/1994 | DiSanto et al. | |
| 5,279,511 A | 1/1994 | DiSanto et al. | |
| 5,279,694 A | 1/1994 | DiSanto et al. | |
| 5,293,528 A | 3/1994 | DiSanto et al. | |
| 5,296,974 A | 3/1994 | Tada et al. | |
| 5,298,833 A | 3/1994 | Hou | |
| 5,302,235 A | 4/1994 | DiSanto et al. | |
| 5,303,073 A | 4/1994 | Shirota et al. | |
| 5,315,312 A | 5/1994 | DiSanto et al. | |
| 5,326,484 A | 7/1994 | Nakashima et al. | |
| 5,344,594 A | 9/1994 | Sheridon | |
| 5,360,582 A | 11/1994 | Boyd et al. | |
| 5,360,689 A | 11/1994 | Hou et al. | |
| 5,380,362 A | 1/1995 | Schubert | |
| 5,383,008 A | 1/1995 | Sheridon | |
| 5,389,945 A | 2/1995 | Sheridon | |
| 5,402,145 A | 3/1995 | DiSanto et al. | |
| 5,403,518 A | 4/1995 | Schubert | |
| 5,411,398 A | 5/1995 | Nakanishi et al. | |
| 5,411,656 A | 5/1995 | Schubert | |
| 5,412,398 A | 5/1995 | DiSanto et al. | |
| 5,421,926 A | 6/1995 | Yukinobu et al. | |
| 5,463,492 A | 10/1995 | Check, III | |
| 5,467,107 A | 11/1995 | DiSanto et al. | |
| 5,486,442 A | 1/1996 | Takimoto et al. | |
| 5,508,068 A | 4/1996 | Nakano | |
| 5,512,162 A | 4/1996 | Sachs et al. | |
| 5,528,399 A | 6/1996 | Izumi et al. | |
| 5,543,177 A | 8/1996 | Morrison et al. | |
| 5,543,219 A | 8/1996 | Elwakil | |
| 5,552,679 A | 9/1996 | Murasko | |
| 5,556,583 A | 9/1996 | Tashiro et al. | |
| 5,565,885 A | 10/1996 | Tamanoi | |
| 5,573,711 A | 11/1996 | Hou et al. | |
| 5,582,700 A | 12/1996 | Bryning et al. | |
| 5,583,675 A | 12/1996 | Yamada et al. | |
| 5,604,027 A | 2/1997 | Sheridon | |
| 5,604,070 A | 2/1997 | Rao et al. | |
| 5,610,455 A | 3/1997 | Allen et al. | |
| 5,614,340 A | 3/1997 | Bugner et al. | |
| 5,627,561 A | 5/1997 | Laspina et al. | |
| 5,635,317 A | 6/1997 | Taniguchi et al. | |
| 5,639,914 A | 6/1997 | Tomiyama et al. | |
| 5,643,506 A | 7/1997 | Rourke | |
| 5,650,199 A | 7/1997 | Chang et al. | |
| 5,650,872 A | 7/1997 | Saxe et al. | |
| 5,663,224 A | 9/1997 | Emmons et al. | |
| 5,673,148 A | 9/1997 | Morris et al. | |
| 5,688,584 A | 11/1997 | Casson et al. | |
| 5,689,282 A | 11/1997 | Wolfs et al. | |
| 5,691,098 A | 11/1997 | Busman et al. | |
| 5,693,442 A | 12/1997 | Weiss et al. | |
| 5,694,224 A | 12/1997 | Tai | |
| 5,708,525 A | 1/1998 | Sheridon | |

| | | | |
|---|---|---|---|
| 5,709,976 A | 1/1998 | Malhotra | |
| 5,714,270 A | 2/1998 | Malhotra et al. | |
| 5,715,511 A | 2/1998 | Aslam et al. | |
| 5,716,550 A | 2/1998 | Gardner et al. | |
| 5,717,283 A | 2/1998 | Biegelsen et al. | |
| 5,717,514 A | 2/1998 | Sheridon | |
| 5,717,515 A | 2/1998 | Sheridon | |
| 5,725,935 A | 3/1998 | Rajan | |
| 5,729,632 A | 3/1998 | Tai | |
| 5,737,115 A | 4/1998 | Mackinlay et al. | |
| 5,739,801 A | 4/1998 | Sheridon | |
| 5,744,283 A | 4/1998 | Spierings et al. | |
| 5,745,094 A | 4/1998 | Gordon, II et al. | |
| 5,751,268 A | 5/1998 | Sheridon | |
| 5,754,332 A | 5/1998 | Crowley | |
| 5,759,671 A | 6/1998 | Tanaka et al. | |
| 5,760,761 A | 6/1998 | Sheridon | |
| 5,767,826 A | 6/1998 | Sheridon et al. | |
| 5,777,782 A | 7/1998 | Sheridon | |
| 5,783,614 A | 7/1998 | Chen et al. | |
| 5,808,783 A | 9/1998 | Crowley | |
| 5,825,529 A | 10/1998 | Crowley | |
| 5,828,432 A | 10/1998 | Shashidhar et al. | |
| 5,843,259 A | 12/1998 | Narang et al. | |
| 5,852,427 A | 12/1998 | Buzak | |
| 5,872,552 A | 2/1999 | Gordon, II et al. | |
| 5,900,858 A | 5/1999 | Richley | |
| 5,914,806 A | 6/1999 | Gordon II et al. | |
| 5,930,026 A | 7/1999 | Jacobson et al. | |
| 5,961,804 A | 10/1999 | Jacobson et al. | |
| 5,972,493 A | 10/1999 | Iwasaki et al. | |
| 6,014,247 A | 1/2000 | Winter et al. | |
| 6,017,584 A | 1/2000 | Albert et al. | |
| 6,054,071 A | 4/2000 | Mikkelsen, Jr. | |
| 6,055,091 A | 4/2000 | Sheridon et al. | |
| 6,055,180 A | 4/2000 | Gudesen et al. | |
| 6,064,615 A | 5/2000 | Gudesen | |
| 6,064,784 A | 5/2000 | Whitehead et al. | |
| 6,067,185 A | 5/2000 | Albert et al. | |
| 6,091,382 A | 7/2000 | Shioya et al. | |
| 6,097,531 A | 8/2000 | Sheridon | |
| 6,113,810 A | 9/2000 | Hou et al. | |
| 6,117,294 A | 9/2000 | Rasmussen | |
| 6,117,368 A | 9/2000 | Hou | |
| 6,118,426 A | 9/2000 | Albert et al. | |
| 6,120,588 A | 9/2000 | Jacobson | |
| 6,120,839 A | 9/2000 | Comiskey et al. | |
| 6,124,592 A * | 9/2000 | Spangler | 250/287 |
| 6,124,851 A | 9/2000 | Jacobson | |
| 6,128,124 A | 10/2000 | Silverman | |
| 6,130,773 A | 10/2000 | Jacobson et al. | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon | |
| 6,172,798 B1 | 1/2001 | Albert et al. | |
| 6,177,921 B1 | 1/2001 | Comiskey et al. | |
| 6,184,856 B1 | 2/2001 | Gordon, II et al. | |
| 6,225,971 B1 | 5/2001 | Gordon, II et al. | |
| 6,232,950 B1 | 5/2001 | Albert et al. | |
| 6,239,896 B1 | 5/2001 | Ikeda | |
| 6,241,921 B1 | 6/2001 | Jacobson et al. | |
| 6,249,271 B1 | 6/2001 | Albert et al. | |
| 6,252,564 B1 | 6/2001 | Albert et al. | |
| 6,262,706 B1 | 7/2001 | Albert et al. | |
| 6,262,833 B1 | 7/2001 | Loxley et al. | |
| 6,271,823 B1 | 8/2001 | Gordon, II et al. | |
| 6,300,932 B1 | 10/2001 | Albert | |
| 6,301,038 B1 | 10/2001 | Fitzmaurice et al. | |
| 6,312,304 B1 | 11/2001 | Duthaler et al. | |
| 6,312,971 B1 | 11/2001 | Amundson et al. | |
| 6,323,989 B1 | 11/2001 | Jacobson et al. | |
| 6,327,024 B1 | 12/2001 | Hayashi et al. | |
| 6,327,072 B1 | 12/2001 | Comiskey et al. | |
| 6,359,605 B1 | 3/2002 | Knapp et al. | |
| 6,373,454 B1 | 4/2002 | Knapp et al. | |
| 6,373,461 B1 | 4/2002 | Hasegawa et al. | |
| 6,376,828 B1 | 4/2002 | Comiskey | |
| 6,377,387 B1 | 4/2002 | Duthaler et al. | |
| 6,392,785 B1 | 5/2002 | Albert et al. | |
| 6,392,786 B1 | 5/2002 | Albert | |
| 6,400,492 B1 | 6/2002 | Morita et al. | |
| 6,413,790 B1 | 7/2002 | Duthaler et al. | |
| 6,422,687 B1 | 7/2002 | Jacobson | |
| 6,445,374 B2 | 9/2002 | Albert et al. | |
| 6,445,489 B1 | 9/2002 | Jacobson et al. | |
| 6,459,418 B1 | 10/2002 | Comiskey et al. | |
| 6,473,072 B1 | 10/2002 | Comiskey et al. | |
| 6,480,182 B2 | 11/2002 | Turner et al. | |
| 6,498,114 B1 | 12/2002 | Amundson et al. | |
| 6,504,524 B1 | 1/2003 | Gates et al. | |
| 6,506,438 B2 | 1/2003 | Duthaler et al. | |
| 6,512,354 B2 | 1/2003 | Jacobson et al. | |
| 6,515,649 B1 | 2/2003 | Albert et al. | |
| 6,518,949 B2 | 2/2003 | Drzaic | |
| 6,521,489 B2 | 2/2003 | Duthaler et al. | |
| 6,531,997 B1 | 3/2003 | Gates et al. | |
| 6,535,197 B1 | 3/2003 | Comiskey et al. | |
| 6,538,801 B2 | 3/2003 | Jacobson et al. | |
| 6,545,291 B1 | 4/2003 | Amundson et al. | |
| 6,577,433 B1 | 6/2003 | Lin et al. | |
| 6,580,545 B2 | 6/2003 | Morrison et al. | |
| 6,639,578 B1 | 10/2003 | Comiskey et al. | |
| 6,652,075 B2 | 11/2003 | Jacobson | |
| 6,657,772 B2 | 12/2003 | Loxley | |
| 6,664,944 B1 | 12/2003 | Albert et al. | |
| 6,670,659 B1 | 12/2003 | Gudeson et al. | |
| D485,294 S | 1/2004 | Albert | |
| 6,672,921 B1 | 1/2004 | Liang et al. | |
| 6,680,725 B1 | 1/2004 | Jacobson | |
| 6,683,333 B2 | 1/2004 | Kazlas et al. | |
| 6,693,620 B1 | 2/2004 | Herb et al. | |
| 6,704,133 B2 | 3/2004 | Gates et al. | |
| 6,710,540 B1 | 3/2004 | Albert et al. | |
| 6,721,083 B2 | 4/2004 | Jacobson et al. | |
| 6,724,519 B1 | 4/2004 | Comiskey et al. | |
| 6,727,881 B1 | 4/2004 | Albert et al. | |
| 6,738,050 B2 | 5/2004 | Comiskey et al. | |
| 6,750,473 B2 | 6/2004 | Amundson et al. | |
| 6,753,999 B2 | 6/2004 | Zehner et al. | |
| 6,765,617 B1 | 7/2004 | Tangen et al. | |
| 6,788,449 B2 | 9/2004 | Liang et al. | |
| 6,816,146 B2 | 11/2004 | Harada et al. | |
| 6,816,147 B2 | 11/2004 | Albert | |
| 6,819,471 B2 | 11/2004 | Amundson et al. | |
| 6,822,782 B2 | 11/2004 | Honeyman et al. | |
| 6,825,068 B2 | 11/2004 | Denis et al. | |
| 6,825,829 B1 | 11/2004 | Albert et al. | |
| 6,825,970 B2 | 11/2004 | Goenaga et al. | |
| 6,831,769 B2 | 12/2004 | Holman et al. | |
| 6,839,158 B2 | 1/2005 | Albert et al. | |
| 6,842,167 B2 | 1/2005 | Albert et al. | |
| 6,842,279 B2 | 1/2005 | Amundson | |
| 6,842,657 B1 | 1/2005 | Drzaic et al. | |
| 6,864,875 B2 | 3/2005 | Drzaic et al. | |
| 6,865,010 B2 | 3/2005 | Duthaler et al. | |
| 6,866,760 B2 | 3/2005 | Paolini Jr. et al. | |
| 6,870,657 B1 | 3/2005 | Fitzmaurice et al. | |
| 6,870,661 B2 | 3/2005 | Pullen et al. | |
| 6,900,851 B2 | 5/2005 | Morrison et al. | |
| 6,922,276 B2 | 7/2005 | Zhang et al. | |
| 6,950,220 B2 | 9/2005 | Abramson et al. | |
| 6,958,848 B2 | 10/2005 | Cao et al. | |
| 6,967,640 B2 | 11/2005 | Albert et al. | |
| 6,980,196 B1 | 12/2005 | Turner et al. | |
| 6,982,178 B2 | 1/2006 | LeCain et al. | |
| 6,987,603 B2 | 1/2006 | Paolini, Jr. et al. | |
| 6,995,550 B2 | 2/2006 | Jacobson et al. | |
| 7,002,728 B2 | 2/2006 | Pullen et al. | |
| 7,012,600 B2 | 3/2006 | Zehner et al. | |
| 7,012,735 B2 | 3/2006 | Honeyman et al. | |
| 7,023,420 B2 | 4/2006 | Comiskey et al. | |
| 7,030,412 B1 | 4/2006 | Drzaic et al. | |
| 7,030,854 B2 | 4/2006 | Baucom et al. | |
| 7,034,783 B2 | 4/2006 | Gates et al. | |
| 7,038,655 B2 * | 5/2006 | Herb et al. | 345/107 |
| 7,050,040 B2 | 5/2006 | Daniel et al. | |
| 7,061,663 B2 | 6/2006 | Cao et al. | |

| | | |
|---|---|---|
| 7,071,913 B2 | 7/2006 | Albert et al. |
| 7,072,108 B2 | 7/2006 | Cruz-Uribe et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,371,625 B2 | 5/2008 | Yamazaki et al. |
| 7,382,363 B2 | 6/2008 | Albert et al. |
| 7,388,572 B2 | 6/2008 | Duthaler et al. |
| 7,411,719 B2 | 8/2008 | Paolini, Jr. et al. |
| 7,420,549 B2 | 9/2008 | Jacobson et al. |
| 7,492,339 B2 | 2/2009 | Amundson |
| 7,495,821 B2 | 2/2009 | Yamakita et al. |
| 7,513,813 B2 | 4/2009 | Paolini, Jr. et al. |
| 7,528,822 B2 | 5/2009 | Amundson et al. |
| 7,545,358 B2 | 6/2009 | Gates et al. |
| 7,561,324 B2 | 7/2009 | Duthaler et al. |
| 7,602,374 B2 | 10/2009 | Zehner et al. |
| 2001/0005567 A1 | 6/2001 | Harada et al. |
| 2002/0036616 A1 | 3/2002 | Inoue |
| 2002/0060321 A1 | 5/2002 | Kazlas et al. |
| 2002/0090980 A1 | 7/2002 | Wilcox et al. |
| 2002/0167480 A1 | 11/2002 | Johnson et al. |
| 2003/0038772 A1 | 2/2003 | De Boer et al. |
| 2003/0102858 A1 | 6/2003 | Jacobson et al. |
| 2004/0032390 A1 | 2/2004 | Liang et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0180476 A1 | 9/2004 | Kazlas et al. |
| 2004/0190114 A1 | 9/2004 | Jacobson et al. |
| 2004/0263947 A1 | 12/2004 | Drzaic et al. |
| 2005/0007336 A1 | 1/2005 | Albert et al. |
| 2005/0012980 A1 | 1/2005 | Wilcox et al. |
| 2005/0079386 A1 | 4/2005 | Brown, Jr. et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0253777 A1 | 11/2005 | Zehner et al. |
| 2005/0259068 A1 | 11/2005 | Nihei et al. |
| 2005/0280626 A1 | 12/2005 | Amundson et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0181504 A1 | 8/2006 | Kawai |
| 2006/0197737 A1 | 9/2006 | Baucom et al. |
| 2006/0197738 A1 | 9/2006 | Kawai |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0238488 A1 | 10/2006 | Nihei et al. |
| 2006/0263927 A1 | 11/2006 | Sakurai et al. |
| 2007/0013683 A1 | 1/2007 | Zhou et al. |
| 2007/0103427 A1 | 5/2007 | Zhou et al. |

* cited by examiner

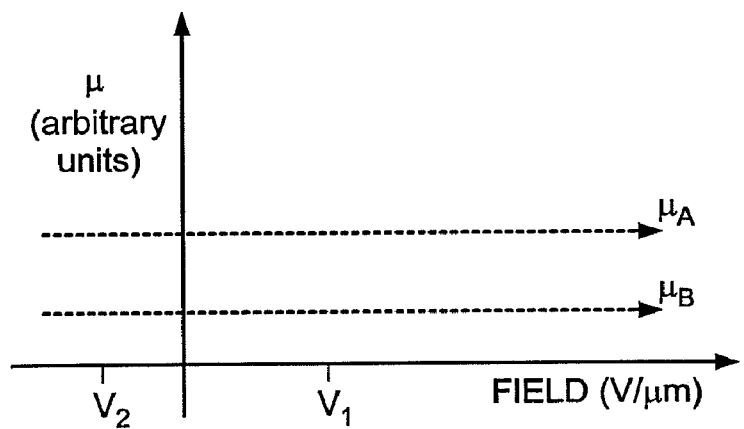
FIG. 14A
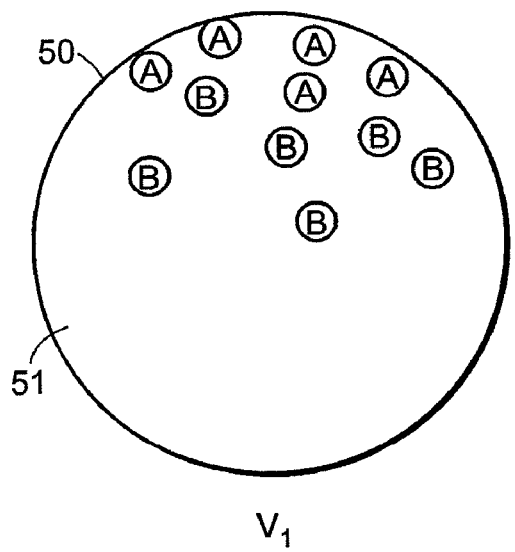 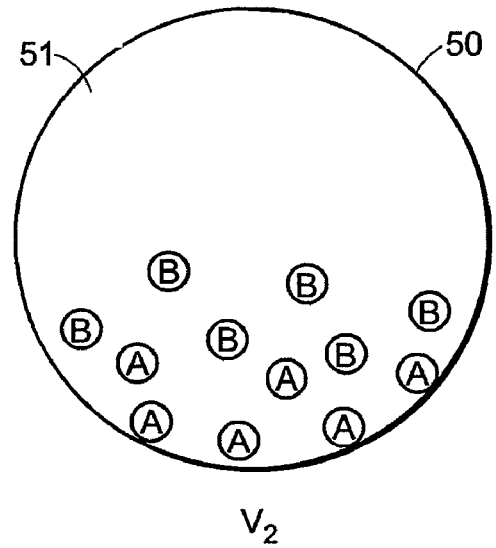
FIG. 14B  FIG. 14C

ELECTROPHORETIC DISPLAY ELEMENT WITH FILLER PARTICLES

REFERENCE TO RELATED APPLICATIONS

The present application is a continuation-in-part of application Ser. No. 10/298,468, filed Nov. 18, 2002 (Publication No. 2003/0132908, now U.S. Pat. No. 7,038,655), which in turn is a continuation-in-part of application Ser. No. 09/564,125, filed May 3, 2000 (now U.S. Pat. No. 6,693,620), which claims benefit of U.S. Provisional Application Ser. No. 60/132,303, filed May 3, 1999. The entire disclosures of the aforementioned applications, and of all other U.S. patents, and published and copending applications referred to below are also herein incorporated by reference.

BACKGROUND OF INVENTION

This invention relates to electrophoretic display elements and electrophoretic displays containing such elements. More specifically, this invention relates to electrophoretic display elements in which the electrophoretic mobility of the electrophoretic particles and/or the switching behavior of the particles varies with the applied field, and to electrophoretic display elements which include essentially non-electrophoretic particles.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Particle-based electrophoretic displays have been the subject of intense research and development for a number of years. In this type of display, a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a suspending fluid. In most prior art electrophoretic media, this suspending fluid is a liquid, but electrophoretic media can be produced using gaseous suspending fluids; see, for example, Kitamura, T., et al., "Electrical toner movement for electronic paper-like display", Asia Display/IDW '01 (Proceedings of the 21st International Display Research Conference in conjunction with The 8th International Display Workshops, Oct. 16-19, 2001, Nagoya, Japan), page 1517, Paper HCS1-1, and Yamaguchi, Y., et al., "Toner display using insulative particles charged triboelectrically", Asia Display/IDW '01, page 1729, Paper AMD4-4. See also U.S. Patent Publications 2005/0001810 and 2005/0052402, and European Patent Applications 1,462,847; 1,482,354; 1,484,635; 1,501,194; 1,536,271; and 1,577,703. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; and 6,982,178; and U.S. Patent Applications Publication Nos. 2002/0060321; 2002/0063661; 2002/0090980; 2002/0113770; 2002/0130832; 2002/0180687; 2003/0011560; 2003/0025855; 2003/0102858; 2003/0132908; 2003/0137521; 2003/0222315; 2004/0014265; 2004/0075634; 2004/0094422; 2004/0105036; 2004/0112750; 2004/0119681; 2004/0136048; 2004/0155857; 2004/0180476; 2004/0190114; 2004/0196215; 2004/0226820; 2004/0239614; 2004/0252360; 2004/0257635; 2004/0263947; 2005/0000813; 2005/0001812; 2005/0007336; 2005/0007653; 2005/0012980; 2005/0017944; 2005/0018273; 2005/0024353; 2005/0035941; 2005/0041004; 2005/0062714; 2005/0067656; 2005/0078099; 2005/0099672; 2005/0105159; 2005/0105162; 2005/0122284; 2005/0122306; 2005/0122563; 2005/0122564; 2005/0122565; 2005/0134554; 2005/0146774; 2005/0151709; 2005/0152018; 2005/0152022; 2005/0156340; 2005/0168799; 2005/0168801; 2005/0179642; 2005/0190137; 2005/0212747; 2005/0213191; 2005/0219184; and 2005/0253777; and International Applications Publication Nos. WO 99/67678; WO 00/05704; WO 00/38000; WO 00/36560; WO 00/67110; WO 00/67327; WO 01/07961; and WO 03/107,315.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184, 856. Dielectrophoretic displays, which are similar to electrophoretic displays but rely upon variations in electric field strength, can operate in a similar mode; see U.S. Pat. No. 4,418,346.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

In most conventional electrophoretic media, the smallest unit (typically referred to as a pixel or sub-pixel) has only two extreme optical states with (optionally) one or more "gray" states having an optical appearance intermediate the two extreme optical states. For example, a pixel or sub-pixel might have black and white extreme optical states, and one or more intermediate gray states. Alternatively, a pixel or sub-pixel might have white and dark blue extreme optical states, but in this case the so-called "gray" intermediate states would actually be varying shades of light and dark blue.

As described in the aforementioned U.S. Pat. No. 6,864, 875, one traditional technique for achieving a bright, full-color display which is known in the art of emissive displays is to create sub-pixels that are red, green and blue. In this system, each pixel has two states: on, or the emission of color; and off. Since light blends from these sub-pixels, the overall pixel can take on a variety of colors and color combinations. In an emissive display, the visual result is the summation of the wavelengths emitted by the sub-pixels at selected intensities, white is seen when red, green and blue are all active in balanced proportion or full intensity. The brightness of the white image is controlled by the intensities of emission of light by the sub-pixels. Black is seen when none are active or, equivalently, when all are emitting at zero intensity. As an additional example, a red visual display appears when the red sub-pixel is active while the green and blue are inactive, and thus only red light is emitted.

It is known that this method can be applied to reflective displays, typically using the cyan-magenta-yellow subtractive color system. In this system, the reflective sub-pixels absorb characteristic portions of the optical spectrum, rather than generating characteristic portions of the spectrum as do the pixels in an emissive display. White reflects everything, or equivalently absorbs nothing. A colored reflective material reflects light corresponding in wavelength to the color seen, and absorbs the remainder of the wavelengths in the visible spectrum. To achieve a black display, all three sub-pixels are turned on, and they absorb complementary portions of the spectrum.

However, the colors displayed by a full-color display as described above are sub-optimal. For example, to display red, one pixel displays magenta, one displays yellow, and one displays white. The white sub-pixel reduces the saturation of red in the image and reduces display contrast. The overall effect is a washed out red.

The aforementioned U.S. Pat. No. 6,864,875 describes various techniques for providing electrophoretic display elements (sub-pixels) capable of providing more than two colors. In one aspect, the present invention provides another type of electrophoretic display element capable of providing more than two colors, or other optical characteristics.

This invention also relates to improving the bistability of electrophoretic media. As mentioned above, electrophoretic media are typically bistable, and this bistable nature of electrophoretic media is a beneficial feature as compared to many other types of imaging media. Electrophoretic displays can retain their state (i.e., can continue to display an image written on the display) for some period of time without the use of power or a driving signal, as compared to many other types of displays such as cathode ray tubes, LED's, LCD's and the like, which lose their images as soon as either (or both) of power or a driving signal is removed. However, the bistability of electrophoretic media is not unlimited, and thermal or gravitational forces ultimately can degrade the image on an electrophoretic display. Electrophoretic displays can benefit from increased bistability, and this invention seeks to improve such bistability.

The aforementioned 2003/0132908 describes electrophoretic media in which the charges on the electrophoretic particles are field-dependent, so that the relative electrophoretic mobilities of various types of electrophoretic particles can vary with the applied field. It has now been discovered that, in electrophoretic media containing two types of particles having charges of opposite polarity (such media are referred to in some of the aforementioned E Ink patents and applications as "opposite charge dual particle media") the switching behavior of the medium may be highly field dependent even when the individual particles do not exhibit field dependent behavior, and that such field dependent switching behavior may be used to produce desired optical behavior in electrophoretic displays. In particular, such field dependent switching behavior can be used to provide a threshold of field strength below which the electrophoretic medium will not switch (thereby potentially enabling passive matrix switching of the medium), and can be used to allow changes in the optical state of the electrophoretic medium using combinations of drive pulses with zero net impulse.

SUMMARY OF THE INVENTION

In one aspect, this invention provides an electrophoretic display element, the display element having a viewing surface and comprising at least one droplet of an electrophoretic phase and a wall surrounding the droplet, the droplet comprising:

a fluid;

a plurality of first particles disposed in the fluid and having a first optical characteristic and a first electrophoretic mobility;

a plurality of second particles disposed in the fluid and having a second optical characteristic different from the first optical characteristic and a second electrophoretic mobility of opposite polarity to the first electrophoretic mobility; and a plurality of third particles disposed in the fluid and having a third optical characteristic different from the first and second optical characteristics, the third particles not undergoing electrophoretic motion in an electric field, the electrophoretic display element having a first display state in which the viewing surface displays the first optical characteristic, a second display state in which the viewing surface displays the second optical characteristic, and a third display state in which the viewing surface displays the third optical characteristic.

In such a display element, the first second and third optical characteristics may comprise three different colors visible to the human eye. Accordingly, this type of display elements may hereinafter for convenience be called the "three color display element" or "3CDE" of the present invention, although it should be recognized that this aspect of the invention is not restricted to visible colors, but may make use of any of the types of optical characteristics mentioned above.

When the first second and third optical characteristics are colors visible to human eye, these colors may be, for example, red, green and blue, or yellow, cyan and magenta; either combination is useful for providing a full color display. Alternatively, two of the three colors may be black and white; in this case, the third color may be any color other than black and white. Such a color combination is useful for a display (for example in an electronic book reader) which is primarily intended to function as a monochrome display, but which allows the use of spot color for highlighting or other purposes. For example, an electronic book reader might be provided with a stylus and such spot color to enable a student to change the color of particular portions of text to mark passages the student considers important, or to allow for adding marginal notes and similar comments in the same manner as on a paper copy.

In such a three color display element, the third particles may be substantially spherical or may have other shapes, including irregular ones. The third particles may be formed from, for example, silica, a metal or a polymer. Desirably, the third particles occupy at least about 25 percent, and preferably about 35 percent, by volume of the droplet. The fluid used in the droplet may be liquid or gaseous.

This invention also provides a method of driving a 3CDE. This method comprises applying an electric field of one polarity to the droplet, thereby causing the first particles to approach the viewing surface and the second particles to become spaced from the viewing surface, so that the viewing surface displays the first optical characteristic; applying an electric field of the opposite polarity to the droplet, thereby causing the second particles to approach the viewing surface and the first particles to become spaced from the viewing surface, so that the viewing surface displays the second optical characteristic; and applying to the droplet an electric field of such polarity and duration that both the first and second particles are hidden by the third particles, so that the viewing surface displays the third optical characteristic.

This invention extends to an electrophoretic display comprising a plurality of three color electrophoretic display elements and electrode means for applying electric field to each display element.

In another aspect, this invention provides an electrophoretic display element, the display element comprising at least one droplet of an electrophoretic phase and a wall surrounding the droplet, the droplet comprising:

a fluid;

a plurality of first particles disposed in the fluid and having an optical characteristic and an electrophoretic mobility; and a plurality of second particles disposed in the fluid and forming a filler therein through which the first particles can move, the second particles not undergoing electrophoretic motion in an electric field, wherein in the absence of an electric field, the first particles are attracted to the second particles.

This electrophoretic display element may hereinafter for convenience be called the "sticky particles" element of the present invention. Such a display element may further comprise a plurality of third particles having a second optical characteristic different from the first optical characteristic and an electrophoretic mobility of opposite polarity to the electrophoretic mobility of the first particles. Also, the fluid used in such a display element may be liquid or gaseous, and if liquid may be colored or uncolored. The second particles used in the sticky particles display element may generally be similar to the third particles used in a 3CDE; thus, in the sticky particles display element, the second particles may be substantially spherical, or may have other shapes, including irregular shapes. The second particles may be formed from, for example, silica, a metal or a polymer. Desirably, the second particles occupy at least about 25 percent, and preferably at least about 35 percent, by volume of the droplet.

This invention extends to an electrophoretic display comprising a plurality of sticky particles display elements of the invention and electrode means for applying electric field to each display element.

This invention also provides an electrophoretic medium comprising a fluid; a plurality of a first type of particle having a first optical characteristic and a charge of one polarity; and a plurality of a second type of particle having a second optical characteristic different from the first optical characteristic and a charge of the opposite polarity, the first and second types of particles being dispersed in the fluid, the electrophoretic medium displaying essentially zero conductivity on application of an electric field below a threshold, and a non-zero conductivity on application of an electric field above the threshold.

For convenience, such an electrophoretic medium may hereinafter be called a "threshold electric field" electrophoretic medium. As described in more detail below, in such a medium the first and second types of particles may bear polymer coatings, and the thickness of the polymer coatings may be used to control the threshold voltage. It will readily be apparent to those skilled in the technology of electro-optic displays that a threshold electric field electrophoretic medium may be useful in a passive matrix display, since driving such a passive matrix display requires that the electro-optic medium not change optical state upon application of a voltage of V/2 (where V is a predetermined maximum drive voltage) but change optical state upon application of a voltage of V. For example, V can be chosen so that application of a voltage of V/2 applies to the electro-optic medium an electric field of (say) 0.75 T, where T is the threshold voltage, so that the medium will not change optical state, but application of a voltage of V applies to the electro-optic medium an electric field of 1.5 T, which will cause the medium to change optical state.

In another aspect, this invention provides a method of varying the optical state of an electrophoretic medium, the medium comprising a fluid; a plurality of a first type of particle having a first optical characteristic and a charge of one polarity; and a plurality of a second type of particle having a second optical characteristic different from the first optical characteristic and a charge of the opposite polarity, the first and second types of particles being dispersed in the fluid, the electrophoretic medium exhibiting a non-linear response to an applied electric field, the method comprising applying to the electrophoretic medium in an initial optical state a first drive pulse having a first voltage and a first duration and thereafter applying to the electrophoretic medium a second drive pulse having a second voltage and a second duration such that the algebraic sum of the impulses applied by the two drive pulses is zero, thereby driving the electrophoretic to a final optical state different from the initial optical state.

This method of the present invention may hereinafter for convenience be called the "zero net impulse" driving method of the invention.

BRIEF DESCRIPTION OF THE DRAWINGS

The invention, in accordance with preferred and exemplary embodiments, together with further advantages thereof, is more particularly described in the following detailed description, taken in conjunction with the accompanying drawings.

In the drawings, like reference characters generally refer to the same parts throughout the different views. Also, the drawings are not necessarily to scale, emphasis instead generally being placed upon illustrating principles of the invention.

FIG. 14A is a graph that shows the mobility of two types of particles having constant, positive but different mobilities as a function of electric field.

FIGS. 14B and 14C illustrate the behavior of the particles of FIG. 14A when, respectively, a positive and a negative electric field is applied to the display medium.

DETAILED DESCRIPTION

Figure 1:
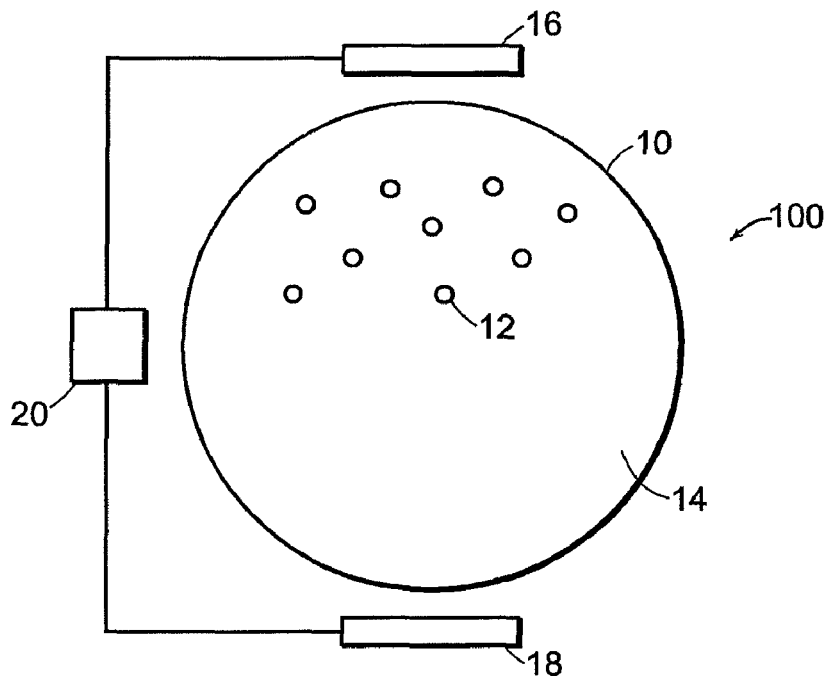
FIG. 1 shows a schematic depiction of a capsule containing particles that do not move under an applied voltage below a threshold value, according to the invention.

The present invention relates to methods and materials for an electrophoretic display such that the particle motion is a substantially controlled, non-linear function of the applied electric field. The present invention also relates to methods and materials for controlling color intensity in an electrophoretic display element. More particularly, in one aspect, the techniques and materials of the invention prevent, or at least significantly impede, the motion of charged pigment particles in the display under one set of conditions, while allowing them to move relatively freely under a second set of conditions. The invention may enable, for example, passive addressing of the display and can eliminate gravitational or diffusional motion of the pigment particles over time, thus enhancing the bistable nature of the display.

As set forth above, the present invention has three principal aspects, namely three color electrophoretic display elements, sticky particles display elements, and opposite charge dual particle electrophoretic displays which exhibit field dependent switching behavior, whether or not the electrophoretic particles in such displays exhibit field dependent mobility. These various aspects of the invention will primarily be described separately below but it should be recognized that a single display may make use of more than one aspect of the invention; for example, a three color electrophoretic display element of the present invention may exhibit field dependent switching behavior.

More specifically, the three color and sticky particles display elements of the present invention can both be regarded as variants of "filled" electrophoretic display elements, that is to say display elements in which the fluid is filled, or partially filled, with particles which do not undergo electrophoretic migration when an electric field is applied to the element. Accordingly, the electrophoretically immobile particles (the third particles in the three color display elements and the second particles in the sticky particles displays) may conveniently be referred to as "filler particles". Although the role of filler particles differs somewhat between the three color and sticky particles displays (in the three color display, the optical characteristics of the filler particles provide the third optical state, whereas in the sticky particles display the filler particles serve to hinder the movement of the electrophoretic particles, thus improving the bistability of the image), in practice many of the requirements for filler particles are the same in the two cases. Indeed, as already indicated, it is possible to have a single display which is both a three color and a sticky particles display, since any three color display in which the filler particles attract at least one of the first and second electrophoretic particles is by definition also a sticky particles display. Accordingly, the common requirements for the filler particles for the two types of displays will first be considered.

The filler particles should not undergo electrophoretic motion. This can of course be achieved by making the filler particles completely uncharged, but complete lack of electric charge is not necessarily a requirement of the filler particles. If the filler particles are present in an amount such that they substantially fill the droplet, or a major portion thereof, the filler particles will be unable to move even when an electric field is applied. It is desirable that the filler particles be at least loosely packed within the droplet, such that the filler particles occupy at least 25 percent, and desirably at least about 35 percent, of the volume of the droplet. In theory, if the filler particles were spherical and completely close packed, they would occupy about 63 percent of the volume of the droplet.

In both the three color and the sticky particles displays of the present invention, the electrophoretic particles need to be able to move through the filler particles, and for any given combination of electrophoretic and filler particles, and any given degree of packing of the filler particles, there is an upper limit on the size of the electrophoretic particles which can move through the filler particles. Obviously, the looser the packing of the filler particles, the large the electrophoretic particles can be, and the permissible size of the electrophoretic particles relative to the filler particles is also strongly affected by the shapes of the two particles. It can be shown that for a close-packed array of spherical filler particles, and spherical electrophoretic particles, the maximum diameter of electrophoretic particles which can move through the filler particles is approximately 0.128 times the diameter of the filler particles. Thus, in general it may be desirable for the electrophoretic particles to be about an order of magnitude smaller than the filler particles.

Preferred materials for filler particles include silica or polymer, especially polystyrene spheres. These can be made (as in certain biological applications) to have surface properties what will cause them to aggregate in the oil phase during an encapsulation process. They can also be made in a variety of monodisperse sizes as required for use in particular electrophoretic media.

In the sticky particles displays of the present invention, the attraction between the filler particles and the electrophoretic particles imposes a hindrance to movement of the electrophoretic particles, and thus improves the bistability of the display. The filler particles may enhance the bistability by creating a resistance to the migration of the electrophoretic particles. This resistance can be used to overcome, for example, any tendency of these particles to significantly migrate due to Brownian motion or stray electric fields. The characteristics of the filler particles, such as the average size and optical density of the individual filler particles and an aggregate volume of the filler particles in the electrophoretic display element, can be used to control the amount of resistance provided to the migration of the electrophoretic particles. The attraction between the filler particles and the electrophoretic particles also tends to impose a threshold for movement of the electrophoretic particles, i.e., the electrophoretic may not move at low electric fields but will move when the electric field exceeds a certain threshold value. In some cases, the threshold may be large enough to permit passive matrix addressing of the display.

In the three color display elements of the present invention, the use of filler media, such as, for example, silica, polystyrene, or metal particles, provides for an improved control over the color intensity of the electrophoretic display element. In one embodiment of the invention, the filler medium is uncharged and serves as a medium that the oppositely charged pigment particles of the electrophoretic display element must travel through during switching between optical states of the display. If the application of the electric field to the electrophoretic display element is timed such that the some of the charged pigment particles are located within the filler medium in the absence of the electric field, the electrophoretic display element can provide a visual appearance of a blended color. The intensity of a color palette, including the number of reproducible grayscale tone values, is controlled by controlling the amount of electrophoretic particles reaching the surface of the electrophoretic display element facing the viewer.

The display elements of the present invention may be in the form of encapsulated elements in which the droplets are surrounded by capsule walls, polymer-dispersed electrophoretic displays, and microcell displays. The invention may also find application in non-encapsulated displays.

The remainder of this Description is divided into ten sections under the following headings: Electrophoretic Displays; Brief Introduction to the Theory of Electrophoretic Motion of Charged Particles; Voltage Threshold Addressing Techniques; Inverse Electrorheological Gating Techniques; Full Color Displays with Passive Matrix Addressing and Randomly Coated Capsules; Polymer and Colloidal Particle Design; Temperature Compensation of Threshold; Electrophoretic Media Composed of Particles with Field Dependent Mobilities, Filler Media for Display Control and Stability, and Field Dependent Behavior in Dual Particle Opposite Charge Electrophoretic Displays.

I Electrophoretic Display

In broad overview, the invention relates to encapsulated electrophoretic displays that provide a flexible, reflective display that can be manufactured easily and consume little power (or no power in the case of bistable displays in certain states), as well as materials and methods useful in their construction. Such displays, therefore, can be incorporated into a variety of applications. The display can be formed from and can include particles that move in response to an electric charge. This mode of operation is typical in the field of electrophoretic displays. A display in which the particles, ordered by an electric charge, take on a certain configuration can take on many forms. Once the electric field is removed, the particles can be generally stable (e.g., bistable). Additionally, providing a subsequent electric charge can alter a prior configuration of particles. Some encapsulated electrophoretic displays may include two or more different types of particles. Such displays may include, for example, displays containing a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. The particles may have a refractive index that substantially matches the refractive index of the suspending fluid.

An encapsulated electrophoretic display can be constructed so that the optical state of the display is stable for some length of time. When the display has two states that are stable in this manner, the display is bistable. If more than two states of the display are stable, then the display is multistable. For the purpose of the present invention, the term bistable indicates a display in which any optical state remains fixed once the addressing voltage is removed. However, the definition of a bistable state depends upon the display's application. A slowly decaying optical state can be effectively bistable if the optical state is substantially unchanged over the required viewing time. For example, in a display that is updated every few minutes, a display image that is stable for hours or days is effectively bistable for a particular application. Thus, for purposes of the present invention, the term bistable also indicates a display with an optical state sufficiently long-lived so as to be effectively bistable for a particular application. Alternatively, it is possible to construct encapsulated electrophoretic displays in which the image decays quickly once the addressing voltage to the display is removed (i.e., the display is not bistable or multistable). Whether or not an encapsulated electrophoretic display is bistable, and its degree of bistability, can be controlled through appropriate chemical modification of the electrophoretic particles, the suspending fluid, the capsule, and binder materials.

An encapsulated electrophoretic display may take many forms. The display may include capsules dispersed in a binder. The capsules may be of any size or shape. The capsules may, for example, be spherical and may have diameters in the millimeter range or the micron range, but are preferably from about ten to about a few hundred microns. The capsules may be formed by an encapsulation technique. Particles may be encapsulated in the capsules. The particles may be two or more different types of particles. The particles may be colored, luminescent, light-absorbing or transparent, for example. The particles may include neat pigments, dyed (laked) pigments or pigment/polymer composites, for example. The display may further include a fluid in which the particles are dispersed.

Generally, an encapsulated electrophoretic display includes a capsule with one or more species of particles that either absorb or scatter light and that are suspended in a fluid. One example is a system in which the capsules contain one or more species of electrophoretically mobile particles dispersed in a dyed suspending fluid. Another example is a system in which the capsules contain two separate species of particles suspended in a clear suspending fluid, in which one species of particle absorbs light (black), while the other species of particle scatters light (white). There are other extensions (more than two species of particles, with or without a dye, etc.). The particles are commonly solid pigments, dyed particles, or pigment/polymer composites.

In electrophoretic displays, the particles may be oriented or translated by placing an electric field across the capsule. The electric field may include an alternating-current field or a direct-current field. The electric field may be provided by at least one pair of electrodes disposed adjacent to a display comprising the capsule.

The successful construction of an encapsulated electrophoretic display requires the proper interaction of all these materials and processes. Materials such as a polymeric binder (for example, for binding the capsules to a substrate), electrophoretic particles, fluid (for example, to surround the electrophoretic particles and provide a medium for migration), and a capsule membrane (for example, for enclosing the electrophoretic particles and fluid) must all be chemically compatible. The capsule membranes may engage in useful surface interactions with the electrophoretic particles, or may act as an inert physical boundary between the fluid and the binder. Polymer binders may set as adhesives between capsule membranes and electrode surfaces.

Various materials may be used to create electrophoretic displays. Selection of these materials is based on the functional constituents of the display to be manufactured. Such functional constituents include, but are not limited to, particles, dyes, suspending fluids, stabilizing/charging additives, and binders. In one embodiment, types of particles that may be used to fabricate suspended particle displays include scattering pigments, absorbing pigments and luminescent particles. Such particles may also be transparent. Exemplary particles include titania, which may be coated in one or two layers with a metal oxide, such as aluminum oxide or silicon oxide, for example. Such particles may be constructed as corner cubes. Luminescent particles may include, for example, zinc sulfide particles. The zinc sulfide particles may also be encapsulated with an insulative coating to reduce electrical conduction. Light-blocking or absorbing particles may include, for example, dyes or pigments. Types of dyes for use in electrophoretic displays are commonly known in the art. Useful dyes are typically soluble in the suspending fluid, and may further be part of a polymeric chain. Dyes may be polymerized by thermal, photochemical, and chemical diffusion processes. Single dyes or mixtures of dyes may also be used.

The fluid used in the display elements of the present invention may be a high resistivity fluid. The fluid may be a single fluid, or it may be a mixture of two or more fluids. The fluid, whether a single fluid or a mixture of fluids, may have its density substantially matched to that of the particles within the capsule. The fluid may be halogenated hydrocarbon, such as tetrachloroethylene, for example. The halogenated hydrocarbon may also be a low molecular weight polymer. One such low molecular weight polymer is poly(chlorotrifluoroethylene). The degree of polymerization for this polymer may be from about 2 to about 10.

Furthermore, capsules may be formed in, or later dispersed in, a binder. Materials for use as binders include water-soluble polymers, water-dispersed polymers, oil-soluble polymers, thermoset polymers, thermoplastic polymers, and UV- or radiation-cured polymers.

As already indicated, in some cases, a separate encapsulation step of the process is not necessary. The electrophoretic fluid may be directly dispersed or emulsified into the binder (or a precursor to the binder material) to form what may be called a "polymer-dispersed electrophoretic display." In such displays, the individual electrophoretic phases may be referred to as capsules or microcapsules even though no capsule membrane is present. Such polymer-dispersed electrophoretic displays are considered to be subsets of encapsulated electrophoretic displays.

In an encapsulated electrophoretic display, the binder material surrounds the capsules and separates the two electrodes. This binder material must be compatible with the capsule and electrodes and may possess properties that allow for facile printing or coating. It may also possess barrier properties for water, oxygen, ultraviolet light, the electrophoretic fluid, or other materials. Further, it may contain surfactants and cross-linking agents, which could aid in coating or durability. Polymer-dispersed electrophoretic display may be of the emulsion or phase separation type.

II. Brief Introduction to the Theory of Electrophoretic Motion of Charged Particles The electrophoretic motion of charged particles in a fluid is covered in most textbooks on colloid science. See, for example, Hiemenz, P. C. and Rajagopalan, R., *Principles of Colloid and Surface Chemistry*, 3rd ed., Marcel Dekker, NY, 1997. In systems of interest for electrophoretic displays, the dielectric constant is usually low ($\epsilon_r \approx 2$) and the number of ions small. In this regime the following Equation (1) is true:

$$\zeta = \frac{q}{2\pi\epsilon_r\epsilon_0 d_p} \quad (1)$$

where
$\zeta$=zeta potential,
q=net charge on the particle,
$\epsilon_r$=dielectric constant,
$\epsilon_0$=permittivity constant=$8.85\times 10^{-12}$ C$^2$/Nm$^2$, and
$d_p$=particle diameter In an applied electric field, $\vec{E}$, the particle will experience a force:

$$F_{el} = q\vec{E} \quad (2)$$

Solving Equation (1) for q and substituting in Equation (2) yields the following Equation (3):

$$F_{el} = 2\pi\epsilon_r\epsilon_0 d_p \zeta \vec{E} \quad (3)$$

The shear stress exerted by a particle on the surrounding medium may be approximated as the force exerted on the particle (by, for example, gravity or in this case the electric field) divided by the surface area, A, of the particle. Although this is not strictly correct, it gives a numerical value well within the range of values calculated by more rigorous derivations. Thus, the shear stress exerted on the medium by a charged particle in an electric field can be taken as:

$$\tau_{el} = \frac{F_{el}}{A} = \frac{2\pi\epsilon_r\epsilon_0 d_p \zeta \vec{E}}{\pi d_p^2} = \frac{2\epsilon_r\epsilon_0 \zeta \vec{E}}{d_p} \quad (4)$$

The electrophoretic velocity of a charged particle in a medium is found by balancing the electrostatic force on the particle, $F_{el}$, with that due to viscous drag, which is given by:

$$F_{vis} = 3\pi\eta d_p v \quad (5)$$

where $\eta$ is the apparent viscosity of the medium and v is the particle velocity. Thus, the electrophoretic velocity is given by:

$$v = \frac{q\vec{E}}{3\pi\eta d_p} \quad (6)$$

or, combining this with Equation (1):

$$v = \frac{2\epsilon_r\epsilon_0 \zeta \vec{E}}{3\eta}. \quad (7)$$

In the usual case the viscosity, $\eta$, and the $\zeta$ potential are constant. Cases are presented in which either a constant $\zeta$ or a field dependent $\zeta$ are combined with a viscosity, $\eta$, that is (a) constant, (b) a function of the shear stress (using the Herschel Buckley model), or (c) a function of both the shear stress and the applied electric field.

The Herschel-Buckley equation models a material that has a yield stress and flows like a power law fluid above this stress. The equation is:

$$\tau = \tau_H + (\eta_H D)^p \quad (8)$$

where $\tau$=shear stress,
$\tau_H$=yield stress,
$\eta_H$=Herschel-Buckley viscosity,
D=shear rate, and
p=Herschel-Buckley index.

The apparent viscosity needed to calculate the electrophoretic velocity is then obtained by rearranging Equation (8) to obtain:

$$\eta = \frac{\tau_{el}}{D} = \frac{\tau_{el}\eta_H}{(\tau_{el} - \tau_H)^{1/p}} \quad (9)$$

Equation 9 is valid for $\tau_{el} > \tau_H$. For $\tau_{el} \leq \tau_H$, the model considers the apparent viscosity to be infinite. That is, the material behaves like a solid below the yield stress. For a fluid that is a function of both the shear stress and the applied electric field, this model is modified to incorporate a field dependent yield stress:

$$\eta = \frac{\tau_{el}}{D} = \frac{\tau_{el}\eta_H}{\left(\tau_{el} - \frac{\tau_H}{k\vec{E}}\right)^{1/p}} \quad (10)$$

where k is a constant, and the Equation is valid for:

$$\tau_{el} > \tau_H / k\vec{E}$$

Below this value, the material behaves as a solid, and the apparent viscosity is infinite.

In the present analysis, the nominal $\zeta$ potential is defined as $\zeta_0$, and is set to be 100 mV. For cases in which the $\zeta$ potential is constant, the relation $\zeta = \zeta_0$ is used. For the cases in which the $\zeta$ potential is field dependent, the following relation is used:

$$\zeta = 2\zeta_0 e^{0.32} \quad (11).$$

The Herschel-Buckley model is an approximation of the actual physics that occurs in a real system, as is every theoretical model. However, it is sufficiently accurate to demonstrate the effects of rheology on the system. The values listed below are appropriate for the exemplary embodiments that are presented hereafter:
Herschel-Buckley viscosity, $\eta_H$=0.003 Pascal seconds
Herschel-Buckley yield stress, $\tau_H$=4 Pascals
Herschel-Buckley index, p=0.8
Field-dependent HB constant, k=3.

For the cases in which the viscosity is constant, the relation $\eta = 2\eta_H/3$ is used. Equations (9) and (10), with the above constants, are used for the non-Newtonian viscosity case and the field dependent viscosity cases. It will be appreciated that in other embodiments, somewhat different parameters may be used without departing from the spirit and scope of the present invention.

III. Voltage Threshold Addressing Techniques

Under a voltage threshold addressing approach, the velocity of the particles goes from substantially zero, below a lower voltage level, (e.g. a threshold level), to a relatively high velocity, at a voltage equal to or greater than the threshold level. In certain embodiments, this increase in velocity occurs as the voltage increases by a factor of two or three (i.e., as the voltage goes from V/2 to V or from V/3 to V, which is referred to as "V/2" or "V/3" addressing, respectively), and the change may occur in a non-linear manner. The velocity of the particles at the higher voltage is substantially larger when compared with the velocity of the particles at the lower voltage. A threshold voltage lies between the lower voltage and the higher voltage such that a voltage at or above the threshold voltage will cause the particles to move at this higher velocity.

Figure 2:
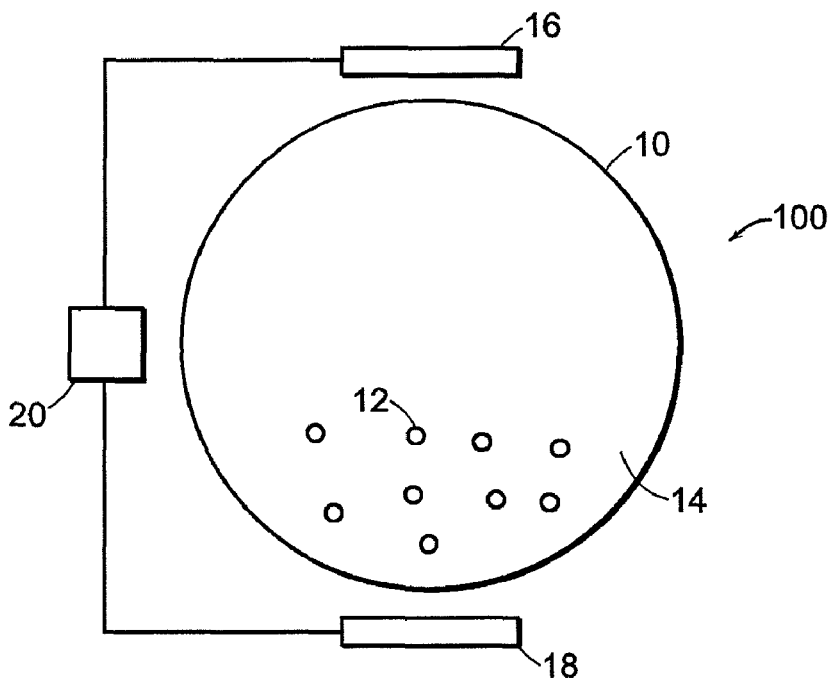
FIG. 2 shows a schematic depiction of a capsule containing particles that move under an applied voltage at or above a threshold value, according to the invention.

Now referring to FIGS. 1 and 2, a capsule 100 has a capsule wall 10 that defines the capsule 100. A carrier medium 14 (also referred to as a suspending medium, fluid, or carrier fluid) is contained within the capsule 100. Particles 12 (for example, pigment particles) are suspended in the carrier medium 14. A source of voltage 20 provides voltage to the capsule 100 via two electrodes 16, 18. In FIG. 1, a voltage below the threshold voltage is applied to the capsule 100. The particles 12 remain substantially stationary in the carrier medium 14. However, in FIG. 2, a voltage at or above the threshold voltage is applied to the capsule 100. The particles 12 move at a velocity that is rapid compared to the velocity of the particles 12 shown in FIG. 1.

Figure 4:
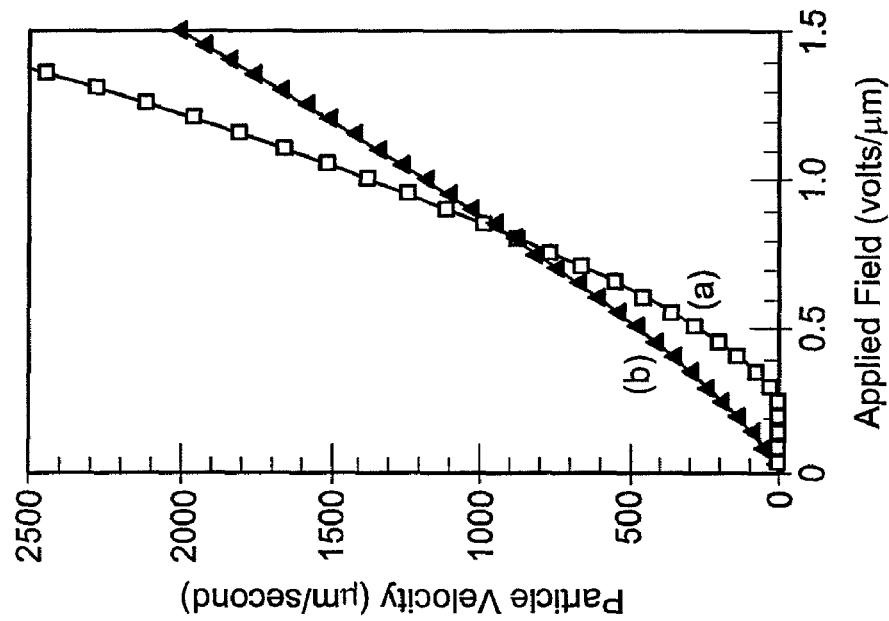
FIG. 4 is a graph in which curve (a) shows the velocity of electrophoretic particles having a field dependent zeta potential in a fluid obeying the Herschel Buckley model for viscosity as a function of applied field, according to the invention, and curve (b) shows the velocity of electrophoretic particles having a field dependent zeta potential in a fluid having a constant viscosity as a function of applied field, according to the invention.
Figure 3:
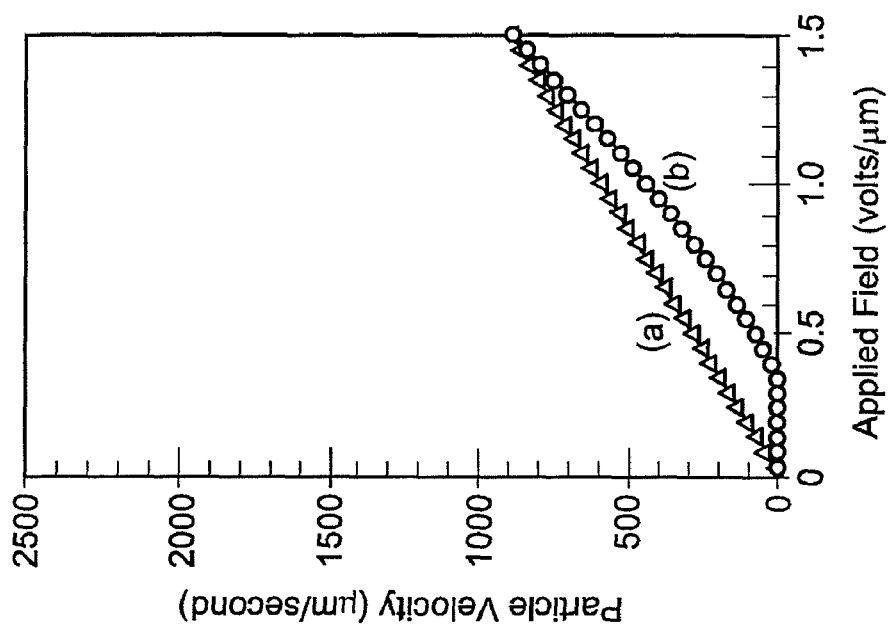
FIG. 3 is a graph in which curve (a) shows the velocity of electrophoretic particles having a constant zeta potential in a fluid having a constant viscosity as a function of applied field, according to the invention, and curve (b) shows the velocity of electrophoretic particles having a constant zeta potential in a fluid obeying the Herschel Buckley model for viscosity as a function of applied field, according to the invention.
Figure 6:
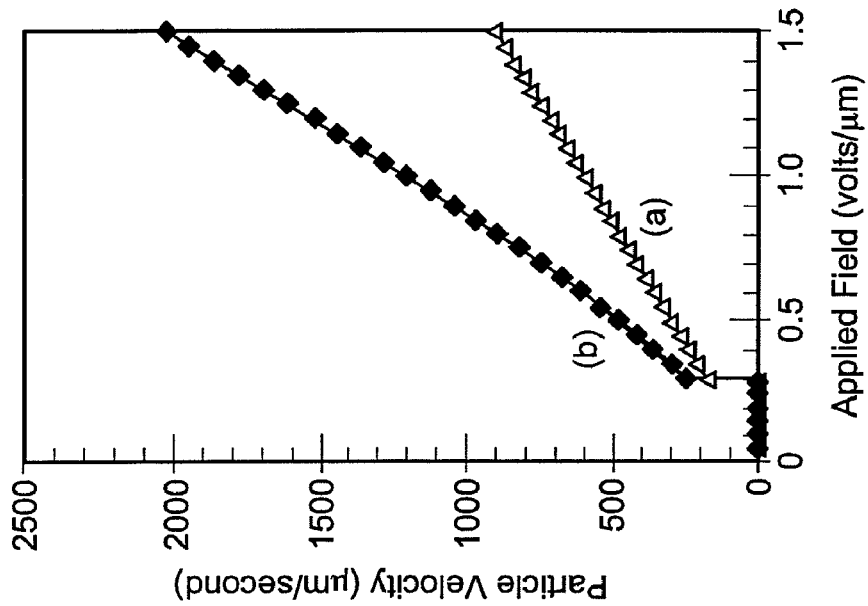
FIG. 6 is a graph in which curve (a) shows the velocity of electrophoretic particles having a constant zeta potential in a fluid having a constant viscosity, with the addition of a particle sticking threshold, as a function of applied field, according to the invention, and curve (b) shows the velocity of electrophoretic particles having a field dependent zeta potential in a fluid having a constant viscosity, with the addition of a particle sticking threshold, as a function of applied field, according to the invention.
Figure 5:
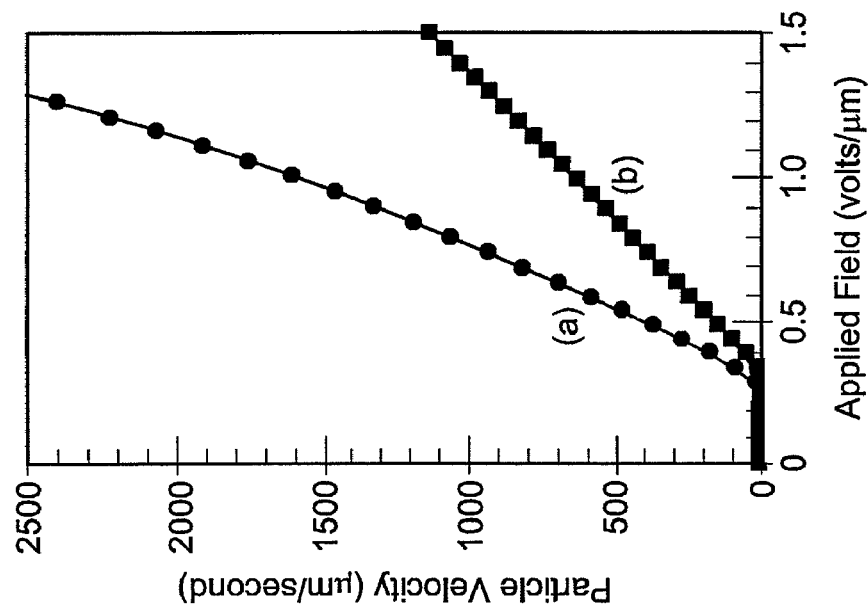
FIG. 5 is a graph in which curve (a) shows the velocity of electrophoretic particles having a field dependent zeta potential in a fluid having a field dependent Herschel Buckley model for viscosity as a function of applied field, according to the invention, and curve (b) shows the velocity of electrophoretic particles having a constant zeta potential in a fluid having a field dependent Herschel Buckley model for viscosity as a function of applied field, according to the invention.

Examples of such velocity-voltage relationships are shown in FIGS. 3 to 6. In FIG. 3, Curve (a) shows the usual situation in which the particle charge and the fluid viscosity are constant and there is no threshold due to particle sticking. In this case, the particle velocity increases linearly from zero with applied electric field. Curve (b) in FIG. 3 shows the situation in which the particle charge is still constant, but the fluid that the particles move in has a yield stress. Below a certain electric field the particles cannot move in this fluid. Above the threshold the particles can move and the apparent viscosity continues to decrease, allowing the particle velocity to increase faster than linearly. FIG. 4, Curve (a) shows a system with this same fluid, but in which the particle charge is a function of the applied field. Once again, a threshold voltage must be exceeded for the particles to move, but the velocity increases even faster than in FIG. 3, Curve (b). FIG. 4, Curve (b) shows the effect of having a field dependent particle charge, but a constant viscosity fluid. The velocity increases faster than in FIG. 3, Curve (a), but there is no threshold voltage. FIG. 5, Curves (a) and (b) show the result of having a fluid whose properties change as a function of applied field. Both Curves have a threshold due to the yield stress of the fluid, but Curve (a), in which the particle charge is also a function of the applied field shows the most rapid increase in velocity as the voltage is increased. An additional small threshold due to particle sticking at the wall would have little effect on the results shown in FIG. 3, Curve (b), FIG. 4, Curve (a) and FIG. 5, Curves (a) and (b) because they already have a significant threshold from the rheology of the liquid. The two constant viscosity examples (FIG. 3, Curve (a) and FIG. 4, Curve (b)) have no threshold. The addition of a particle sticking threshold would keep the velocity at zero until the threshold was reached, followed by a jump up to the existing curve at that applied field. This behavior is shown in FIG. 6, in which Curve (a) shows the modification of FIG. 3, Curve (a) and Curve (b) shows the modification of FIG. 4, Curve (b). FIGS. 3 to 6 illustrate the concept of a nonlinear velocity-voltage response but are in no way limiting. Other velocity-voltage functions also are useful.

A number of techniques and mechanisms can be used alone or in combination to accomplish a large increase in velocity upon application of an electric field at or above a threshold voltage. In one embodiment, such a large increase can be represented by a function of time such as a step-change, or more generally, an increase of velocity that is substantially abrupt over a small range of applied field, and which remains at an elevated level at still higher applied fields. Examples of changes of this type are presented below. Some of the techniques and mechanisms to achieve such abrupt changes in velocity with applied field can be grouped into three categories: (A) adherence of particles to each other and/or to the walls of the capsules or device; (B) use of a structured medium or filler particles through which the electrophoretic particles move; and (C) non-linear field effects on the motion of the particles. These techniques are described below.

III.A. Adhesion

As described above, some particles exhibit a slight tendency to adhere to the wall of a capsule, or to filler particles. If the potential is below some threshold value, the particles will not leave the wall or filler particles. Typically, for adhesion to a wall this threshold is quite low and results in a long switching time between states. However, the surface chemistry of the components of the system can be manipulated to enhance the tendency for the particles to stick to the inside of the wall or to filler particles to provide a significant threshold value. Note that it is generally harder to vary the degree of adhesion to a capsule wall than to filler particles, since the capsule wall is subject to numerous requirements, such as rate of wall formation, mechanical strength, electrical conductivity etc., whereas filler particles serve only to control the movement of the electrophoretic particles, so there is considerably greater latitude in the choice of filler particle materials than wall materials.

Because not all the particles are in contact with the wall, if only the wall surface is modified, a large effect typically will not be achieved. Under a first voltage, the particles move to a side of the capsule and multiple layers of particles are positioned at varying distances away from the wall. When the voltage is reversed, the particles that are not in contact with the wall move to the opposite wall without the need to apply a potential at or above the threshold value. Thus, in certain embodiments, the particles are caused not only to adhere to the wall, but also to adhere to each other when they are in the vicinity of the wall. In contrast, when electrophoretic particles adhere to filler particles, while lie between the two extreme position of the electrophoretic particles, the first layer of electrophoretic particles adhering to the filler particles will tend to restrain further movement of any further layers of electrophoretic particles not yet in contact with the filler particles.

When the level of a dispersant is low, the electrophoretic particles, such as titanium dioxide ("$TiO_2$") particles, aggregate with each other and become attached to the walls of the capsule. A dispersant is a surface active agent (surfactant) capable of aiding the creation of or stabilization of a dispersion of one material in another material in which it is substantially insoluble. That is, the dispersant helps to create or maintain small droplets or particles of the dispersed phase in a second, continuous phase by decreasing the work necessary to break the particles and/or by decreasing the tendency for the small particles to re-aggregate. In the current context, the dispersed material is a solid that is dispersed as small particles in a liquid in which it is substantially insoluble. Thus, by controlling the type and amount of dispersants used, the magnitude of the particle-particle and particle-wall interactions can be selected. Thus, in effect, the threshold voltage can be selected. For example, in the case of dispersants such as OLOA 1200, the functional groups that are believed to physically anchor the dispersant material to the electrophoretic particle surface are polyamines, such as diethylene triamine, which are attached to a polyisobutylene chain by a succinimide or succinamide group. By varying the molecular weight of the oil soluble polyisobutylene chain, the thickness of the steric layer on the particles can be adjusted, thus controlling the particle-particle and particle-wall attraction. Dispersants for non-aqueous suspensions or dispersions work by providing steric barriers and often combined steric and electrostatic barriers that prevent the particles from aggregating. For pigment particles for electrophoretic displays, the dispersant usually must be polymeric to provide a sufficient barrier. By reducing the magnitude of the steric barrier a controlled aggregation can be achieved.

In general, block or graft copolymers can be used as dispersants when one of the block materials is soluble in the carrier medium and the other component has limited solubility in the carrier medium, or has a specific affinity for the electrophoretic particle surface. The block with the affinity for the electrophoretic particle surface serves as an anchoring group, while the soluble block provides the steric barrier around the electrophoretic particle. In the case of the OLOA 1200 mentioned above, the polyisobutylene is the soluble component while the polyamine can interact strongly with, for example, a titanium dioxide, silica, or alumina electrophoretic particle surface. Soluble blocks suitable for use in electrophoretic systems include polyisobutylene, poly(ethylene-co-butylene), polybutadiene, polyethylhexylacrylate, polyethylhexylmethacrylate, poly(ethylhexylacrylate-co-styrene), polyhydroxystearic acid, polystyrene, polydimethylsiloxane, etc. The suitability depends on the nature of the carrier medium. The anchoring component can be a polymer containing cationic functionality, such as a polyamine or polyvinylpyridine. It can be a polymer containing anionic functionality, such as polyacrylic acid or other polymers containing carboxylate, sulfonate, phosphate, or phosphonate groups. It can be a polymer containing nonionic polar functionality, such as polyethylene oxide or a polyamide. The anchoring can also be enabled by functional end groups on the soluble polymer block, or by functional groups along the soluble backbone as long as the number of monomer units between groups allows loops of soluble polymer to extend out into the carrier medium. Commercial dispersants of use in electrophoretic displays include, but are certainly not limited to, the following examples: OLOA 371 (Chevron), Solsperse 17000 (Avecia), Solsperse 13940 (Avecia), Solsperse 3000 (Avecia), Zephrym PD5464 (Uniqema), Zephrym PD2246SF (Uniqema), Zephrym PD2234 (Uniqema), Zephrym PD1000 (Uniqema), Ganex V216 (ISP Technologies), and DC5225C (Dow Corning).

Chemisorbing oil soluble chains of controlled molecular weight to the surface of the electrophoretic particles can create similar behavior. The soluble polymer chains referred to here are the same as those discussed above for dispersants. The difference is in the covalent bonding of the chains to the particle surface. While dispersants are only physisorbed to the surface and are in a dynamic equilibrium with dispersant molecules in solution, the chemisorbed polymer cannot leave the particle surface. The latter approach has the advantage of not requiring the presence of an equilibrium concentration of the dispersant in the bulk suspending fluid, thus allowing a lower conductivity to be maintained. Examples of the behavior of systems with a threshold based on adhesion have already been discussed above with reference to FIG. 6.

III.B. Structured and Filled Media

Another way to hinder the motion of the electrophoretic particles below a threshold voltage is by making the fluid through which they move "non-Newtonian." A Newtonian fluid is one for which there is a linear relationship between the shear stress and the shear rate, and the shear stress is zero at zero applied shear rate. That is, the apparent viscosity (i.e., the shear stress/shear rate) is a constant over all shear rates and shear stresses. All other fluids are non-Newtonian. Non-Newtonian fluids are those that do not exhibit such a linear relationship, but rather exhibit a non-linear relationship in shear stress to changes in shear rate applied. Equivalently, the apparent viscosity is not constant over all shear rates and shear stresses. Some non-Newtonian fluids can behave like Newtonian fluids over some range of flow conditions. By creating a structured or complex fluid, a carrier medium has an apparent viscosity that is a function of the shear force exerted on it by the electrophoretic particles when they are acted on by the applied electric field. Alternatively, the viscosity of the carrier medium itself can be directly influenced by the applied electric field. The carrier medium may be a structured or unstructured medium. For example, the filler media may comprise a gelled medium, floc networks, and/or the filler particles, as described in more detail below.

III.B.1. Gelled Medium

The shear stress that a charged particle exerts on the fluid surrounding it is a function of the applied electric field, the particle charge, and the particle size. For a given particle, the shear stress that it exerts in a traditional electrophoretic display is generally proportional to the applied field. In a Newtonian fluid, this effect translates into a linear increase in the electrophoretic particle velocity with increasing applied electric field (i.e., with increasing voltage). See FIG. 3, Curve (a). In contrast, a fluid with a yield stress and a rapidly decreasing apparent viscosity above the yield stress can provide a system in which the electrophoretic particle velocity is zero below the threshold voltage and is significant at or above the threshold voltage. See FIG. 3, Curve (b). The velocity of the particle increases at a rate that is proportional to the applied voltage and inverse to the viscosity, as described by Equation (7) above. Therefore, decreasing the viscosity as a function of increased voltage, all other parameters being held substantially constant, results in a non-linear velocity profile with applied voltage.

III.B.1.a. Functionalized Polymers

Hydrocarbon fluids are typically used in electrophoretic displays as a carrier medium to suspend the particles. One way to convert such fluids into a structured fluid with the characteristic described above is to add a polymer. The polymer can be composed of a soluble backbone with a small number of functional groups along the backbone that can physically associate with the functional groups on other polymer chains. One alternative polymer architecture is an "ABA" block copolymer with an oil soluble B block, such as polyisobutylene or poly(ethylene co-butylene), and A blocks that associate in the oil. The A blocks form groups (or micelles) comprised of more than two A groups, such that a cross-linked system is developed.

Polymer concentration as used herein means the concentration of the polymer in solution, usually expressed as grams of polymer per liter of solution, or other similar units. At low concentrations the polymer molecules are individual molecules in a sea of solvent. The polymer chain interacts with the solvent and other parts of the same chain. The concentration at which the polymer coils of one molecule begin to overlap with neighboring molecules is referred to as the overlap concentration, often symbolized by $c^*$. Above this concentration the properties of the polymer solution change as the polymer molecules interact with each other as well as the solvent. The overlap concentration is a function of the molecular weight of the polymer, the "stiffness" of the polymer, and the polymer-solvent interaction.

As long as the polymer concentration is above the overlap concentration, such polymeric systems will form a continuous, physically cross-linked network in solution. The value of the yield stress is a function of the polymer concentration, the number of functional groups per chain, and the strength of the interaction between the functional groups. The yield stress increases with an increase in any of these three variables.

Thus, in this system, at or above a threshold voltage, the particles move more easily through the carrier medium than they do below the threshold voltage. The particles disrupt the structure of the carrier medium as they pass through the medium. Such a structure is expected to reform rapidly after being disrupted (or "broken") by the passage of the pigment particles therethrough. A rapidly reforming structure reduces the waiting time necessary before the next line can be addressed. Until the structure reforms, the particles are able to move below the threshold voltage. Thus, the faster the structure reforms, the faster the entire display can be changed, but the single line switching time between states does not change. Also, the polymer molecules should be nonionic, or carry a net zero charge, so that they do not translate in an applied electric field.

III.B.1.b. Particulate Networks

Another way to create a network structure that will prevent or impede the motion of the pigment particles is to form a floc structure composed of structure-forming particles that have a net zero charge, which are different particles from the pigment (electrophoretic) particles. The structure-forming particles flocculate to form the gel but do not translate in an applied electric field. As with the polymer systems discussed above, the network of structure-forming particles should reform quickly after being broken down by the shearing action of the pigment particles passing through it. It is also useful to create the floc network with as small a volume fraction of structure-forming particles as possible. The minimum apparent viscosity that can be achieved when the floc structure is completely disrupted is a function of the volume fraction of structure-forming particles. The minimum apparent viscosity becomes a rapidly increasing function above about 10% volume fraction. From 0 to about 10 volume percent of particles the viscosity of a stable dispersion will follow the Einstein relationship:

$$\eta/\eta_0 = 1 + 2.5\phi$$

where $\eta$ is the apparent viscosity of the dispersion, $\eta_0$ is the viscosity of the solvent, and $\phi$ is the volume fraction of particles in the dispersion. Above about 10% the viscosity increases more and more rapidly. The flocculation can be created by a number of mechanisms, as follows.

III.B.1.b.i. Dispersion Force Attractions

One flocculation mechanism is to reduce the stabilizing influence of a dispersant in the carrier medium in a controlled fashion in order to attain a particle-particle attraction that is sufficient to produce the desired yield stress. A sufficient particle-particle attraction is usually greater than about 5 kT, where k is the Boltzmann constant and T is the absolute temperature. The laws of thermodynamics teach that average kinetic energy of the molecules in a sample is given by 1.5 kT. Hence, a value of about 5 kT is sufficient to result in a yield stress that will not be disrupted by simple thermal agitation, at conventional ambient temperatures.

III.B.1.b.ii. Depletion Flocculation

The floc network also can be created by the presence of a non-adsorbing polymer. The ratio of the particle size to the polymer size and the concentrations of each must be balanced for this embodiment to function properly. However, it will produce a floc structure that will continue to reform after each shear event. Depletion flocculation is caused by the exclusion of the non-adsorbing polymer molecules from the space between two particles when that space is equal to or smaller than the size of the polymer molecule in solution. The osmotic pressure difference between the area depleted of polymer and the rest of the solution results in a net force of attraction between the two particles.

III.B.1.b.iii. Anionic/Cationic Functionalized Particles

A controlled floc network also can be established through the use of ionically functionalized particle surfaces. The floc particle surfaces are chemically modified, for example, by chemisorbing the appropriate mix of molecules onto the surface, to create a surface that is predominately lyophilic, but that has a very low density of both cationic and anionic functional groups. The number of charge sites should be chosen such that the floc particle approximately has a net zero charge in order to prevent it from migrating in the applied electric field. By placing the charge groups far enough apart, the floc particle will act like a partially neutralized colloidal particle for which the charge patches of opposite charge can attract each other on a local scale. The opposite charge patches enable the structure-forming particles to form the network structure. This network structure provides the yield stress, which impedes the motion of the pigment particles below the threshold. Thus, this floc network is expected to be strong enough to resist the motion of pigment particles under an electric field, until the threshold electric field is exceeded, at which point the floc network gives way to the motion of the pigment particles.

III.B.2. Filler Particles

Yet another way to create a obstacle that will prevent or impede the motion of electrophoretic particles in the absence of the electric field is to introduce a physical barrier comprising a plurality of filler particles, which are different from the electrophoretic particles and serve as a medium the electrophoretic particles travel through, into, or out of when the optical state of the electrophoretic display element is changed. In the absence of the electric field, the filler particles can inhibit settling of the electrophoretic particles thereby improving the bistability of the electrophoretic display element. To provide threshold addressing, the average size and geometrical shape of the individual filler particles, as well as the total volume of the filler particles in the electrophoretic display element may be selected so that the electric field needs to exceed a predetermined threshold value to cause migration of the pigment particles through the filler particles. Attraction between the filler particles and the electrophoretic particles can increase this threshold.

In one embodiment, the filler particles are made from silica. In another embodiment, the filler particles are made from polystyrene. In yet another embodiment, the filler particles are made from metal. The filler particles may have a wide range of shapes including, but not limited to, spherical, ellipsoidal, and irregular shapes.

III.B.3. Inverse Electrorheological Fluids

In another embodiment, inverse electrorheological ("ER") fluids can be used to provide threshold addressing. Conventional ER fluids typically are fluids that develop a yield stress when a strong electric field is applied across them. In contrast, an inverse ER fluid has a high apparent viscosity or a yield stress in the absence of a field. At a sufficiently high applied electric field, the inverse ER fluid rapidly becomes less viscous. Inverse ER fluids, examples of which are presented later, are compatible with the voltage threshold addressing approach.

€ For example, either a particle floc structure or a functionalized, oil soluble polymer can be used as a component of the inverse ER fluid and the formed network can be disrupted at a voltage above a threshold voltage. In certain inverse ER fluids composed of anionic/cationic functionalized particles in a floc structure the structure-forming particles described above play a more active role than in non-ER situations. When a sufficiently high voltage is applied, the paired charge sites on adjacent structure-forming particles can move apart and temporarily disrupt the floc network, allowing the charged pigment particles to move through the capsule or across the display. In other embodiments of inverse ER fluids composed of polymers, a polymer can have a lyophilic polymer backbone either with functional end blocks or with a low density of functionalized groups along the polymeric chain. Lyophilic polymers suitable for use in electrophoretic systems include polyisobutylene, poly(ethylene-co-butylene), polybutadiene, polyethylhexylacrylate, polyethyl hexyl methacrylate, poly(ethyl hexylacrylate-co-styrene), polyhydroxystearic acid, polystyrene, polydimethylsiloxane, etc. The suitability of any specific polymer depends on the nature of the carrier medium. The functional groups can be cationic, such as an amine or vinylpyridine. They can also be anionic, such as a carboxylate, sulfonate, phosphate, or phosphonate group. If the functional groups are anionic and cationic groups, there should be an approximately equal number of them so that the polymer has approximately a zero net charge and does not substantially migrate in the applied electric field. The ion pairs should be strong enough so that they do not dissociate when a voltage below the threshold voltage is applied but do dissociate and move away from each other when a voltage above the threshold voltage is applied. The individual functionalized segments of the polymer can move in the field, but the entire polymer molecule stays essentially where it started. While the ion pairs are dissociated, the charged pigment particles can more easily move through the inverse ER medium.

III.C. Non-Linear Field Effects

III.C.1. Field Dependent Particle Mobility

Typically, the force applied to a charged particle in an electric field in a low dielectric medium is just the particle charge times the applied electric field. Thus, there is a linear relationship between the applied electric field and the shear stress exerted by the particle, which leads to a linear increase in particle velocity in a Newtonian fluid. That is, if the field is doubled, the force on the particle is doubled, causing the shear stress exerted by the particle on the suspending medium to double, and, in a Newtonian fluid, the velocity of the particle will be doubled. FIG. 3, Curve (a) shows the relationship between particle velocity and applied electric field for this circumstance. The surface of pigment particles can be functionalized with suitable ion pairs. For example, an anionic site is placed on the particle and is balanced with a cationic counter ion (or vice versa).

For electrophoresis, it is necessary to remove the counterion (the cation in this case) away from the charge site on the particle and outside of the shear plane. The solvent inside the shear plane travels with the particle. The effective charge on the particle is the net charge inside this shear plane. Thus, if all the counterions remain at the particle surface, within the shear plane, the particle will be effectively uncharged. Additional counterions can be moved away from the particle surface by increasing the electric field under the right conditions. The field needs to be high, as is contemplated in some embodiments of the present invention, and the ion pairs need to be weak enough that the increased field is sufficient to overcome the attraction between the ions.

By controlling the strength of these ion pairs, the charge of a particle can be controlled as a function of an applied electric field. For example, the strength of the ion pairs can be controlled by manipulating the amount of steric hindrance around the charge group, by varying the degree of charge delocalization, or by varying the dielectric constant of the solvent. In this way electrophoretic particles can be created for which the charge increases with increasing electric field, and the shear stress exerted by the particle on the suspending medium will increase faster than the usual linear relationship. As already mentioned, FIG. 4, Curve (b) shows the effect of such a field dependent particle charge on the electrophoretic velocity of the particle in a Newtonian medium. This effect, in combination with a structured medium for which the apparent viscosity is decreasing with increasing shear stress, leads to a significantly steeper increase in electrophoretic velocity with increasing electric field than is seen for the constant charge particle in a Newtonian medium. Examples of this effect are shown in FIG. 4, Curves (a) and (b) and FIG. 5, Curve (a).

III.C.2. Medium (IER Fluids)

Inverse electrorheological fluids also can exhibit non-linear effects. As explained above, inter-molecular or inter-particle attachments, which act as physical cross-links, provide the polymer or particulate networks with their non-Newtonian flow properties. As described above, in inverse ER fluids, these intermolecular or inter-particle attachments are disrupted by electric fields of sufficient magnitude. When the number of attachments that are disrupted increases as the field increases, the apparent yield stress and apparent viscosity curve will decrease as the field is increased. This effect, in combination with the non-linear behavior of the pigment particles discussed above, will lead to a much sharper jump in particle velocity as a threshold voltage is exceeded. As mentioned above, FIG. 5, Curve (a) combines a field dependent viscosity fluid with particles that have a field dependent charge, while Curve (b) shows the effect of applied electric field on the particle velocity for a system with a field dependent viscosity with constant charge. Both have the desired zero velocity below the threshold, but the combination of effects in Curve (a) shows a sharper increase in velocity above the threshold as compared with Curve (b).

IV. Inverse Electrorheological Gating Techniques

As an alternative, instead of using the passive matrix "select" and "data" lines to carry out a V/2 or V/3 addressing scheme, the "select" lines can be used to apply AC voltages of various amplitudes and frequencies to a display of capsules. If a polymeric or particulate network structure in the carrier medium of the capsules can be disrupted by this AC field, a DC field applied on the "data" lines can be used to move the electrophoretic particles through the carrier medium in a display only on the selected line of the display. The carrier medium addressed by the unselected lines (i.e., the absence of or an insufficient about of an AC voltage) presents an insurmountable yield stress for the electrophoretic particles under the same DC field, and the electrophoretic particles do not move in the capsules addressed by these unselected lines.

Figure 7:
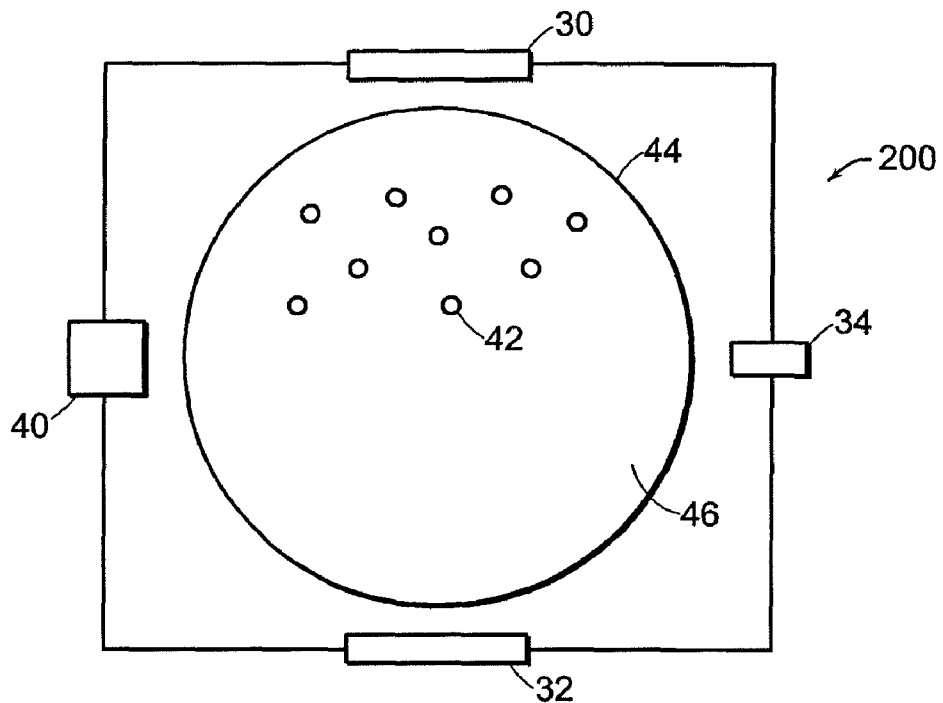
FIG. 7 shows a schematic depiction of a capsule containing particles that do not move under an applied AC voltage below a threshold value and an applied DC addressing signal, according to the invention.
Figure 8:
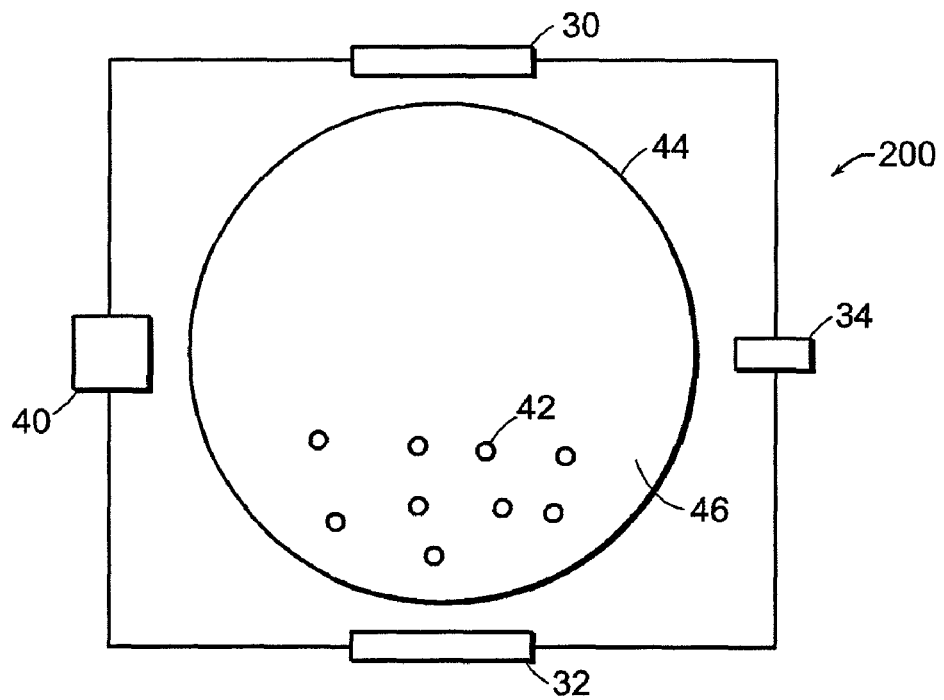
FIG. 8 shows a schematic depiction of a capsule containing particles that move under an AC applied voltage at or above a threshold value and an applied DC addressing signal, according to the invention.

For example, and referring to FIGS. 7 and 8, a capsule 200 has a capsule wall 44 and contains a carrier medium 46 and electrophoretic pigment particles 42. The carrier medium 46 is an ER fluid. In FIG. 7, a DC voltage, generated by a voltage generator 34 and applied through electrodes 30, 32 cannot move the electrophoretic particles 42. However, as shown in FIG. 8, when an AC voltage, generated by a second voltage generator 40, is applied to the capsule 200 through the electrodes 30, 32, and the DC voltage is applied, the particles 42 move across the capsule 200. The AC voltage disrupts the network structure of the carrier medium 46. Examples of several polymeric and particulate network systems are described below.

IV.A. Polymeric Networks

IV.A.1. Controlled Ion Pairs

One fluid that is suitable for inverse electrorheological gating is a substantially soluble polymer backbone with an approximately equal number of anionic and cationic functional groups either in the backbone or on grafts along the backbone. The density of functional groups should be low (<2 mole %). This polymer is described in more detail above. Generally, the functional groups can form intermolecular ion pairs when the polymer is present above the overlap concentration, $c^*$, as defined earlier. This network of polymers in the carrier medium can form a gel. A substance is a gel if it (1) has a continuous structure with macroscopic dimensions that is permanent on the time scale of an analytical experiment and (2) is solid-like in its rheological behavior. (See, for example, Flory, P J. *Discussions of the Faraday Society* 1974, 57, 7) The strength of attraction between these ion pairs can be manipulated, for example, by controlling the amount of steric hindrance around a charged group (for example, attaching a triisoamylammonium group to the polymer or using tetraisoamylammonium as the counterion), by varying the degree of charge delocalization (for example, using the picrate ion, which has a highly delocalized charge that produces a weaker ion pair), or by altering the dielectric constant of the solvent (for example, raising the dielectric constant from 2 to 4 will weaken the ion pair interaction by a factor of 2). Controlling the strength of these ion pairs allows for control of the strength of the physical cross-links in the gel system. Thus, by appropriately setting the strength and number of cross-links, the yield stress of the gel is set to be large enough to prevent the pigment particles from moving under the data line DC field. When the AC field is applied to a select line, it disrupts the ion pairs, the gel liquefies, and the electrophoretic particles move across the capsules addressed by the select line. When the AC field is removed, rapid diffusion of the polymer segments allows ion pairs to re-combine quickly, and the gel is restored in a rapid manner. The gel should be restored in a time substantially less than the duration that a display will hold a particular image, for example, in less than one-tenth the duration of the image.

IV.A.2. Zwitterionic Groups

Zwitterionic groups also can be added to the soluble polymer backbone to produce a carrier medium that is an IER fluid with properties that allow inverse electrorheological gating. Zwitterionic groups contain both an anionic and a cationic charge in close proximity to each other, usually with one to three methylene groups separating the charges. These groups can interact with one another in organic solvents. This interaction provides physical cross-links in the carrier medium to form a gel. An AC voltage of sufficient amplitude and correct frequency will disrupt these interactions, allowing the gel to liquefy. For example, applied fields with amplitudes in the range of 100 to 10,000 volts/cm and frequencies in the range of 10 Hz to 10 MHz can be expected to provide acceptable performance. Again, the rapid diffusion of the polymer segments leads to a rapid restoration of the solidity of the gel when the AC field is removed. The gel can be expected to regain 50% of its structure in less than one second.

IV.B. Particulate Floc Networks

IV.B.1. Controlled Ion Pairs

A network in a carrier medium, such as a controlled floc network, also can be established through the use of ionically functionalized particle surfaces. The structure-forming particle surfaces are chemically modified (for example, by chemisorbing an appropriate mix of molecules onto the surface) to create a surface that is predominately lyophilic, but that has a relatively low density of both cationic and anionic functional groups. This can be accomplished, for example, by treating the particle surface with functional silanes, such as aminopropyltriethoxysilane, (trihydroxysilyl)propylmethylphosphonate, or the like. The number of charge sites should be chosen so that the structure-forming particle has approximately a net zero charge and that it will not substantially move under an applied electric field. By placing the charge groups far enough apart, the structure-forming particle will act like a partially neutralized colloidal particle for which the charge patches of opposite charge can attract each other on a local scale. The application of AC voltage to the select line tends to disrupt the interaction of the structure-forming particles in the floc network of the carrier medium addressed by a select line. This disruption can cause the medium to liquefy, allowing the substantially immobilized pigment particles to move under an applied DC field in capsules addressed by the data line(s). Field strengths and time periods such as those described above can be expected to be effective in this situation.

IV.B.2. Zwitterionic Groups

Zwitterionic groups on structure-forming particles also can be used to produce a carrier medium suitable for inverse electrorheological gating techniques. If zwitterionic groups are not rigidly attached to the floc particle surface, but are on the free ends of lyophilic polymer chains, which themselves are chemisorbed to the particle surface, the zwitterionic groups can be relatively mobile. An AC voltage applied to capsules addressed by a select line tends to disrupt the floc network in the carrier medium of each capsule addressed by the select line because of the ability for movement of the zwitterionic groups. This disruption causes the particulate floc structure to liquefy while the AC voltage is applied. The floc network reforms in the absence of the AC voltage that is sufficient to disrupt the floc network. Structure-forming particles, in some embodiments, do not diffuse as quickly as polymer chains, but the use of very small colloidal particles can allow a reasonably fast reformation of the floc network when the AC field is removed or falls below a value sufficient to disrupt the network. Field strengths and time periods such as those described above can be expected to be effective in this situation.

IV.B.3. Dielectric Particles

Dielectric particles also can be used to advantage to create a floc network in a carrier medium for use as an inverse electrorheological fluid. In normal electrorheological fluids the dispersed dielectric particles line up between two electrodes under an applied AC field. Continuous strands form, creating significant resistance to any shearing motion perpendicular to the strands. Such fluids typically operate at a fairly high volume fraction of particles in order to attain a large yield stress. These dielectric particles can also be used to create inverse electrorheological fluids under certain conditions. For a short time after the AC field is applied, strings of flocculated dielectric particles are disrupted when the AC frequency is within a fairly narrow range, which depends on the particles. The cause of the disruption is the rotation of the particles that are not perfectly aligned perpendicular or horizontal to the field. (See, for example, Jones, T. B. Electromechanics of Particles, Cambridge University Press: New York, N.Y., 1995).

Thus, a dispersion of dielectric particles, at considerably lower volume fraction than found in normal electrorheological fluids, is used to create a particulate floc network with an appropriate yield stress. One can then take advantage of this rotation phenomenon to disrupt the network by applying an AC electric field on the select lines at the correct amplitude and frequency. As with the other inverse electrorheological gating techniques, this application of the AC electric field liquefies the carrier medium located along the select line, and allows the charged electrophoretic particles to move across the capsules when a DC field is applied to the data line(s).

V. Full Color Displays with Passive Matrix Addressing and Randomly Coated Capsules Using the inverse electrorheological gating techniques described above together with encapsulated electrophoretic display techniques, a full color display can be provided without having to precisely align the capsules of a display on an electrode grid or use a color mask. Several species of capsules are present in such a display with each species of capsule containing one or more pigments or one or more pigments and one or more dyes and being capable of displaying one member of the chosen color set and either white or black. The several species of capsules are mixed in the correct proportions and coated randomly on a film. There should preferably be multiple capsules of each color within each pixel area. It is not consequential how a particular color is produced in a particular type of capsule. Capsules that operate using a colored particle and a different color of dye, or capsules that operate using particles of more than one color, would all be acceptable. In an embodiment of the present invention, the colors of the chosen color set are in separate capsules, and each type of capsule corresponding to a particular color contains a different fluid phase so that the inverse electrorheological behavior of each species is different. This allows each species to be addressed independently, even though a plurality of different species of capsules are addressed by the same select line.

Each color is designed with its own threshold voltage, amplitude and/or frequency. Thus, frequency controlled liquefaction allows the capsule medium to be switched for each color separately. Once the AC voltage drops below the threshold of a given color capsule, that color no longer responds to the data line signals. Consider a display having three colors. If amplitude control is used, the AC field is first set to the highest voltage, thus liquefying the carrier media in all capsule on the selected line. The data lines would be set for the color with the highest threshold value. The voltage would then be decreased to the intermediate threshold value and the data lines set for the intermediate threshold color. The capsules corresponding to the color with the highest threshold would no longer respond to signals on data lines, thus fixing those pixels in the display state that they assumed under the highest AC field. Finally, the threshold would be set to the lowest value and the data lines set for the last color. During this third addressing step, the colors corresponding to the two higher thresholds would remain unaffected. This scheme can, of course, be extrapolated to the use of additional capsule types if so desired. Because these rheological gating techniques allow full color displays to be created using passive matrix addressing without the need to address individual capsules, the cost of the displays can be significantly reduced from those associated with other display techniques.

Figure 9:
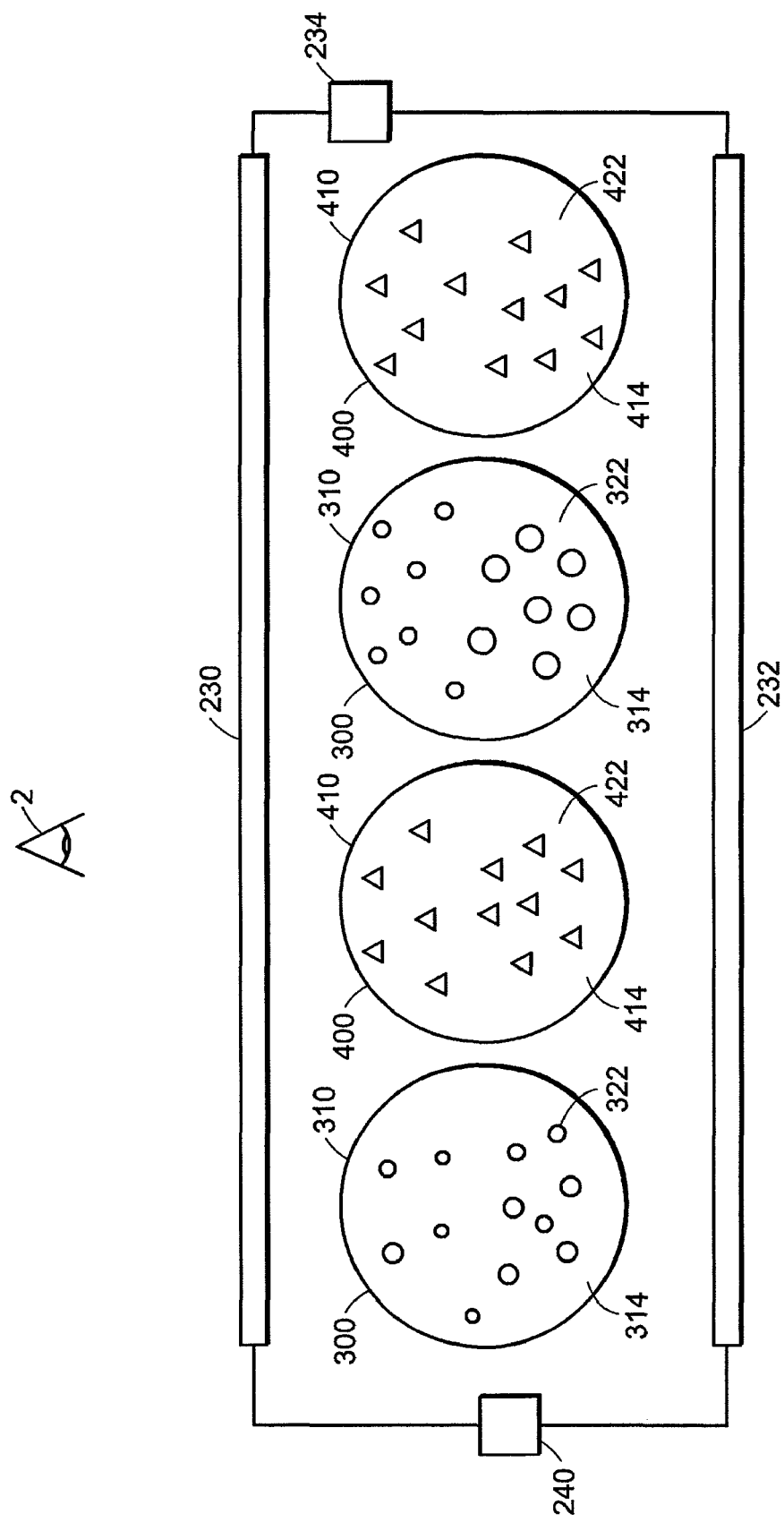
FIG. 9 shows a schematic depiction of a plurality of unaddressed capsules containing two different kinds particles and suspending fluids that have different threshold voltages, according to the invention.
Figure 10:
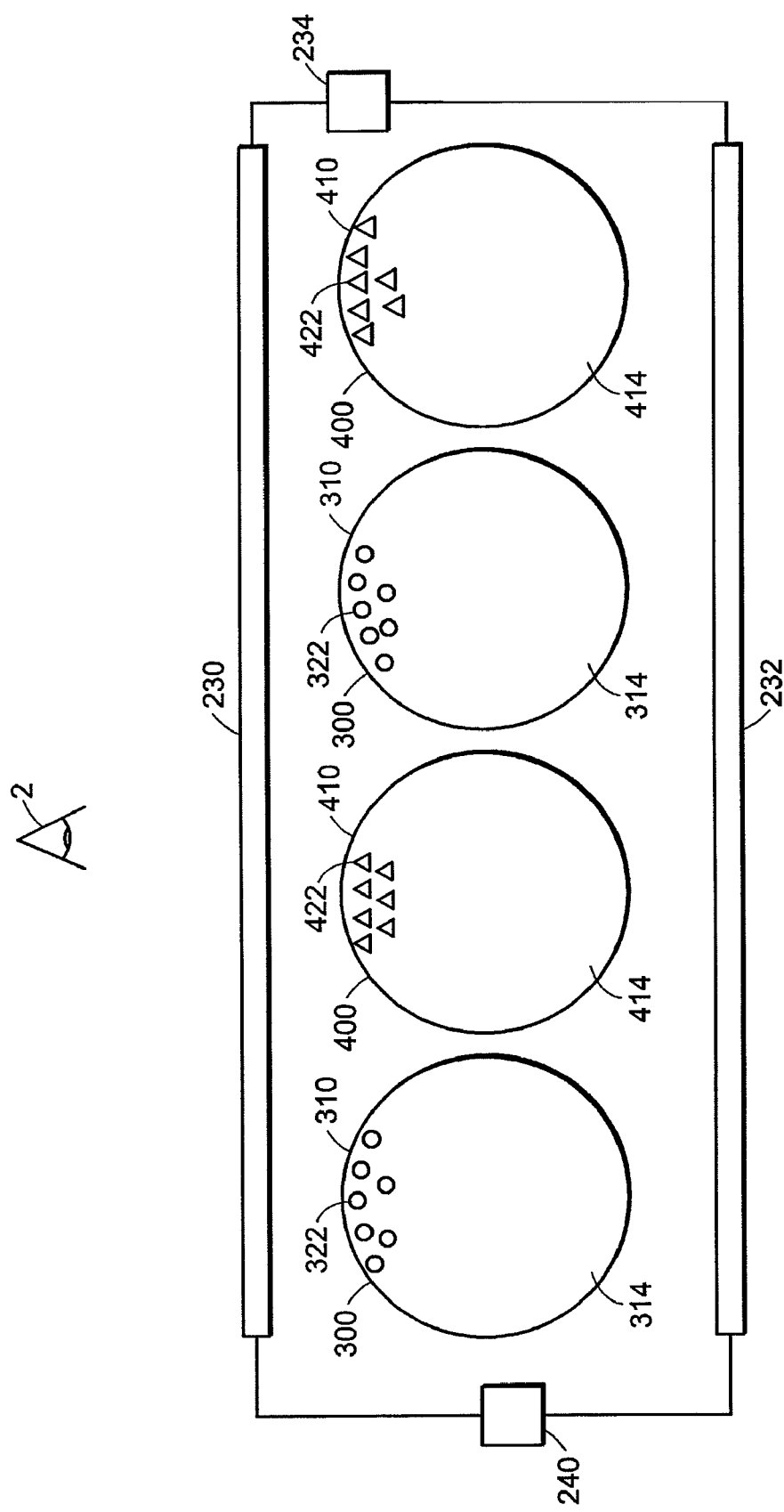
FIG. 10 shows a schematic depiction of a plurality of capsules containing two different kinds particles and suspending fluids that have different threshold voltages, that are addressed by a DC addressing signal and an AC field greater than the highest threshold voltage of the capsules, according to the invention.
Figure 11:
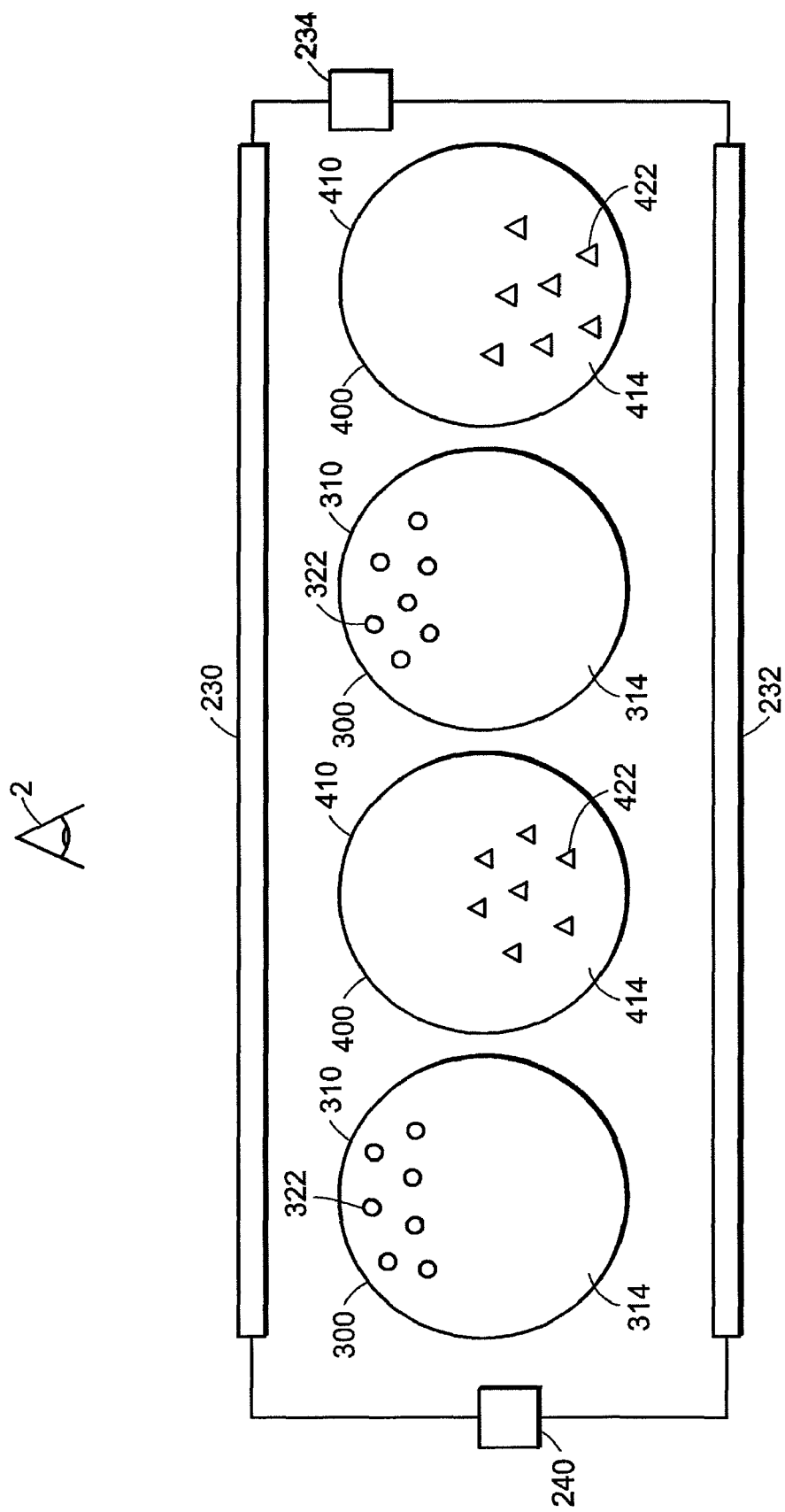
FIG. 11 shows a schematic depiction of a plurality of capsules containing two different kinds of particles and suspending fluids that have different threshold voltages, that are addressed by a DC addressing signal and an AC field above the threshold value corresponding to the lower threshold for either of the two kinds of particles, according to the invention.

FIGS. 9, 10 and 11 illustrate schematically an encapsulated electrophoretic display of this type. Two types of capsule 300, 400 are situated between two electrodes 230, 232. AC and DC voltages are produced by voltage generators 234 and 240, respectively, and are applied to the capsules 300, 400 through the electrodes 230, 232. One of the types of capsules 300 has a capsule wall 310 and contains a first carrier medium 314 and a first species of electrophoretic particle 322. The second type of capsule 400 also has a capsule wall 410 and contains a second carrier medium 414, and a second species of electrophoretic particle 422. Each species of electrophoretic particle 322, 422 and respective carrier medium 314, 414 has a different threshold voltage characteristic. For example, suppose that the capsules 300 containing the particles 322 and the medium 314 have a threshold voltage $V_{300}$ and the capsules 400 containing the particles 422 and the medium 414 have a threshold voltage $V_{400}$, where $V_{400}$ is greater than $V_{300}$. For example, assume further that the particles 322 and 422 all carry charge of the same sign, whether positive or negative. In one embodiment, these different species of particle 322, 422 can represent, for example, two different colors. For example, the particles 322 can be magenta, and the particles 422 can be green. Suppose that the media 314 and 414 are both colored black. A viewer 2 observes the display.

The medium 314, 414 in each species of capsule 300, 400 is different such that an AC field at a value lower than $V_{400}$ and greater than $V_{300}$ can only liquefy one of the media, namely 314. In that case, the DC field, when applied, would move the particles 322 only in the capsules 300 where the medium 314 has liquefied.

An exemplary explanation of how amplitude control is used follows. In FIG. 9, none of the capsules have been addressed, and the particles 322, 422 are randomly distributed within their respective capsules. The AC field first is set to the highest voltage (i.e., a voltage that will liquefy both of the different media, such as a voltage above $V_{400}$) and is applied to a particular select line in a region of the display to be addressed. The AC field liquefies all the media 314 and 414 of the capsules 300, 400 along the selected line. The data lines are be set for the particles of the color with the highest threshold value for motion, (in the example, the particles 414) so as to address the capsules that are intended to be that color (i.e., capsules 400). Because all of the capsules 300, 400 contain liquefied medium 314, 414, the particles 322, 422 in all of the capsules respond to the applied DC field. As shown in FIG. 10, all of the particles 322, 422 have moved toward the viewer 2. At this point, the viewer 2 sees a mixture of magenta and green particles.

The AC voltage is then dropped to a next highest threshold value (e.g., in the exemplary case, a voltage above $V_{300}$, but less than $V_{400}$) and a DC addressing field is applied to the data lines to address the particles having the color corresponding to the next highest threshold value (I.e., the particles 322). The capsules 400 that have a threshold voltage higher than the applied voltage would contain carrier medium that is no longer liquefied, and the particles contained in the capsules 400 would not move in response to the DC voltage applied to the data lines. As shown in FIG. 11, a DC field of the polarity opposite to the polarity of the DC field that was applied in FIG. 10 is applied between the electrodes 230, 232. The particles 322 are caused to move in their capsules 300 so that the particles 32 are substantially removed from the side of the capsules 300 nearer the viewer 2. The net effect of these exemplary addressing steps is that a viewer 2 would see capsules 400 which appear substantially the color of the particles 422 (green) and capsules 300 which appear substantially the color of the medium 314 (black), for a net effect that appears green.

In the foregoing example, the polarity of the charge on the two types of electrophoretic particles was assumed to be the same. If the charges are of opposite polarity, it is only necessary to reverse the polarity of one of the DC voltages applied to the data lines to obtain the same result by a stepwise process in which capsules having higher threshold voltage are addressed before capsules having a lower threshold voltage, the AC field is reduced, and the capsules having the next highest threshold voltage are addressed.

If a display containing more that two species of capsules is desired, one can iterate this process, finally setting the AC field to the lowest threshold value and addressing the particles corresponding to the last color by applying a DC voltage to the data lines. Once the AC voltage is set below the threshold of a given color capsule, the capsules of that color no longer respond to the data line signals. Because rheological gating techniques allow full color displays to be created using passive matrix addressing without the need to address individual capsules, the cost of the displays can be significantly reduced as compared to the cost of manufacturing displays operating according to other addressing techniques.

In an alternative embodiment in which a frequency-controlled liquefaction of a suspending medium is used, the presence of two different media 314, 414 that liquefy under different frequency excitations can allow separate switching of each color by controlling the frequency of the AC field that is applied. This embodiment also can be extended to a number of species of capsule greater than two.

VI. Polymer and Colloidal Particle Design

Many of the techniques described above use functionalized polymers, surface modified pigment particles or surface modified floc network particles. The modification of the pigment and floc network particles can be achieved by grafting on to their surfaces molecules that are soluble in the carrier medium. For small particles (several nanometers to several ten's of nanometers in diameter) these molecules can be, for example, octyl through octadecyl hydrocarbon chains. For larger particles, polymers that are soluble in the carrier medium must be grafted to the particle surface. If this solvated material provides a sufficiently thick layer around the particles, a stable dispersion can be created in which the particles behave as hard spheres. That is, when two particles collide, they will not stick to each other on impact, but will move away and continue as separate particles. As the thickness of this solvated layer is reduced from this point, the attraction between the particles at closest approach increases. Thus, by reducing the thickness of this solvated layer, the floc networks form in a controlled way. By replacing a fraction of the grafted soluble chains with chains that include a functional group on the end, one can create particles with the controlled functionality discussed earlier.

The ion pair approaches for both polymeric and particle based networks require the selection of sterically hindered ions and/or ions with delocalized charge. Such ions dissociate in low dielectric constant fluids. For example, materials such as tetraisoamylammonium picrate can be added to a hydrocarbon oil to increase the conductivity of the oil. The tetraisoamylammonium ion is a highly hindered cation. The charge on the picrate anion is not localized at the phenolic oxygen but is distributed over the $\pi$-electron system of the whole molecule, resulting in a weak electrostatic force field leading to weak ion pairs. Also, the strength of the ion pair is a function of the dielectric constant of the solvent.

VII. Temperature Compensation of Threshold

The physical properties of the polymeric and particulate networks formed as well as the tendency for the ion pairs to dissociate in the embodiments above are functions of ambient temperature. Since the threshold voltage, the required AC electric field amplitude, and the required AC electric field frequency change with temperature, the above techniques work within a range of temperatures unless some adjustments are made. Because the phenomena are understood and their temperature behavior catalogued, the operating temperature range can be extended by monitoring the temperature of the display, and applying the fields at the amplitude and/or frequency required at that temperature. Although it is expected that to disrupt the network for the inverse electrorheological gating case, the required amplitude of the applied electric field decreases with increasing temperature, and the required frequency of the applied electric field increases with increasing temperature, the actual behavior will vary from system to system. The behavior of each specific system should be characterized, and that information used to alter the amplitude and frequency of the applied field as a function of temperature.

VIII. Electrophoretic Media Composed of Particles with Field Dependent Mobilities FIGS. 12 to 25 of the accompanying drawings illustrate various electrophoretic media having electrophoretic particles with field dependent mobilities.

FIGS. 12A to 12G are graphs that illustrate the behavior of mobility versus applied electric field for various types, i.e., species or sets, of electrophoretic particles. Such particles may be, for example, pigment particles. Preferably, their mobility varies due to variations in particle charge induced by application of an electric field.

Figure 12A:
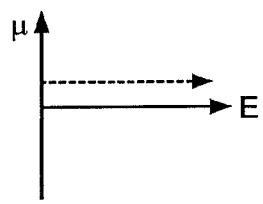
FIGS. 12A through 12H are graphs which illustrate the behavior of mobility versus applied electric field for embodiments of various types of electrophoretic particles.

FIG. 12A illustrates the mobility of a single type of particle having a constant mobility, of positive polarity. Applying a varying voltage to such a particle would proportionally vary the corresponding force applied to the particle. There is, however, no field-dependent effect on the mobility of the particle. A system of this type may be prepared by dispersing a pigment (a surface treated carbon black with a polymer shell) in a solution of SOLSPERSE 17000 (Avecia, Inc., Wilmington, Del.) in a 1:1 mixture by weight of ISOPAR G (ExxonMobil Lubricants & Petroleum Specialties Company) and HALOCARBON 1.8 (Halocarbon Products Corporation, River Edge, N.J.).

Figure 12B:
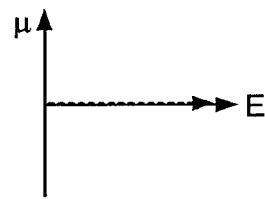

FIG. 12B illustrates the mobility of a single type of particle having a constant, zero mobility. This particle type has no charge, so application of an electric field creates no force on the particles, and no corresponding movement. Such particles may maintain their locations within a display medium, subject to gravitational and other forces, and may contribute to an optical characteristic, if, for example, they are viewable by an observer of a display. A system of this type may be prepared by dispersing TiPure R960 in a 1:1 mixture by weight of ISOPAR G and HALOCARBON 1.8.

Figure 12C:
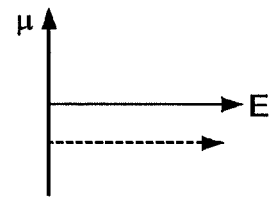

FIG. 12C illustrates the mobility of a single type of particle having a constant mobility, of negative polarity. Applying a varying voltage to such a particle would proportionally vary the corresponding force applied to the particle. For a given electric field, the direction of motion of these particles would be opposite to that for particles having the mobility illustrated in FIG. 12A. Particles having mobilities of opposite polarity experience forces of opposite directions for a given field, i.e., one parallel and the other anti-parallel to the field. A system of this type may be prepared by dispersing a pigment (a silane treated, silica clad $TiO_2$ with a polymer shell) in a solution of SOLSPERSE 17000 and SPAN 85 (Aldrich Chemical Company Inc.) in a 1:1 mixture by weight of ISOPAR G and HALOCARBON 1.8.

Figure 12D:
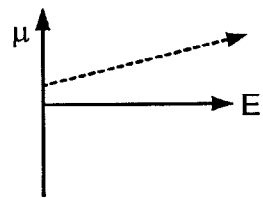

FIG. 12D illustrates the mobility of a single type of particle having an increasing, linearly varying mobility, of positive polarity. Applying a varying voltage to such a particle generates a force that increases with field strength at a greater rate than for a particle with constant mobility. These particles may have a charge that increases due to increases in the electric field strength.

Figure 12E:
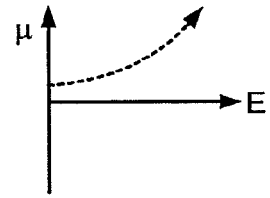

FIG. 12E illustrates the mobility of a single type of particle having an increasing, non-linearly varying mobility, of positive polarity. Applying a varying voltage to such a particle would generate a force that increases with field strength at a rate that increases with applied field strength. These particles may have a charge that increases due to increases in the electric field strength. A charge-increasing effect may grow more pronounced as the field strength increases.

Figure 12F:
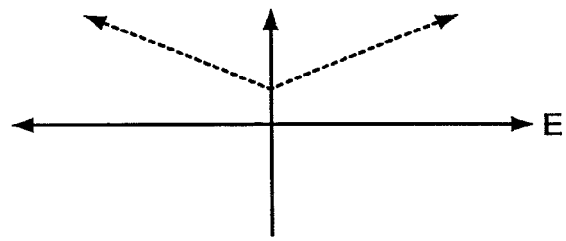

FIG. 12F illustrates the mobility of a single type of particle having an increasing, linearly varying mobility, of positive polarity. The mobility of this particle type is similar to that illustrated in FIG. 12D.

Figure 12G:
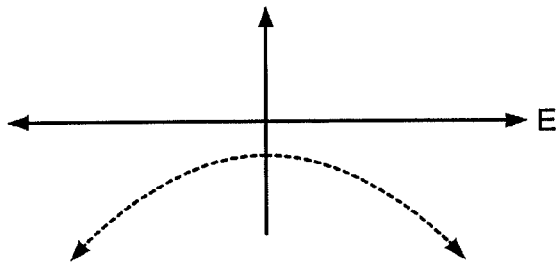

The mobility at negative field is, as graphed, a mirror image of the mobility at positive fields, negative and positive referring to electric fields of opposite directions. Similarly, FIG. 12G illustrates the mobility of a single type of particle, at positive and negative fields. The mobility in this case has a negative polarity at all voltages, and again has the same value, i.e. magnitude, for negative and positive polarity fields of the same magnitude.

The mobility is a function of field strength, and not field direction, i.e., field polarity. Thus, the mobility is isotropic relative to direction of application of an electric field. The direction of the field determines the direction of the corresponding applied force, while the magnitude of the field determines the magnitude of the mobility.

If one defines a positive field direction as a direction pointing to the viewing surface of a display, then a negative direction points away from the viewing surface. This convention will be assumed for the following description. Given this convention, FIG. 12H illustrates the direction of particle motion, given a knowledge of the polarity of the particle mobility and the polarity of the applied field.

Figure 12H:
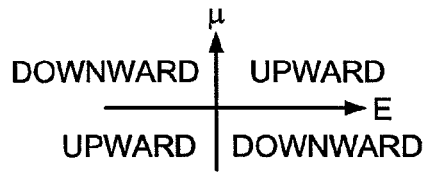

Particles having a positive polarity will tend to move toward the viewing surface when subjected to a field of positive polarity (upper right quadrant of FIG. 12H). Particles having a positive polarity will tend to move away from the viewing surface when subjected to a field of negative polarity (upper left quadrant). Particles having a negative polarity will tend to move toward the viewing surface when subjected to a field of negative polarity (lower left quadrant). Particles having a negative polarity will tend to move away from the viewing surface when subjected to a field of positive polarity (lower right quadrant).

FIGS. 13 to 25 each illustrate various exemplary embodiments of a display medium for inclusion in an image pixel. These embodiments serve to illustrate features of the invention, rather than provide a comprehensive listing of implementations. For simplicity, different particle types are referred to with the letters "A", "B", "C", "D" and "E". Use of these indicia does not imply that A particles, for example, in one embodiment are identical to A particles in another embodiment.

Furthermore, display media, in the following description, are illustrated as encapsulated, including a capsule membrane or wall. The representation of a capsule membrane is not intended to be limiting because the invention is applicable to unencapsulated electrophoretic display media. An image pixel may, however, include one or more capsules.

A display medium may include a carrier medium, for example, a fluid. The capsule and the display medium may include various materials in various embodiments, and be formed by various processes, as described elsewhere in this specification.

Figure 13A:
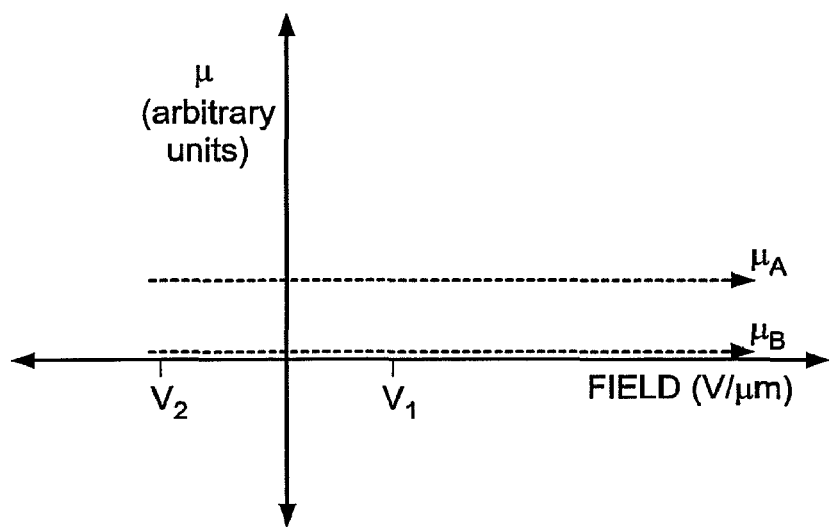
FIG. 13A is a graph that shows the mobility of two types of particles having constant mobilities as a function of electric field.

FIG. 13A is a graph that shows the mobility of a neutral particle, type B, and the mobility of a particle, type A, having a constant, positive polarity. A field arises due to application of a voltage to an image pixel that includes the particles.

Figures 13B, 13C:
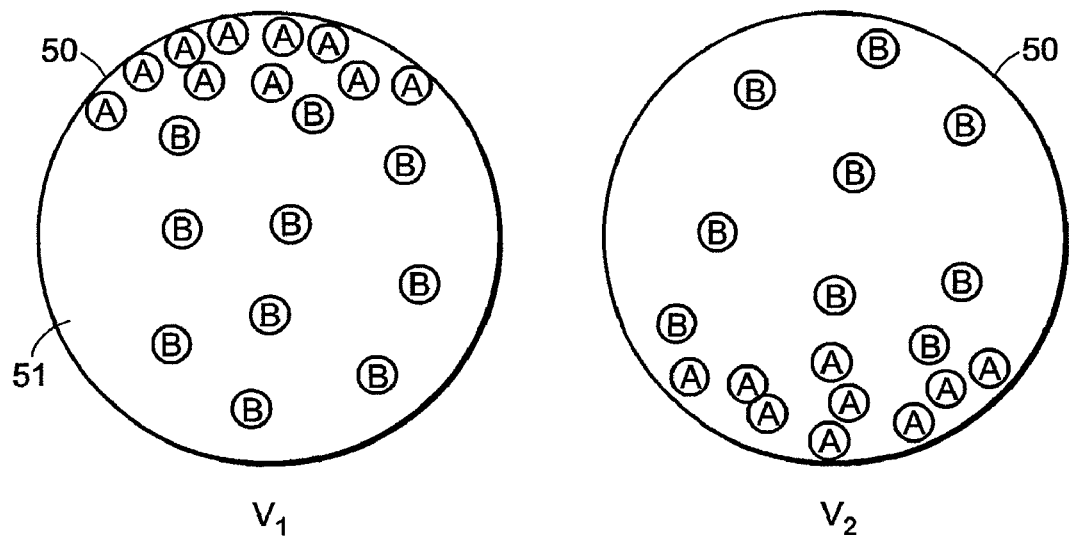
FIG. 13B illustrates the behavior of the particles of FIG. 13A, when a positive electric field is applied to the display medium.
FIG. 13C illustrates the behavior of the particles of FIG. 13A, when a negative electric field is applied to the display medium.

FIG. 13B illustrates the behavior of particles A and B when a positive voltage V1 is applied to a capsule 50 of the display medium. Particles A move upward, toward the viewing surface of the display. Particles B are not affected by the applied voltage. Hence, particles A determine the optical characteristic of the display.

FIG. 13C illustrates the behavior of the particles when a negative voltage V2 is applied to the pixel. Particles A are driven to the bottom surface of the capsule 50, while the neutral particles B are unaffected by the applied field. Hence, the optical characteristic of the capsule 50 is determined by the particles B, which are seen from the viewing surface. The particles B may also block a user's view of particles A.

With application of no voltage, the particles A and B may intermingle to produce a third, neutral image characteristic for the pixel. The particles A and B may be variously colored to enable the pixel to present various image characteristics. For example, A-type particles may be white, while B-type particles may be black. Alternatively, the particles may be colored.

Furthermore, the display medium may include a carrier medium 51, which may be transparent, translucent or opaque. The carrier medium 51 may be colored. Thus the carrier medium 51 may contribute to an optical characteristic of the pixel, in particular when no particles are clustered near the viewing surface. If it is desired that only particles A or B contribute to an optical characteristic of a pixel, the carrier medium 51 may be optically clear.

FIG. 14A is a graph that shows the mobility of a particle A having a constant, positive mobility, and a second particle B having a constant, though lower, positive mobility.

FIGS. 14B and 14C illustrate the behavior of the particles when, respectively, a positive voltage V1 or a negative voltage V2 is applied to the display medium.

Particles A move more rapidly than particles B, at any applied voltage. Hence, a positive voltage causes particles A to cluster towards a top surface prior to the arrival of particles B. Similarly, a negative voltage causes particles A to cluster towards a bottom surface prior to the arrival of particles B. Thus, at V1, particles A may be seen by a viewer of the display, while at V2, particles B may be seen. Particles A may then determine the optical characteristic of the pixel due to application of V1, and particles B may determine the optical characteristic due to application of voltage V2.

Again, when no voltage is applied to the pixel, the particles A and B may intermingle to produce a third, neutral optical characteristic for the pixel. For example, a neutral state may have a gray appearance if particles A are white and particles B are black.

Figure 15A:
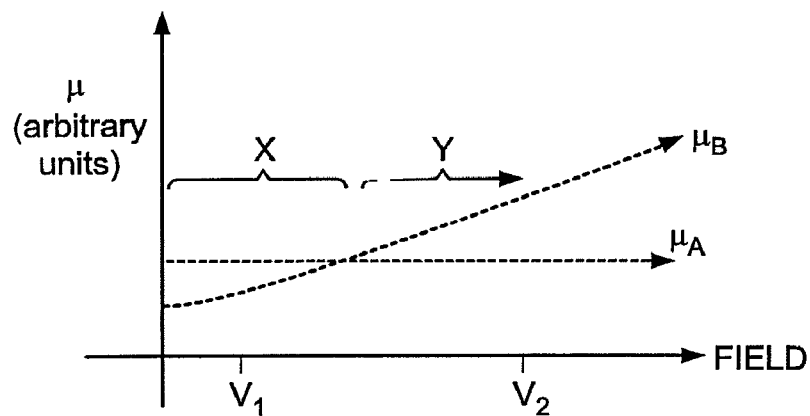
FIG. 15A is a graph of the mobility as a function of electric field of one particle having a constant, positive mobility, and of a second particle having a linearly increasing, positive mobility.

FIG. 15A is a graph that shows the mobility of a particle A having a constant, positive polarity, and a second particle B having a linearly increasing, positive mobility. The mobility of particles A is greater than the mobility of particles B over a lower voltage range, indicated by "X" in the graph. The mobility of particles A is lower than the mobility of particles B over a higher voltage range, indicated by "Y".

Figures 15B, 15C:
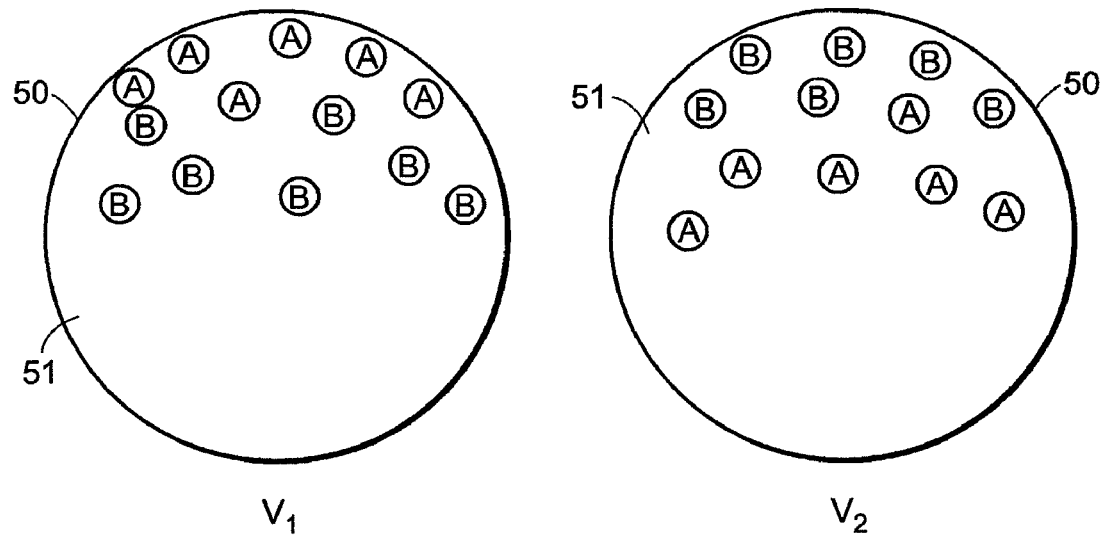
FIGS. 15B and 15C illustrate the behavior of the particles of FIG. 15A, when different voltages are applied.

FIGS. 15B and 15C illustrate the behavior of the particles shown in FIG. 15A when, respectively, a voltage V1 within range X, or a voltage V2 within range Y, is applied to the display medium.

Particles A move upward more rapidly than particles B, at V1. Particles A then cluster towards the top surface prior to the arrival of particles B. Application of V2 causes particles B to cluster towards the top surface prior to the arrival of particles A. Thus, at V1, particles A may be seen by a viewer of the display, while at V2, particles B may be seen. Particles A may then determine the optical characteristic of the pixel due to application of V1, and particles B may determine the optical characteristic due to application of voltage V2.

Negative voltages may be applied, as described with respect to FIG. 14, to vary the optical state.

Figure 16A:
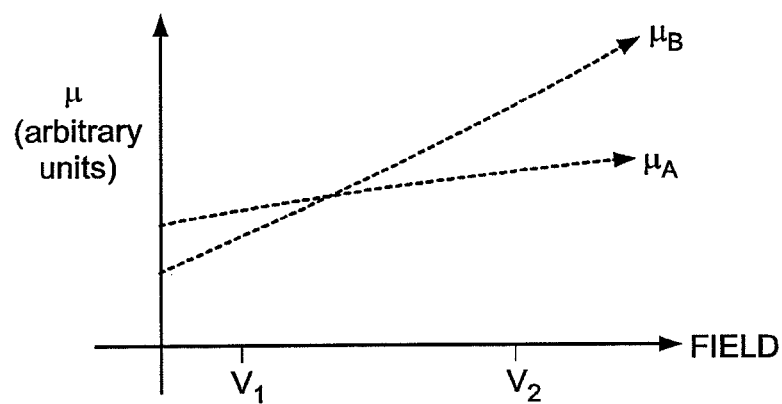
FIG. 16A is a graph of the mobility as a function of electric field of two particles, where both have a linearly increasing, positive mobility.

FIG. 16A is a graph that shows the mobility of particles A and particles B, where both types have a linearly increasing, positive mobility. At lower voltages, the mobility of particles A is greater than the mobility of particles B. At higher voltages, the mobility of particles A is lower than the mobility of particles B.

Figures 16B, 16C:
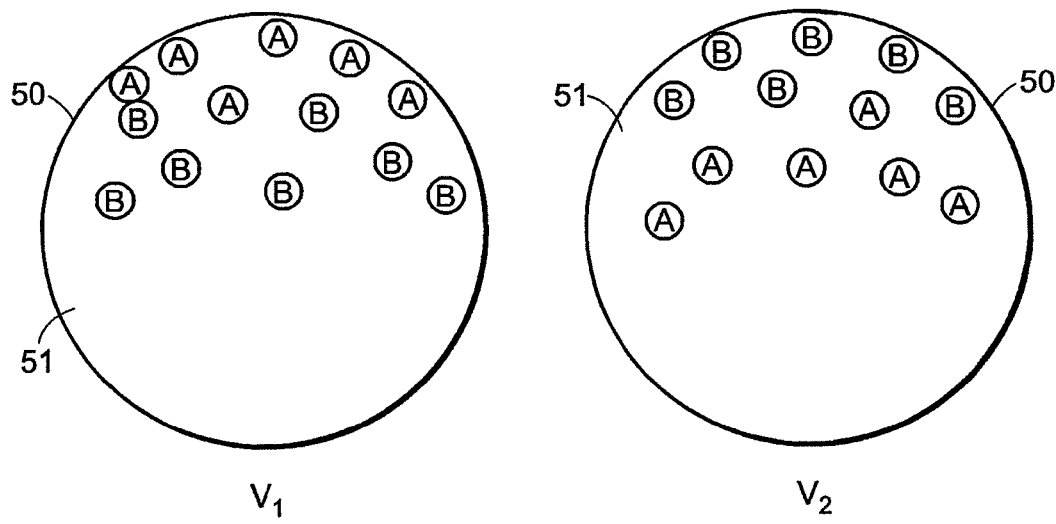
FIGS. 16B and 16C illustrate the behavior of the particles of FIG. 16A, when voltages are applied to a display medium.

FIGS. 16B and 16C illustrate the behavior of the particles shown in FIG. 15A when, respectively, a lower voltage V1 or a higher voltage V2 is applied to a display medium containing the particles.

Particles A move upward more rapidly than particles B, at V1. Particles A then cluster towards the top surface prior to the arrival of particles B. Application of V2 causes particles B to cluster towards the top surface prior to the arrival of particles A.

Thus, at V1, particles A may be seen by a viewer of the display, while at V2, particles B may be seen. Particles A may then determine the optical characteristic of the pixel due to application of V1, and particles B may determine the optical characteristic due to application of voltage V2.

Figure 17A:
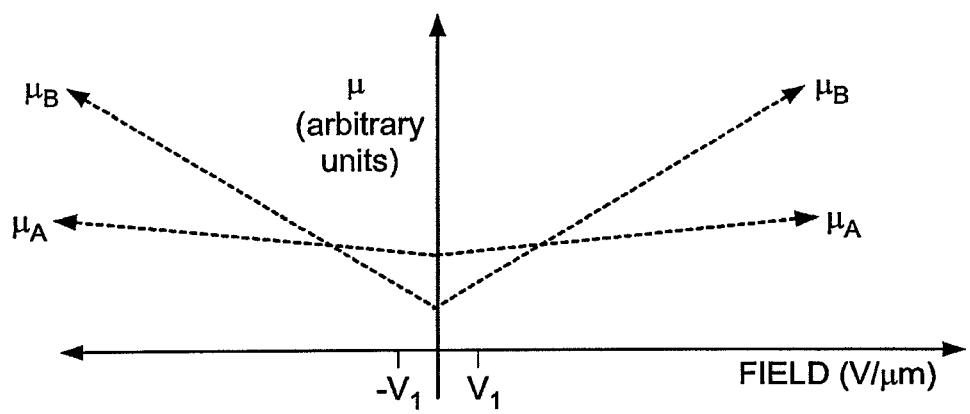
FIG. 17A is a graph of the mobility as a function of electric field of two particles, where both have a linearly increasing, positive mobility, similar to those illustrated in FIG. 16A.

FIG. 17A is a graph that shows the mobility of particles A and particles B, where both types have a linearly increasing, positive mobility, similar to the embodiment illustrated in FIGS. 16A to 16C. The mobilities of the particles at negative voltages are shown as a mirror image of the mobilities of the particles at positive voltages.

Figure 17B:
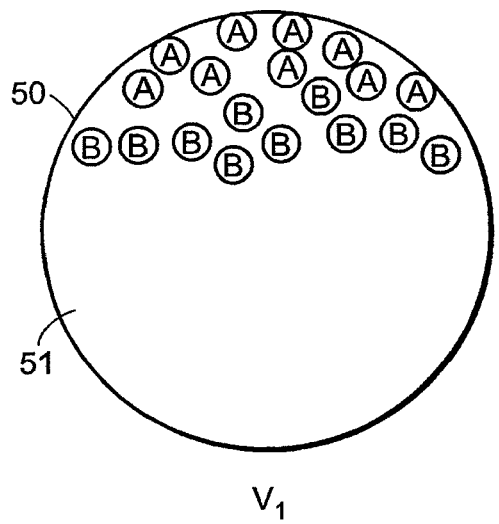
FIGS. 17B and 17C illustrate the behavior of the particles of FIG. 17A, when a positive voltage or a negative electric field respectively is applied.
Figure 17C:
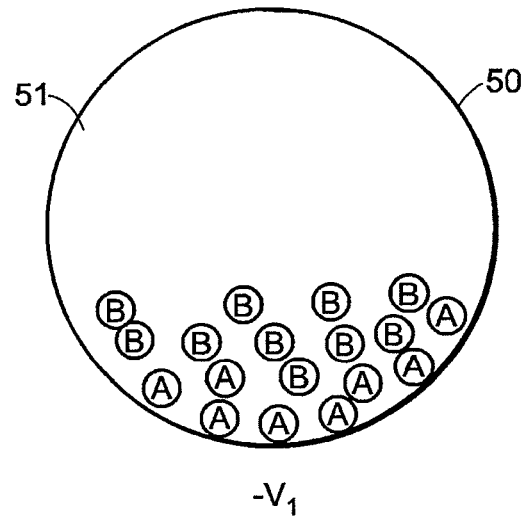

FIGS. 17B and 17C illustrate the behavior of the particles shown in FIG. 17A when, respectively, a positive voltage V1 is applied or when a negative voltage −V1 is applied. The voltage −V1 has the same magnitude as V1, though of opposite polarity.

Particles A move more rapidly than particles B, at both V1 and −V1. Only the direction of movement is affected by the polarity change of the applied, equal magnitude voltages.

At V1, particles A cluster towards the top surface prior to the arrival of particles B. Hence, particles A may dominate the optical characteristic of the display medium.

At −V1, particles A cluster towards the bottom surface prior to the arrival of particles B. Hence, particles B may then dominate the optical characteristic of the display medium.

Various other positive or negative polarity voltages may be applied to drive either A or B particles first to either the top or bottom surface. Further, a carrier medium 51 may contribute to a third optical characteristic of the display medium. For example, a colored or gray-level carrier medium 51 may dominate the appearance of the display medium when the particles are driven to the bottom surface, or when the particles are dispersed within the carrier medium 51.

Figure 18A:
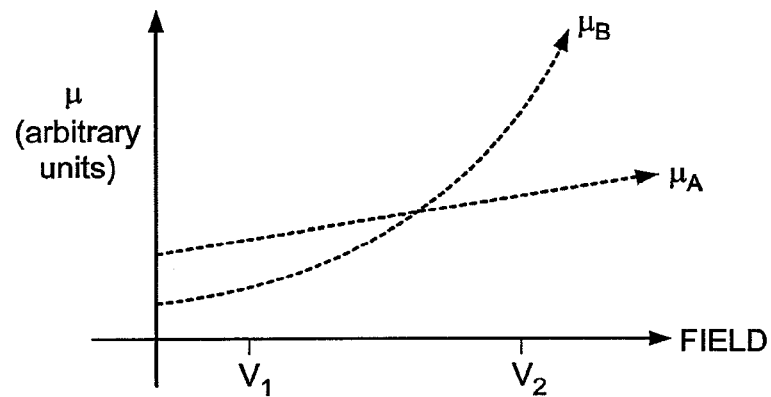
FIG. 18A is a graph of the mobility as a function of electric field of two types of particles.

FIG. 18A is a graph that shows the mobility of particles A and particles B. Particles A have a linearly increasing, positive mobility. Particles B have a non-linear, positive mobility, with the rate of increase of mobility increasing with increasing voltage. The mobility of particles A is greater than the mobility of particles B at lower voltages.

Figures 18B, 18C:
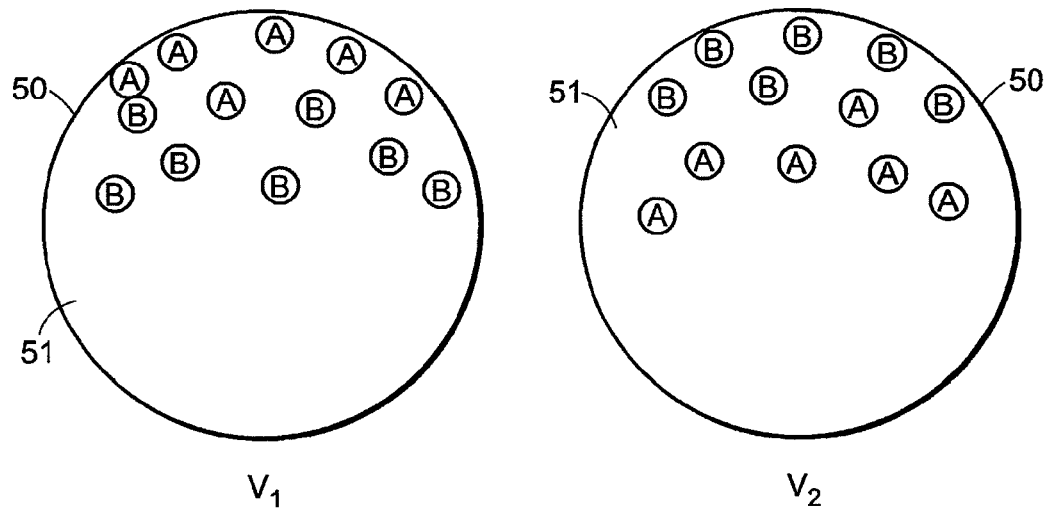
FIGS. 18B and 18C illustrate the behavior of the particles of FIG. 18A when, respectively, a lower electric field or a higher electric field is applied.

FIGS. 18B and 18C illustrate the behavior of the particles shown in FIG. 18A when, respectively, a lower voltage V1 is applied or when a higher voltage V2 is applied.

Particles A move upward more rapidly than particles B, at V1. Particles A then cluster towards the top surface prior to the arrival of particles B. Application of V2 causes particles B to cluster towards the top surface prior to the arrival of particles A.

Figure 19A:
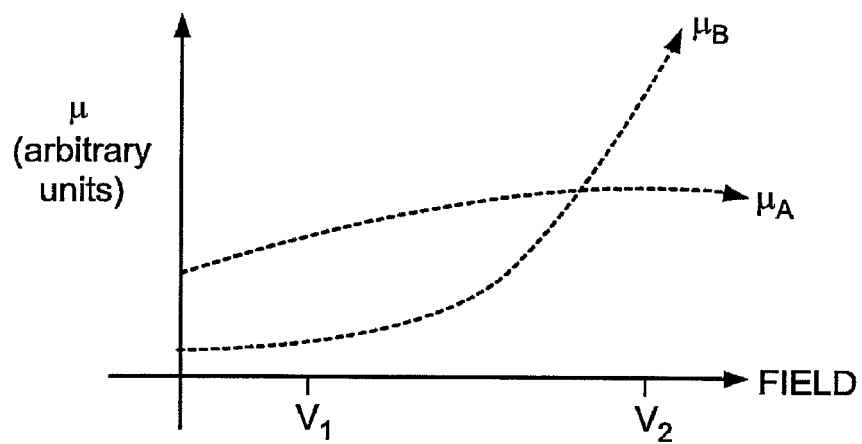
FIG. 19A is a graph of the mobility as a function of electric field of two particles.

FIG. 19A is a graph that shows the mobility of particles A and particles B. Particles A have a non-linear, increasing positive mobility, with the rate of increase of mobility decreasing at higher voltages. Particles B have a non-linear, positive mobility, with the rate of increase of mobility increasing at higher voltages. The mobility of particles A is greater than the mobility of particles B at lower voltages.

Figures 19B, 19C:
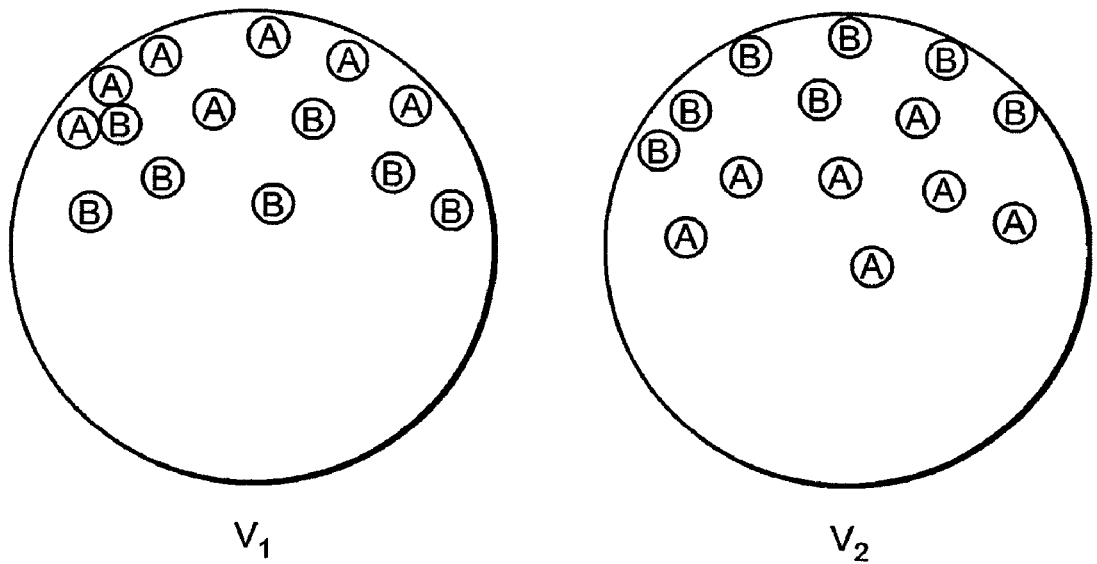
FIGS. 19B and 19C illustrate the behavior of the particles FIG. 19A when electric fields are applied.

FIGS. 19B and 19C illustrate the behavior of the particles shown in FIG. 19A when, respectively, a lower voltage V1 is applied or when a higher voltage V2 is applied.

Particles A move upward more rapidly than particles B, at V1. Particles A then cluster towards the top surface prior to the arrival of particles B. Application of V2 causes particles B to cluster towards the top surface prior to the arrival of particles A.

Figure 20A:
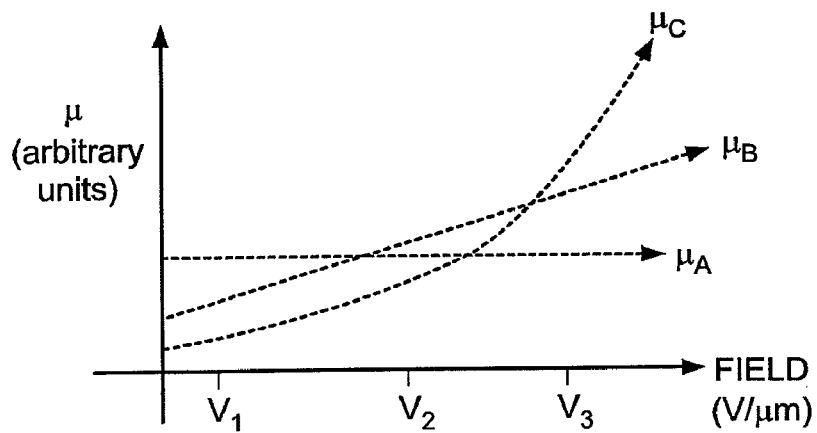
FIG. 20A is a graph of the mobility as a function of electric field of three types of particles.

FIG. 20A is a graph that shows the mobility of three types of particles, denoted A, B and C. Particles A have a constant, positive mobility. Particles B have a linearly increasing, positive mobility. Particles C have a non-linear, positive mobility. The mobility of particles A is greater than that of B and C at lower voltages. The mobility of particles B is greater than that of particles A and C at intermediate voltages, and the mobility of particles C is greatest at higher voltages.

Figures 20B, 20C:
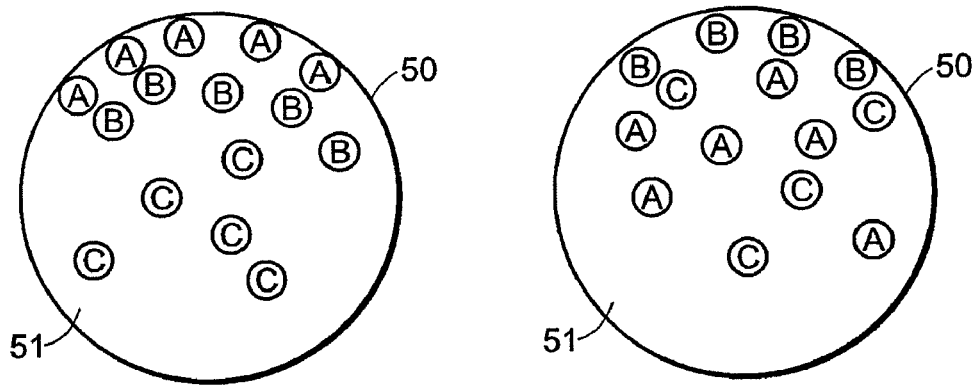
FIGS. 20B, 20C and 20D illustrate the behavior of the particles of FIG. 20A when electric fields are applied to a display medium.
Figure 20D:
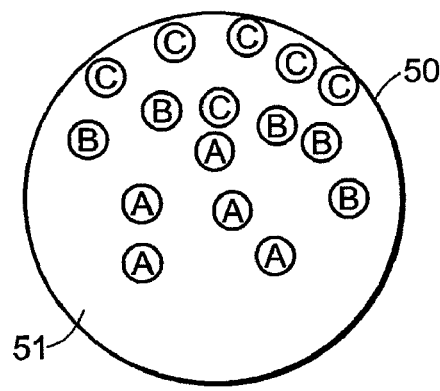

FIGS. 20B, 20C and 20D illustrate the behavior of the particles shown in FIG. 20A when, respectively, a lower voltage V1, an intermediate voltage V2 or a higher voltage V3 is applied.

Particles A move upward most rapidly of the three particle types when V1 is applied. Particles A then cluster towards the top surface prior to the arrival of particles B and C. Thus, particles A may dominate the optical state at lower applied voltages.

Application of V2 causes particles B to cluster towards the top surface prior to the arrival of particles A and C. Particles B may dominate the optical state at intermediate applied voltages.

Application of V3 causes particles C to cluster towards the top surface prior to the arrival of particles A and B. Particles C may dominate the optical state at higher applied voltages.

The different particle types may have different colors and/or gray-levels to enable the display of color and/or gray levels by an image pixel. For example, particles A, B and C may respectively be red, green and blue to enable a color display. Thus, a single pixel, addressed by a single voltage, at any one time, may display a variety of colors or gray levels.

A carrier medium 51 may be included, and provided with an optical characteristic to dominate the appearance of an image pixel when particles A, B and C are dispersed or driven towards the bottom surface. For example, the carrier medium 51 may be black to provide a black "off" state for the image pixel. Alternatively, the carrier medium 51 may have a color to enable the display of a fourth color by an image pixel.

Alternatively, the particles may be addressed with a voltage at which two or more sets of particles have an equal or similar mobility. The appearance of the image pixel may then be dominated by a combination of the two or more particle types appearing at the surface of the pixel. This technique may provide a color and/or a gray level not provided alone by any one particle type, or by the carrier medium 51, in the image pixel.

Figure 21A:
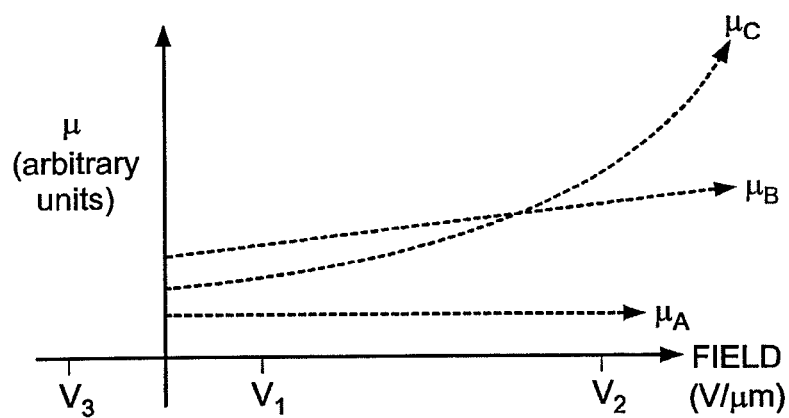
FIG. 21A is a graph of the mobility as a function of electric field of three types of particles.

FIG. 21A is a graph that shows the mobility of three types of particles, denoted A, B and C. Particles B have a linearly increasing, positive mobility. Particles C have a non-linear, positive mobility. Particles A have a constant, positive mobility, which is less than the mobility of particles A and B at all voltages. The mobility of particles B is greater than that of particles C at lower voltages, and the mobility of particles C is greatest at higher voltages.

Figure 21B:
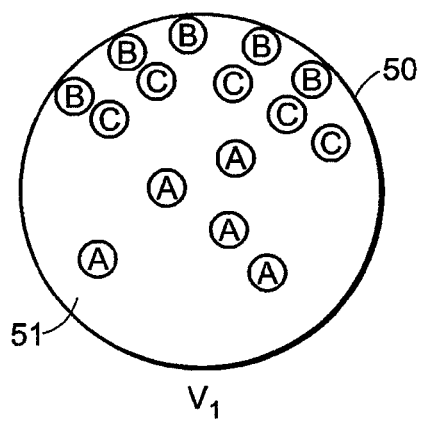
FIGS. 21B, 21C and 21D illustrate the behavior of the particles of FIG. 21A in response to the application of different electric fields.
Figure 21C:
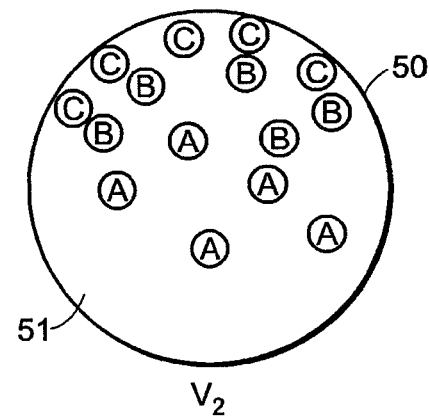
Figure 21D:
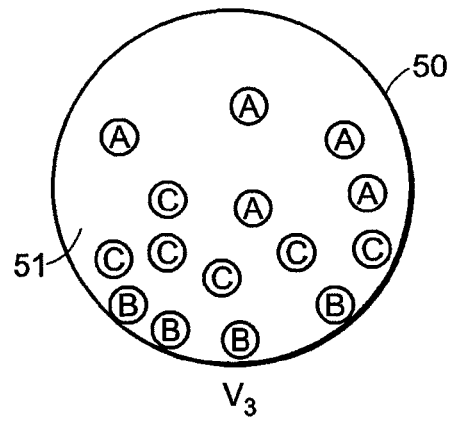

FIGS. 21B, 21C and 21D illustrate the behavior of the particles shown in FIG. 21A when, respectively, a lower positive voltage V1, a higher positive voltage V2 or a negative voltage V3 is applied.

Particles B move upward most rapidly of the three particle types when V1 is applied. Particles B then cluster towards the top surface prior to the arrival of particles A and C. Thus, particles B may dominate the optical state at lower applied voltages.

Application of V2 causes particles C to cluster towards the top surface prior to the arrival of particles A and B. Particles C may dominate the optical state at intermediate applied voltages.

Application of negative voltage V3 causes all particle types A, B and C to migrate toward the bottom surface of, for example, capsule 50. Particles B and C move most rapidly towards the bottom surface. Thus, lagging particles C dominate the optical characteristic of the image pixel because they are observed from the viewing surface.

The different particle types may have different colors and/or gray levels to enable the display of color and/or gray levels by an image pixel. A carrier medium 51 may be included, and provided with an optical characteristic to dominate the appearance of an image pixel when particles A, B and C are dispersed or driven towards the bottom surface.

Figure 22A:
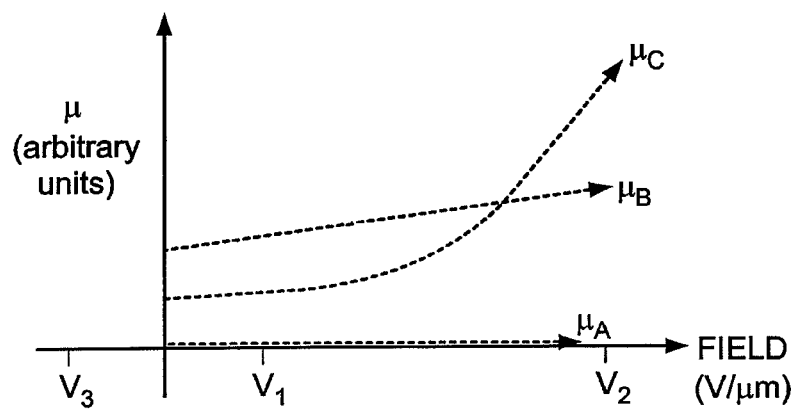
FIG. 22A is a graph of the mobility as a function of electric field of three types of particles.

FIG. 22A is a graph that shows the mobility of three types of particles, denoted A, B and C. Particles B have a linearly increasing, positive mobility. Particles C have a non-linear, positive mobility. Particles A have a constant, zero mobility, i.e., particles A are charge-neutral. The mobility of particles B is greater than that of particles C at lower voltages, and the mobility of particles C is greatest at higher voltages.

Figure 22B:
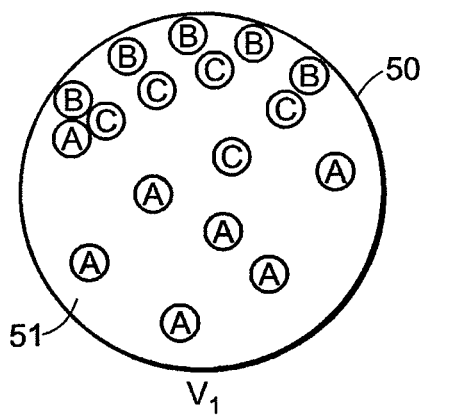
FIGS. 22B, 22C and 22D illustrate the behavior of the particles of FIG. 22A in response to the application of different electric fields.
Figure 22C:
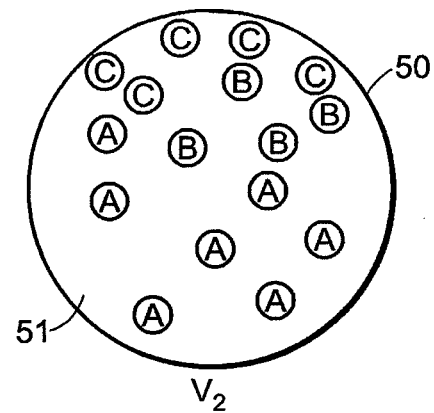
Figure 22D:
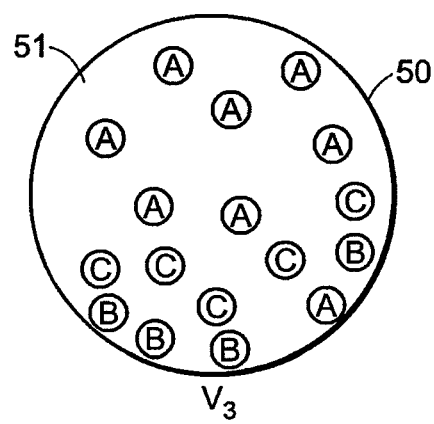

FIGS. 22B, 22C and 22D illustrate the behavior of the particles shown in FIG. 22A when, respectively, a lower positive voltage V1, a higher positive voltage V2 or a negative voltage V3 is applied.

Particles B move upward when V1 is applied. Particles B then cluster towards the top surface prior to the arrival of particles C. Particles A are unaffected by application of a voltage. They remain, for example, dispersed throughout the display medium. Thus, particles B may dominate the optical state at lower applied positive voltages.

Application of V2 causes particles C to cluster towards the top surface prior to the arrival of particles B. Particles C may then dominate the optical state at higher applied positive voltages.

Application of negative voltage V3 causes particle types B and C to migrate toward the bottom surface of a image pixel. Particles A may remain dispersed in the display medium. Thus, particles A may dominate the optical characteristic of the image pixel because they may be observed from the viewing surface, and shield the view of particles B and C.

Figure 23A:
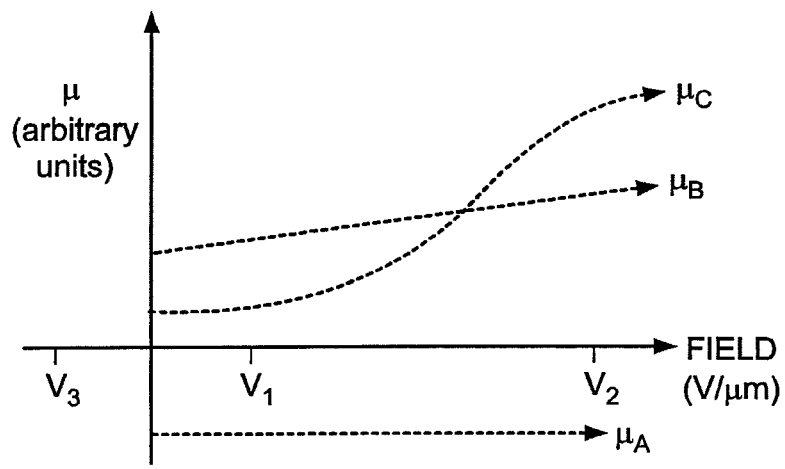
FIG. 23A is a graph of the mobility as a function of electric field of three types of particles.

FIG. 23A is a graph that shows the mobility of three types of particles, denoted A, B and C. Particles B have a linearly increasing, positive mobility. Particles C have a non-linear, positive mobility. Particles A have a constant, negative mobility. The mobility of particles B is greater than that of particles C at lower voltages, and the mobility of particles C is greater than that of particles B at higher voltages. Particles A move in a direction opposite to that of particles B and C in response to the application of an electric field.

Figure 23B:
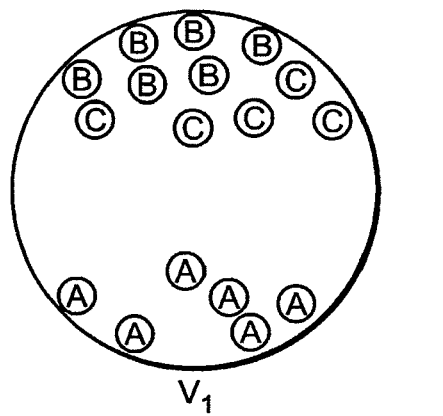
FIGS. 23B, 23C and 23D illustrate the behavior of the particles of FIG. 23A in response to the application of different electric fields.
Figure 23C:
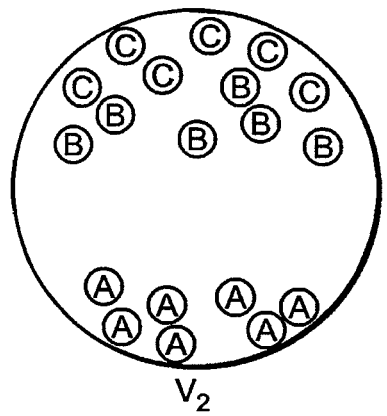
Figure 23D:
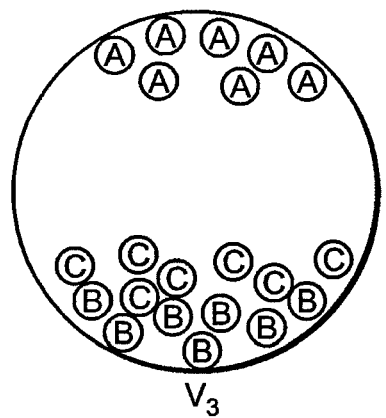

FIGS. 23B, 23C and 23D illustrate the behavior of the particles shown in FIG. 23A when, respectively, a lower positive voltage V1, a higher positive voltage V2 or a negative voltage V3 is applied.

Particles B move upward when V1 is applied. Particles B then cluster towards the top surface prior to the arrival of particles C. Particles A move toward the bottom surface. Thus, particles B may dominate the optical state at lower applied positive voltages.

Application of V2 causes particles C to cluster towards the top surface prior to the arrival of particles B. Particles C may then dominate the optical state at higher applied positive voltages. Particles A again move downward, away from the viewing surface.

Application of negative voltage V3 causes particle types B and C to migrate toward the bottom surface of an image pixel. Particles A move toward the viewing surface, and cluster near the top of the display medium. Thus, particles A may dominate the optical characteristic of the image pixel.

Figure 24A:
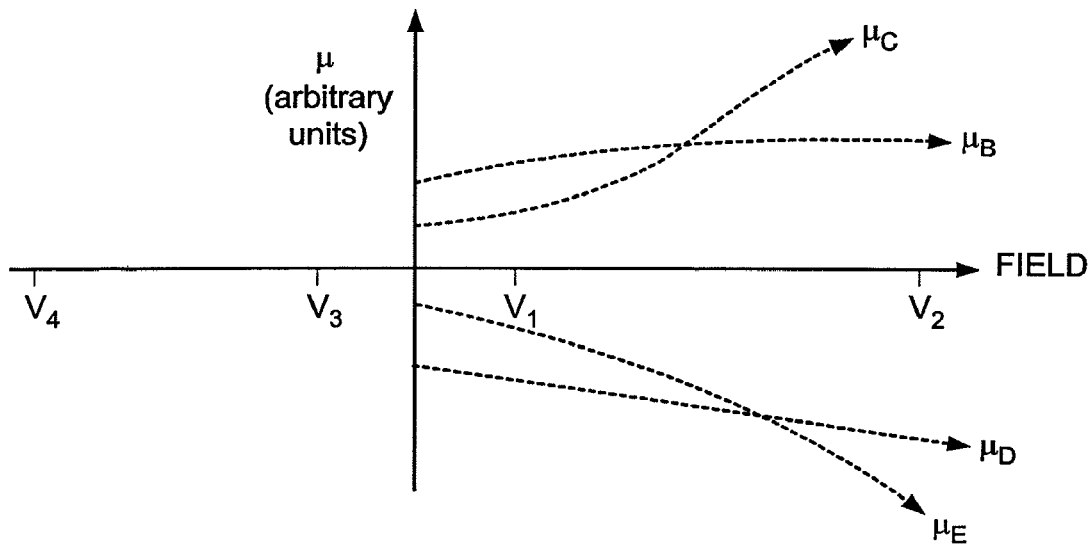
FIG. 24A is a graph of the mobility as a function of electric field of four types of particles.
Figure 24B:
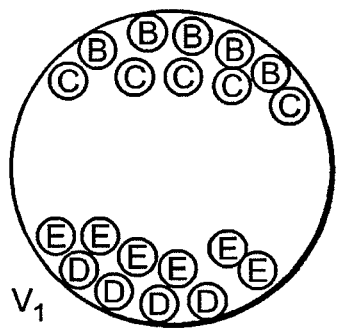
FIGS. 24B to 24E illustrate the behavior of particles of FIG. 24A in response to the application of positive and negative polarity electric fields.
Figure 24C:
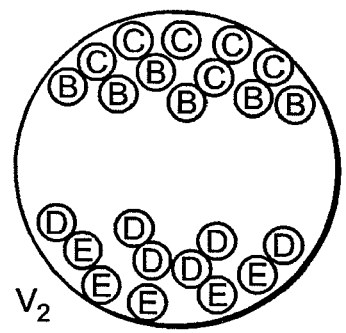
Figure 24D:
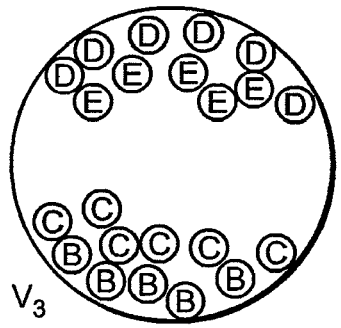
Figure 24E:
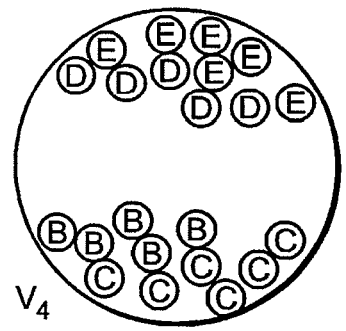

FIG. 24A is a graph that shows the mobility of four types of particles B, C, D and E, all included in a single display medium within an image element. Particles B and C have non-linear, increasing positive mobilities. Particles D and E have non-linear, negative mobilities of increasing magnitude. The mobility of particles B is greater than the mobility of particles C at lower voltages. The magnitude of the mobility of particles D is greater than the magnitude of the mobility of particles E at lower magnitude voltages.

FIGS. 24B to 24E illustrate the behavior of the particles shown in FIG. 24A when, respectively, a lower positive voltage V1, a higher positive voltage V2, a smaller negative voltage V3 or a larger negative voltage V4 is applied.

Particles B move upward more rapidly than particles C, at V1, while particles C move more rapidly at V2. Particles D and E move downward at these positive voltages. Conversely, particles D move upward more rapidly than particles E, at V3, while particles E move upward more rapidly at V4. Particles B and C move downward at these negative voltages.

Hence, at voltages V1, V2, V3 and V4, particles B, C, D and E respectively cluster at an upper surface and may dominate the appearance of an image pixel that includes the display medium.

Use of four particle types, each type having a different color, enables, for example, a four-color image pixel. As described for other embodiments, a colored carrier medium 51 may provide another color. Furthermore, combinations of particles clustered toward the viewing surface may enable the display of still other colors by a single image pixel. Alternative embodiments include particles colored black or white, or an intermediate shade of gray.

Some embodiments of a display medium include particles formed from pigment having a charge that varies with applied electric field. The following describes three exemplary pigment dispersion systems, for which two have a mobility magnitude that increases with increasing field, and one that has a mobility that is independent of the field.

Mobility may be expressed as:

$$\mu = \nu \vec{E}$$

where $\nu$ is the electrophoretic velocity as discussed earlier and $\vec{E}$ is the applied electric field. A measure of the pigment mobility can be obtained in one of several ways. Though mobility can be measured directly, direct measurement may not be simple for non-polar media, such as the non-polar media discussed here. For example, mobility can also be calculated from a measured value of the charge-to-mass ratio, Q/M, of the particles or from a measured value of the difference in conductivity of the dispersion, $\lambda$, and its serum, $\lambda_0$. The relationship of the mobility to zeta potential, charge-to-mass ratio, and conductivity is discussed in Morrison, I. D. and Tarnawskyj, C. J., Langmuir 1991, 7, 2358.

In the non-polar systems discussed here, the mobility, $\mu$, is related to the zeta potential by:

$$\mu = \frac{2\varepsilon_r \varepsilon_0 \zeta}{3\eta} \tag{12}$$

Given the charge-to-mass ratio, the mobility is given by:

$$\mu = \frac{2\varepsilon_r \varepsilon_0 \zeta}{3\eta} \tag{13}$$

Given the conductivity of the dispersion and its serum, the mobility is given by:

$$\mu = \left(\frac{\rho_p d_p^2}{18\eta \rho_{sl} w_p}\right)^{\frac{1}{2}} \sqrt{\lambda - \lambda_0} \tag{14}$$

Figure 25:
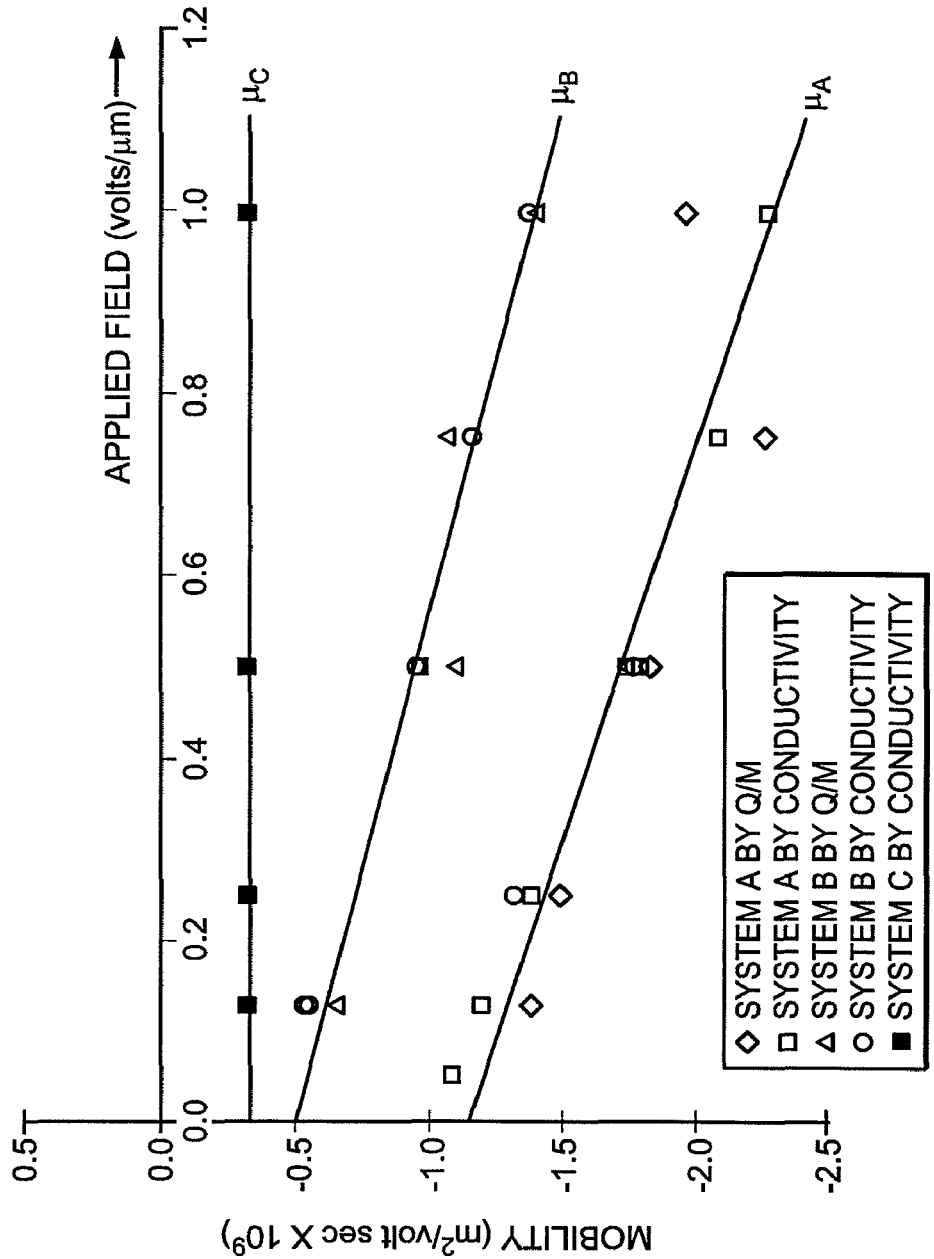
FIG. 25 is a graph of particle mobility as a function of applied electric field for three exemplary pigment systems.

FIG. 25 is a graph of pigment mobility versus applied field for the three exemplary pigment systems. The curve labeled as $\mu_A$ illustrates the behavior of the mobility of the particles in System A. The mobility values for this curve were obtained either by measuring the charge-to-mass ratio, Q/M, and calculating the mobility with Equation (13), or by measuring the conductivities of the dispersion and fluid and calculating the mobility with Equation (14). System A was prepared by dispersing TI-PURE R-104 (an organosilane treated TiO$_2$ from E. I. du Pont de Nemours Company) in a solution of OLOA 371 and SPAN 85 in a 1:1 mixture by weight of ISOPAR G and HALOCARBON 1.8.

A second system, System B, was prepared by dispersing an organosilane treated, silica clad TiO$_2$ in the same fluid as System A. Again, the mobility values were calculated using Equation (13) or (14) with measured values of Q/M or conductivity respectively. The curve labeled as PB shows that these particles have a lower, though still increasing, mobility magnitude in comparison to the particles in System A.

The third system, System C, was prepared by dispersing a pigment (an organosilane treated, silica clad TiO$_2$ with a polymer shell) in a solution of SOLSPERSE 17000 (Avecia, Inc., Wilmington, Del.) and SPAN 85 in a 1:1 mixture by weight of ISOPAR G and HALOCARBON 1.8. The curve labeled as $\mu_C$ shows that these particles have a constant, negative polarity mobility over the range of fields applied.

IX. Filler Particles for Display Control, Stability and Color

In some embodiments of the present invention, the capsules of the electrophoretic display media further include filler particles. The use of filler particles may provide improved control over: (1) the range of colors available from the electrophoretic display element; (2) the migration of the electrophoretic particles; (3) the bistability of the electrophoretic display; and (4) the threshold addressing of the electrophoretic display. The filler particles may serve as a barrier to electrophoretic particle migration during switching between optical states of the electrophoretic display, may serve to hide the electrophoretic particles in certain display states and may interact with the electrophoretic particles to improve bistability and provide a threshold for switching.

Figure 26A:
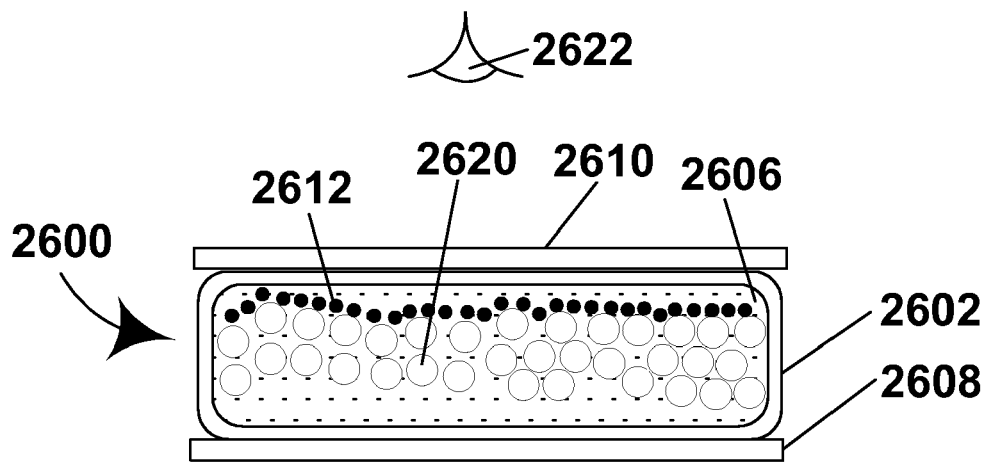
FIG. 26A shows an electrophoretic display element comprising a sticky particles medium of the present invention.

FIG. 26A of the accompanying drawings illustrates one electrophoretic display element of a sticky particles display of the present invention using filler particles. The display element comprises a capsule 2600 having a capsule wall 2602. A fluid 2606 (also referred to as a suspending medium, carrier medium, or carrier fluid) is contained within the capsule 2600. Electrophoretic particles 2612 and a filler particles 2620 are suspended in the fluid 2606. The filler particles 2620 may have substantially zero electrophoretic mobility and not respond significantly to application of an electric field. Hence, when an electric field is applied to the capsule, for example using electrodes 2608 and 2610, the filler particles 2620 remain substantially stationary while the electrophoretic particles 2612 will migrate in response to the applied field.

(In FIG. 26A, the capsule 2600 is illustrated as being of substantially prismatic form, having a width (parallel to the planes of the electrodes 2608 and 2610) significantly greater than its height (perpendicular to these planes). This prismatic shape of the capsule 2600 is deliberate. If the capsule 2600 were essentially spherical, in the optical state shown in FIG. 26A, the electrophoretic particles 2612 would tend to gather in the highest part of the capsule, in a limited area centered directly above the center of the capsule. The color seen by the observer would then be essentially the average of the color of the central area occupied by the particles 2612 and the color of an annulus surrounding this central area, where the suspending medium 2606 and/or the filler particles 2620 would be visible. Thus, if the particles 2612 were black and the medium 2606 and filler particles 2620 white, in the supposedly black state shown in FIG. 26A, the observer 2622 would see a grayish color rather than a pure black, and the contrast between the two extreme optical states of the pixel would be correspondingly limited. In contrast, with the prismatic form of microcapsule shown in FIG. 26A, the electrophoretic particles 2612 cover essentially the entire cross-section of the capsule so that no, or at least very little white fluid or filler particles is visible, and the contrast between the extreme optical states of the capsule is enhanced. For further discussion on this point, and on the desirability of achieving close-packing of the capsules within the electrophoretic layer, the reader is referred to the aforementioned U.S. Pat. No. 6,067,185.)

As described above, in some cases, encapsulation by a capsule wall is not necessary to form an encapsulated electrophoretic display of the present invention. The electrophoretic fluid ("internal phase") comprising the electrophoretic particles 2612 and the filler particles 2620 suspended in the fluid 2606 may be directly dispersed or emulsified into the binder (or a precursor thereto) to form what may be called a "polymer-dispersed electrophoretic display." In such displays, the internal phase forms a discontinuous phase comprising a plurality of droplets dispersed in a continuous phase formed by the binder, and the individual droplets of internal phase may be considered to be capsules or microcapsules even though no capsule membrane or wall is present. The polymer-dispersed electrophoretic display may be of the emulsion or phase separation type.

In an encapsulated electrophoretic display of the discrete capsule type such as that shown in FIG. 26A, desirably a binder material surrounds the capsules 2600 and separates the electrodes 2608 and 2610. Preferably, the binder material possesses properties that allow for facile printing or coating. The binder material may also possess barrier properties for water, oxygen, ultraviolet light, the fluid 2606, or other materials. Further, the binder material may contain surfactants and cross-linking agents, which aid in coating or durability.

The filler particles 2620 shown in FIG. 26A may be replaced by other structured and unstructured media, for example, a gelled medium, including functionalized polymers and floc networks; the filler particles 2620 may also be made from a variety of materials, including for example silica, polystyrene, and metal particles. In one embodiment, the filler particles 2620 are replaced by a gel, for example, a floc structure composed of structure-forming particles that have a net zero charge, which are different particles from the electrophoretic (pigment) particles. The structure-forming particles flocculate to form the gel but do not translate in response to an applied electric field. As discussed above, such a network of structure-forming particles reforms quickly after being broken down by the shearing action of the electrophoretic particles passing through it. When filler particles such as those shown in FIG. 26A are used, the electrophoretic particles 2612 may be attracted to the filler particles 2620, although as explained below the electrophoretic particles may also be repelled by the filler particles. As explained above, preferably the filler particles are about an order of magnitude larger than the electrophoretic particles (the size of the electrophoretic particles 2612 is exaggerated in FIG. 26A relative to the size of the filler particles 2602 for ease of illustration, and indeed for the same reason the sizes of both the electrophoretic particles 2612 and the filler particles 2620 are exaggerated in this Figure relative to the size of the capsule 2600), although smaller filler particles (say from about 4 to about 6 times the average size of the electrophoretic particles) may be useful when the filler particles are not closely packed and/or are non-spherical. Since electrophoretic particles may have average sizes ranging from less than 100 nm (in the case of finely divided carbon black) up to (say) 2 μm in the case of some pigment particles, the average size of the filler particles may range from about 0.5 to about 20 μm, preferably from about 1 to about 15 μm. Although FIG. 12A illustrates substantially spherical filler particles, the filler particles may have a wide range of shapes including, but not limited to, spherical, ellipsoidal, and irregular shapes.

In the sticky particles displays of the present invention, the essential function of the filler particles is to provide resistance to migration of the electrophoretic particles. The amount of migration resistance provided by the filler particles may be selected to achieve several different objectives. As mentioned above, the use of filler particles may provide an improvement in the bistability of the displays, the resistance provided by the filler particles being used to overcome, for example, the tendency of the electrophoretic particles to migrate due to Brownian motion or stray electric fields.

The resistance to the migration of electrophoretic particles provided by filler particles may also be used to improve threshold addressing of electrophoretic displays. The resistance to migration can require a threshold electric field value to be exceeded to overcome the resistance before the electrophoretic particles can migrate through or around the filler particles. Accordingly, a electric field weaker than the threshold value is unable to cause the electrophoretic particles to migrate. Such control of threshold addressing through controlled migration resistance may help maintain bistability when the electrophoretic display element is used in areas where stray electric fields may be present. Migration resistance provided by the filler particles may also be used to inhibit settling of the electrophoretic particles. Inhibition of settling facilitates sustaining a more durable, uniform, and/or long-lasting visual appearance.

The characteristics of the filler particles, such as their average size, optical density and volume fraction in the capsule, can be used to control the amount of resistance provided to the migration of the electrophoretic particles. Importantly, the amount of resistance provided by the filler particles can also be varied by controlling attraction or repulsion between the filler particles and the electrophoretic particles. For example, in the display element shown in FIG. 26A, the electrophoretic particles 2612 may be attracted to the filler particles 2620. This attraction will, when the display is in the state shown in FIG. 26A, cause the electrophoretic particles to form a layer of one side (the upper side as illustrated) of the filler particles. When an electric field is applied to the display element, the electrophoretic particles will not migrate until the field is strong enough to cause the forces imposed on the electrophoretic particles to be greater than the attractive forces between the electrophoretic particles and the filler particles, thus creating a threshold for switching of the display. Obviously, the size of this threshold is a function of the attraction between the electrophoretic particles and the filler particles.

Conversely, if the electrophoretic particles are repelled by the filler particles, a threshold is also created for migration of the electrophoretic particles, but by a different mechanism. In this case, in the display element shown in FIG. 26A, the electrophoretic particles 2612 will tend to stay spaced from the filler particles 2620 and will form a layer along part of the capsule wall (the part of the wall adjacent electrode 2610, as illustrated). When an electric field is applied to the display element, the electrophoretic particles will tend to migrate but will not pass between the filler particles until the field is strong enough to cause the forces imposed on the electrophoretic particles to be greater than the repulsive forces between the electrophoretic particles and the filler particles, thus creating a threshold for switching of the display. Obviously, the size of this threshold is a function of the repulsion between the electrophoretic particles and the filler particles.

Figure 26B:
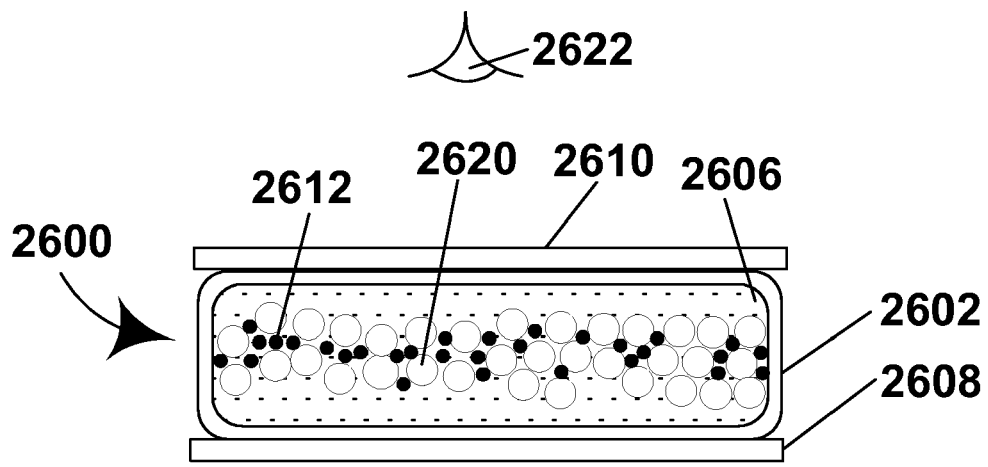
FIGS. 26B and 26C show the electrophoretic display element of FIG. 26A but with the electrophoretic particles in different positions.
Figure 26C:
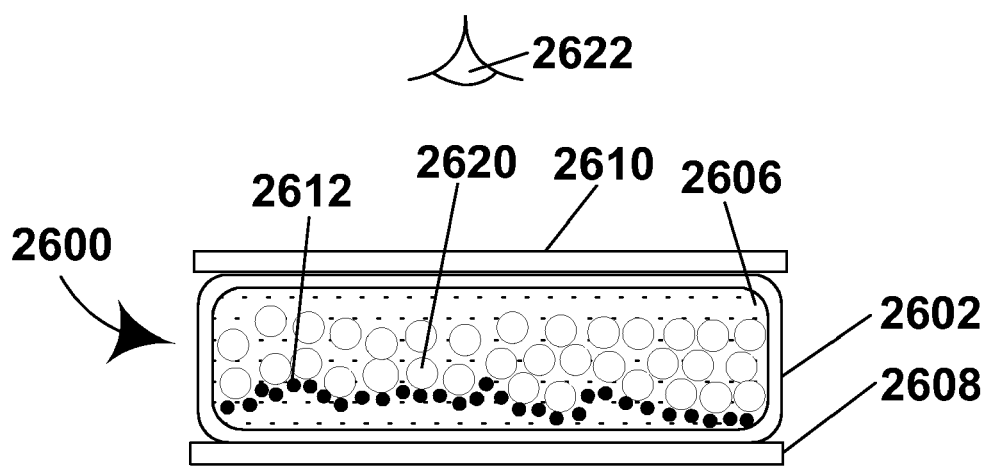

The electro-optic properties of the display element shown in FIG. 26A will now be considered with reference to FIGS. 26A, 26B and 26C. The components of the electrophoretic display element, such as the fluid 2606, the electrophoretic particles 2612, and the filler particles 2620 each have an optical property. For example, the optical property can be a color, luminescence, light-absorption, or transparency. The optical property of each component can be different, or the optical properties of two or more of the components may be the same.

In one form of the display element shown in FIG. 26A, the electrophoretic particles 2612 have a first color, the filler particles 2620 have a second color, and the fluid 2606 is colorless and transparent. When the electrophoretic particles 2612 lie adjacent the electrode 2610 (which forms the viewing surface through which the element is intended to be viewed as indicated schematically by the eye of an observer 2622 in FIG. 26A), the display element displays the first color of the electrophoretic particles 2612. The intensity of a color palette, including the number of reproducible grayscale tone values, is controlled by controlling the amount of electrophoretic particles visible through the viewing surface of the display. FIG. 26B illustrates the state of the display elements shown in FIG. 26A after application of an electric field to the electrophoretic display element for a period such that the electrophoretic particles 2612 are stopped among the filler particles 2620 so that the electrophoretic display element displays a color which is a blend of the first color of the electrophoretic particles 2612 and the second color of the filler particles 2620. FIG. 26C illustrates the situation in which the electric field has been applied for a longer period than in FIG. 26B, so that the electrophoretic particles 2612 have essentially passed completely through the filler particles 2620. In this situation, the observer 2622 sees only the filler particles 2620, and the display elements displays the second color of these filler particles, since the filler particles 2620 are interposed between the electrophoretic particles 2612 and the observer 2622.

In another form of the display element shown in FIGS. 26A to 26C, the fluid 2606 has a third color. This form of the display element displays the first color of the electrophoretic particles 2612 when these particles are in the position shown in FIG. 26A, the third color of the fluid when the electrophoretic particles are in the position shown in FIG. 26C, and an intermediate (blended) color when the electrophoretic particles are in the position shown in FIG. 26B. In this form of the invention, the filler particles 2620 are desirably white or substantially white in order to (in effect) provide a white reflector which enhances the color of the fluid seen in the situation shown in FIG. 26C.

Figure 27:
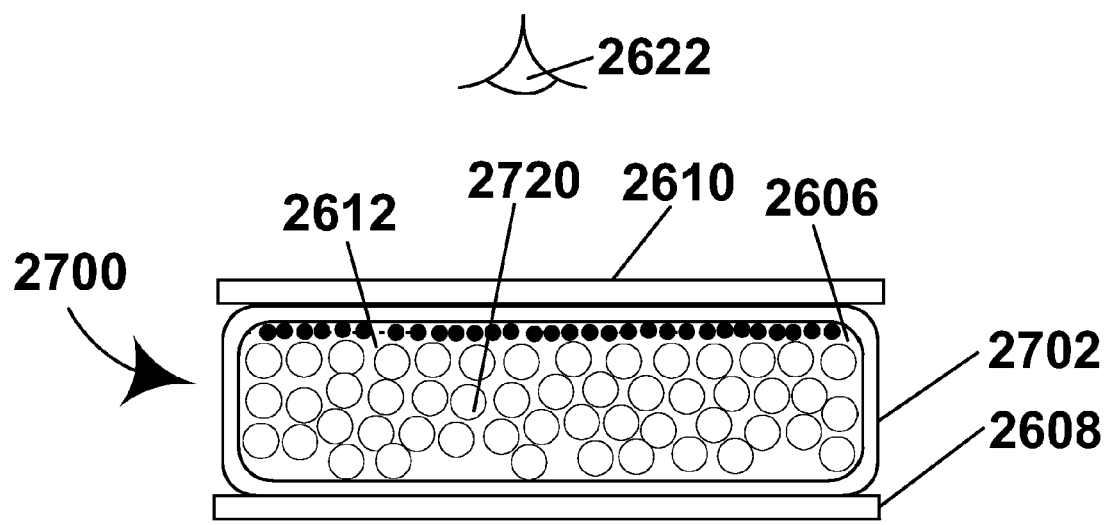
FIG. 27 shows a variant of the element of FIG. 26A using a gaseous fluid.

FIG. 27 illustrates a variant of the display element shown in FIGS. 26A to 26C using a gaseous fluid rather than a liquid one; this gaseous fluid may be at atmospheric. super-atmospheric or sub-atmospheric pressure, and in the last case the pressure of the gaseous fluid may approach zero. In FIG. 27, the display element comprises a capsule 2700 having a capsule wall 2702 and containing electrophoretic particles 2612 identical to those previously described. However, a substantial fraction (say more than 35 percent by volume) of the capsule 2700 is filled with filler particles 2720. The filler particles 2720 may approach a close packed condition within the capsule 2700. When an electric field is applied to the capsule 2700 using electrodes 2608 and 2610, the electrophoretic particles 2612 migrate through the filler particles 2720 in response to the electric field. The filler particles 2720 may be displaced by the electrophoretic particles 2712, as the latter migrate.

Figure 28A:
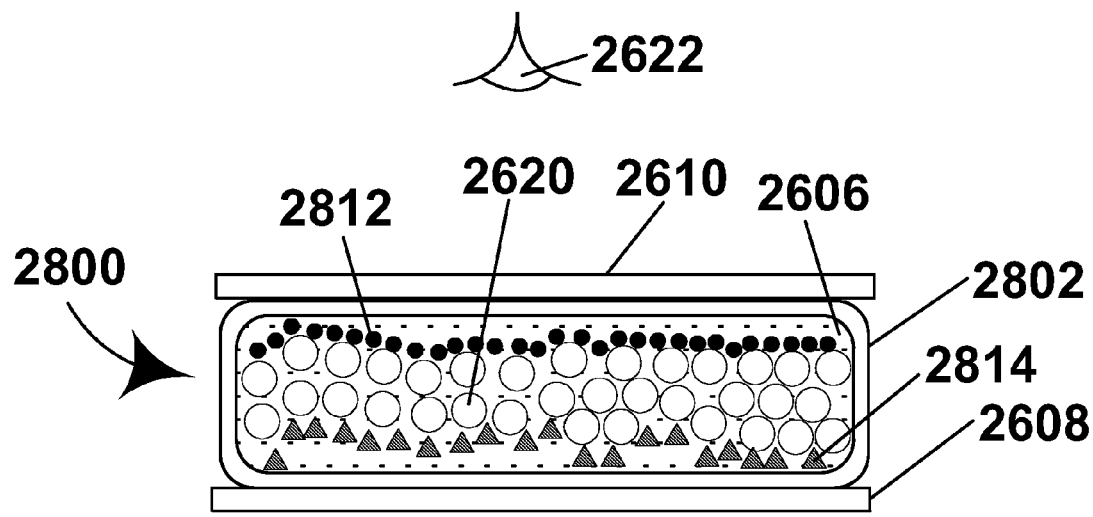
FIG. 28A shows an electrophoretic display element comprising a sticky particles medium of the present invention containing two types of electrophoretic particles.

FIG. 28A illustrates another sticky particles display element of the present invention, this display element comprising a capsule (generally designated 2800) comprising a capsule wall 2802, a fluid 2606 and filler particles 2620, and electrodes 2608 and 2610, all of which are essentially identical the corresponding integers in FIG. 26A. The capsule 2800 also comprises a first species of electrophoretic particles 2812 (which may be identical to the particles 2612 shown in FIG. 26A). However, the capsule 2800 further comprises a second species of electrophoretic particles 2814. (The triangular shape of the particles 2814, and the similar shapes of other particles discussed below, are used purely by way of illustration to enable the various types of particles to be distinguished easily in the accompanying drawings, and in no way correspond to the physical forms of the actual particles, which are typically substantially spherical. However, we do not exclude the use of non-spherical particles in the present displays.) The second species of electrophoretic particles 2814 has an optical property and an electrophoretic mobility different from those of the first species of electrophoretic particles 2812. Typically, the electrophoretic mobility of the second species of electrophoretic particles 2814 is opposite in polarity to that of the first species 2812. The display element shown in FIGS. 28A and 28B has two extreme optical states, one in which the first species of electrophoretic particles 2812 are visible to an observer 2622, as illustrated in FIG. 28A, and a second one in the second species of electrophoretic particles 2814 are visible to the observer 2622, as illustrated in FIG. 28B.

Figure 28B:
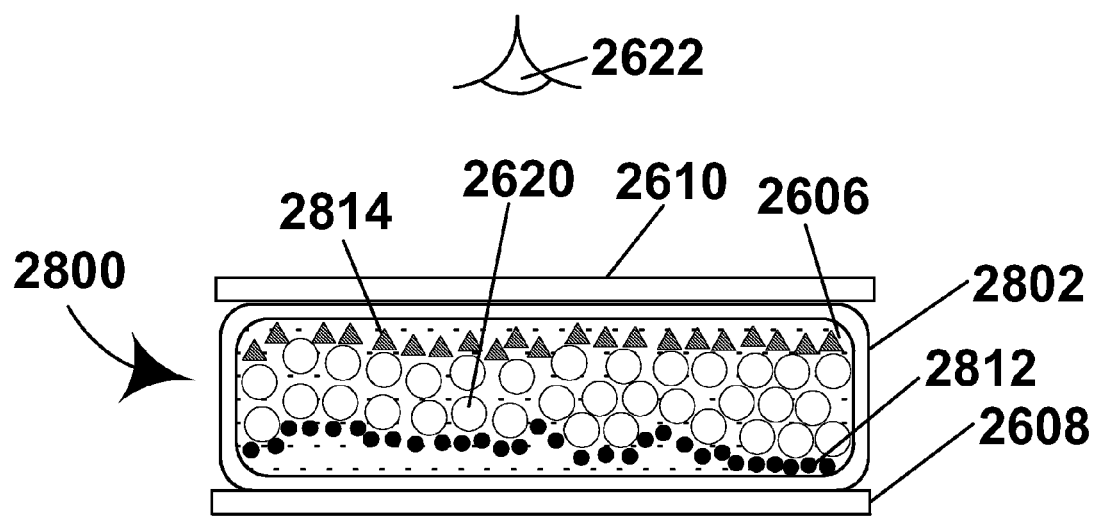
FIG. 28B shows the electrophoretic display element of FIG. 28A with the electrophoretic particles in different positions.

As will readily be understood from the discussion of FIGS. 26A to 26C above, the switching of the electrophoretic particles 2812 and 2814 shown in FIGS. 28A and 28B is subject to a threshold. The filler particles 2620 may provide different amount of migration resistance for each species of the electrophoretic particles 2812 and 2814, and, therefore, different threshold electric field values for the different species. Enhanced bistability and reduced settling of the electrophoretic particles can also be achieved in the same way as described above by selecting the desired characteristics of the filler particles 2620.

The optical properties of various components of the display element shown in FIGS. 28A and 28B can be varied to achieve desired visual appearances of the electrophoretic display element, as seen by the observer 2622. For example, the fluid 2606 may have a first optical property, the first species of electrophoretic particles 2812 may have a second optical property, the second species of electrophoretic particles 2814 may have a third optical property, and the filler particles 2620 may have a fourth optical property. Some of these optical properties may be the same, or they can all be different. An optical property can be, for example, a color, luminescence, light-absorption, or transparency. The visual appearance presented to the observer 2622 results from the combination of the optical properties of the components of the display element. The amount each optical property contributes to the visual appearance of the electrophoretic display element, as seen by the observer 2622, is typically determined by the intensity of the optical property. For example, the intensity of the optical property of a species of the electrophoretic particles is affected by the positioning within the capsule 2800 of the electrophoretic particles of that species.

Positioning of the electrophoretic particles can be controlled using a number of positioning parameters. For example, the resistance to migration of the electrophoretic particles caused by the filler particles 2620 affects the rate at which the electrophoretic particles migrate, and can be used in combination with the strength and duration of the electric field for positioning of the electrophoretic particles. Other positioning parameters that can be used include the electrophoretic polarity of the two species of electrophoretic particles, the polarity of the electric field, the sequencing of the electric field, and the electrophoretic mobility of each species of electrophoretic particles. The electrophoretic mobility of the electrophoretic particles will depend, for example, upon their size and the size and/or volume fraction of the filler particles. Utilization of these positioning parameters provides improved control over the positioning of both species of the electrophoretic particles 2812, 2814 within the capsule 2800, to achieve, for example, a desired intensity for each optical property, thereby creating the desired visual appearance. The intensity of these two species of electrophoretic particles, in combination with the intensity of the stationary filler particle 2620, and/or the intensity of the fluid 2606 can be blended to obtain a visual appearance of virtually any desired color. For example, in FIG. 28A the visual appearance of the electrophoretic display element appears as the color of the electrophoretic particles 2812. The intensity of such color depends upon the percentage of the electrophoretic particles 2812 located near the surface of the electrophoretic display element facing the observer 2622 In FIG. 28B, the visual appearance of the electrophoretic display element appears as the color of the electrophoretic particles 2814. The intensity of such color depends upon the fraction of the electrophoretic particles 2814 located near the surface of the electrophoretic display element facing the observer 2622.

In addition to the position of the electrophoretic particles, optical density can also be used to control the intensity of an optical property, thereby affecting how much the optical property contributes to the visual appearance of the electrophoretic display element. For example, in FIG. 28A a thin layer of the first species of electrophoretic particles 2812 having a second optical property may obscure the filler particles 2620 having a third optical property because of the high hiding power of the particles 2812, thus presenting a visual appearance of the second optical property to the observer 2622.

As already mentioned, the use of filler particles can also provide improved control over the color intensity and/or color palette of an electrophoretic display. Embodiments of the three color display element (3CDE) aspect of the present invention can yield an electrophoretic display element capable of providing the full range of visible colors by blending three primary colors or three subtractive primary colors in a controlled manner.

Figure 29A:
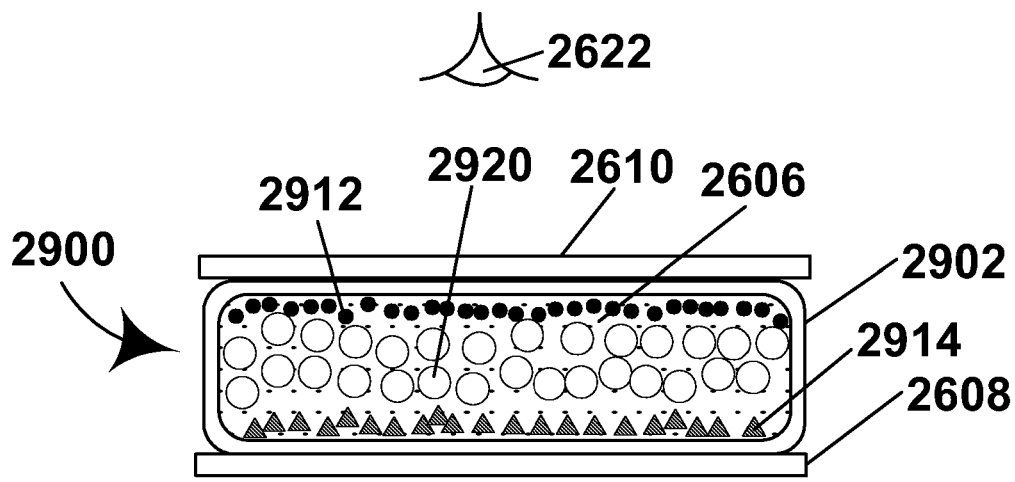
FIGS. 29A to 29F show varying views of a three color electrophoretic display of the present invention, the views differing in the positions of the electrophoretic particles.

FIGS. 29A to 29F illustrate one 3CDE of the present invention which can operate in this manner. This 3CDE comprises a capsule (generally designated 2900) comprising a capsule wall 2902, a colorless, transparent fluid 2606, and electrodes 2608 and 2610, all of which are essentially identical the corresponding integers in FIG. 26A. The capsule 2900 further comprises a first species of electrophoretic particles 2912 having a first optical property (the color cyan), a second species of electrophoretic particles 2914 having a second optical property (the color magenta), and filler particles 2920 having a third optical property (the color yellow), the filler particles 2920 being identical, except in color, to the filler particles 2620 shown in FIG. 26A. Typically, the two species of electrophoretic particles 2912 and 2914 will have opposite electrophoretic polarities. As shown in FIG. 29A, application of an electric field of one polarity using electrodes 2608 and 2610 positions the first species of electrophoretic particles 2912 towards the observer 2622 to display to the observer a cyan visual appearance. Reversing the polarity of the electric field causes the first species of electrophoretic particles 2912 to migrate away from the observer 2622, and the second species of electrophoretic particles 2914 to migrate towards the observer, thus bringing about the situation shown in FIG. 29B and displaying a magenta visual appearance to the observer. In either of the situations shown in FIGS. 29A and 29B, application of the electric field may be discontinued after the two species of electrophoretic particles have migrated far enough to create the desired visual appearance to the observer, and the electric field will typically not need to be applied again until another change in the visual appearance of the electrophoretic display element is desired.

Figure 29B:
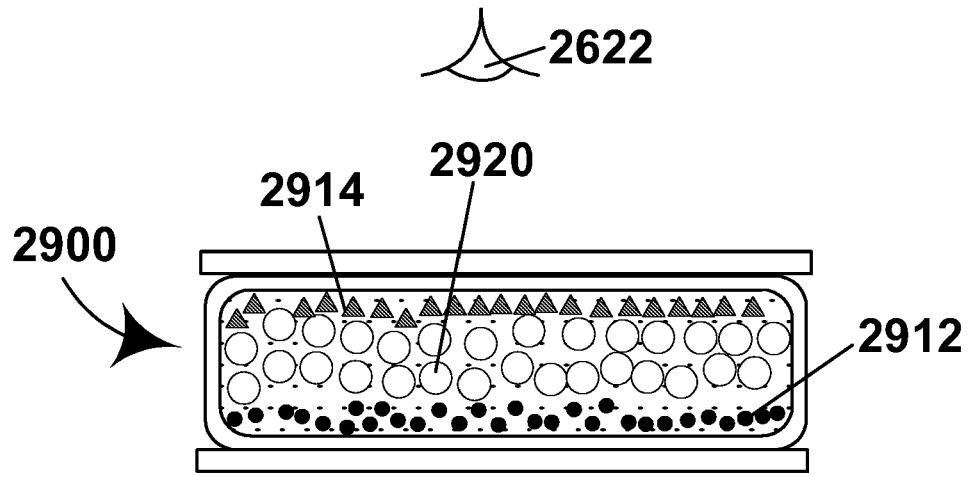
Figure 29C:
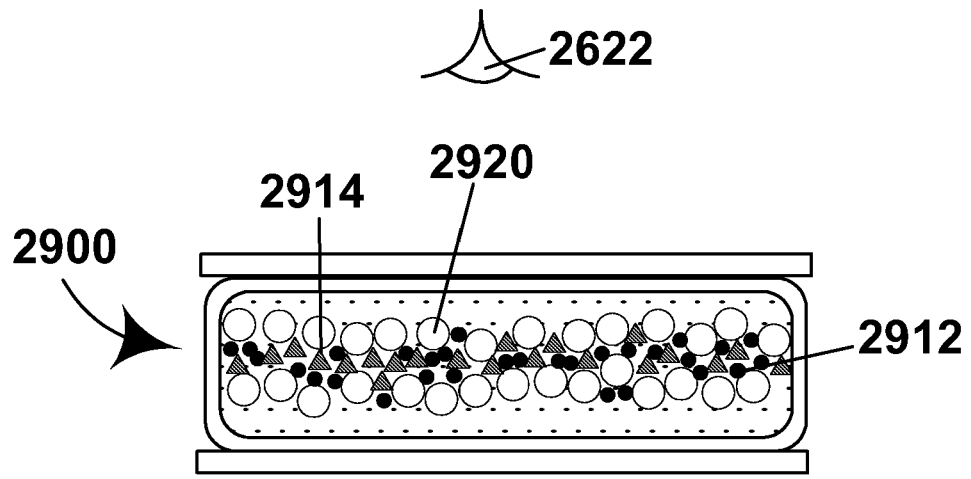

FIG. 29C shows an arrangement of the particles in the capsule 2900 that provides a yellow visual appearance by displaying the filler particles 2920 to the observer 2622. The first and second species of electrophoretic particles 2912 and 2914 are obscured by the filler particles 2920. To bring about the situation shown in FIG. 29C, one starts from either situation shown in FIG. 29A or 29B and applies an electric field of a polarity to drive the electrophoretic particles towards the opposite situation, but terminates the electric field after the particles have only finished about one-half of their full migrations, leaving the electrophoretic particles 2912 and 2914 dispersed among the filler particles 2920, so that the electrophoretic particles are obscured from view by the filler particles, leaving the yellow color of the filler particles visible to the observer 2622. The migration resistance provided by filler particles 2920 facilitates establishing the desired migration position of the electrophoretic particles 2912 and 2914 using, for example, the duration of the electric field as a positioning parameter.

In FIG. 29C, the optical density of the filler particles 2920 is less than the optical density of the electrophoretic particles 2912 and 2914, so that to obscure the electrophoretic particles 2912 and 2914, and display the optical property of the filler particles 2920, a thick layer of the filler particles 2920 is needed. For example, the filler particles 2920 may occupy approximately half of the available interior volume of the capsule 2900. Alternatively, the optical properties of the first and second species of electrophoretic particles 2912 and 2914 may not be obscured by the filler particles 2920 so that, in the situation shown in FIG. 29C, the display element has a visual appearance which is a blend of the optical properties of the two species of electrophoretic particles 2912 and 2914.

In the display element of the present invention shown in FIGS. 29A-29F, the intensity of two or more colors can be combined to create a blended color. A color display can be created with a three-color system, two different colors being provided by the two species of electrophoretic particles 2912 and 2914, and the third color by the filler particles 2920. In such a display element the fluid 2606 is typically transparent and colorless.

A three-color display may also be created in which two different colors are provided by the two species of electrophoretic particles 2912 and 2914, and the third color is provided by a colored fluid 2606. In such a system, the filler particles 2920 may be transparent and colorless.

Figure 29D:
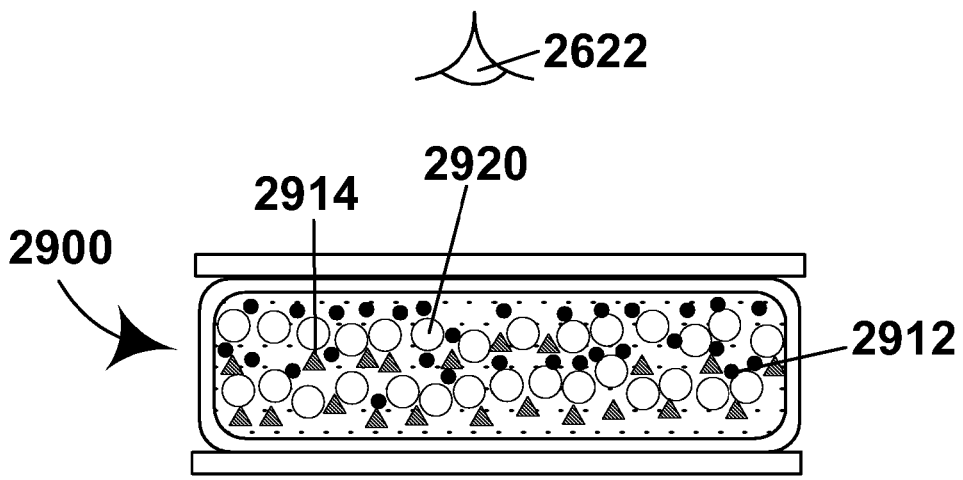
Figure 29E:
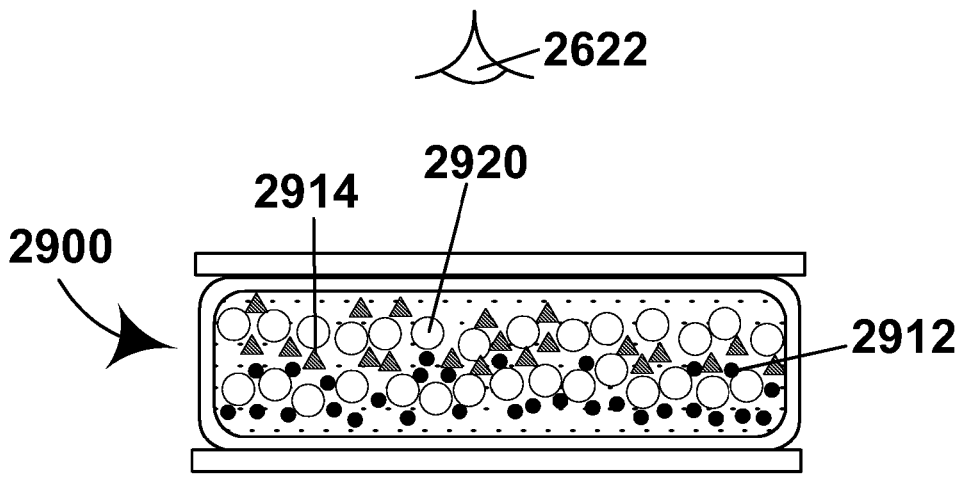
Figure 29F:
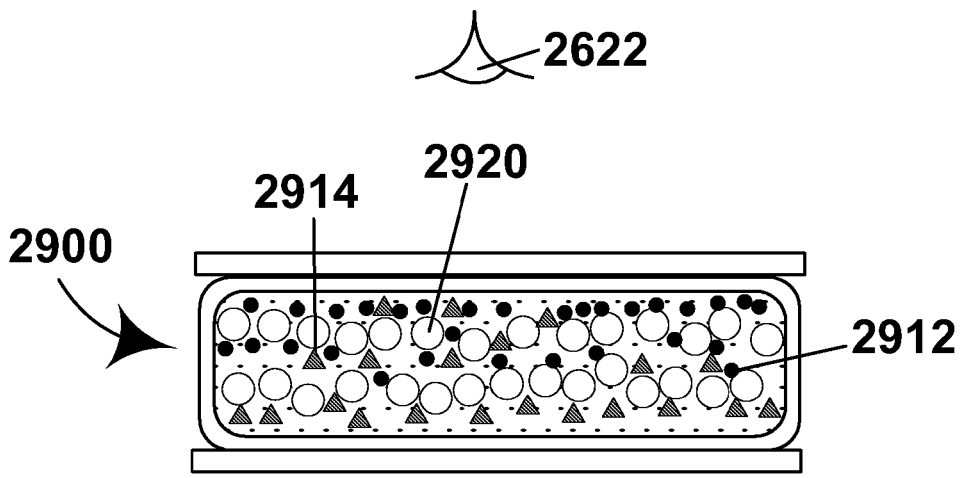

FIGS. 29D to 29F illustrate additional visual appearances which can be provided by the display element shown in FIGS. 29A to 29C. In FIG. 29D, the cyan electrophoretic particles 2912 are just emerging from the filler particles 2920 on the side facing the observer 2622, so that the yellow color of the filler particles 2920 is seen blended with the cyan color of the electrophoretic particles 2912, to create a green visual appearance. To reach the situation shown in FIG. 29D, an electric field may be applied to move the cyan particles 2912 close to the observer 2622 and the magenta particles away from the observer, as shown in FIG. 29A, the reversing the polarity of the electric field is reversed for a period sufficient to move the electrophoretic particles to the positions shown in FIG. 29D. The electric field is then turned off, so that the cyan and yellow colors blend, establishing the desired green visual appearance to the observer 2622.

FIG. 29E shows another optical state of the display element shown in FIGS. 29A to 29D. In FIG. 29E, the yellow color of the filler particles 2920 is blended with the magenta color of the electrophoretic particles 2914, to create an orange color to the observer 2622. The situation shown in FIG. 29E may be reached in a manner similar to that if FIG. 29D, but using electric fields of opposite polarity, i.e., one first drives the magenta electrophoretic particles 2914 towards the observer 2622, producing the situation shown in FIG. 29B, and then reverses the electric field for a period long enough to obtain the situation shown in FIG. 29E, whereupon the electric field is turned off. At this point the magenta color of the electrophoretic particles 2914 and the yellow color of the filler particles 2920 blend, displaying the desired orange color to the observer 2622.

Finally, FIG. 29F illustrates an optical state in which the cyan particles 2912, the magenta particles 2914 and the yellow filter particles 2920 are all visible to the observer 2622, resulting in the observer seeing a purple color. The situation shown in FIG. 29F may be achieved in a manner similar to that of either FIG. 29D or 29E, but maintaining the reversed electric field for a longer period.

In a display elements such as that shown in FIGS. 29A-29F the colors seen at the viewing surface of the optical elements can be selected to enable the electrophoretic display element to present a full-color visual appearance. Non-limiting examples of suitable colors include primary colors, subtractive primary colors, or the colors white and black.

Figure 30:
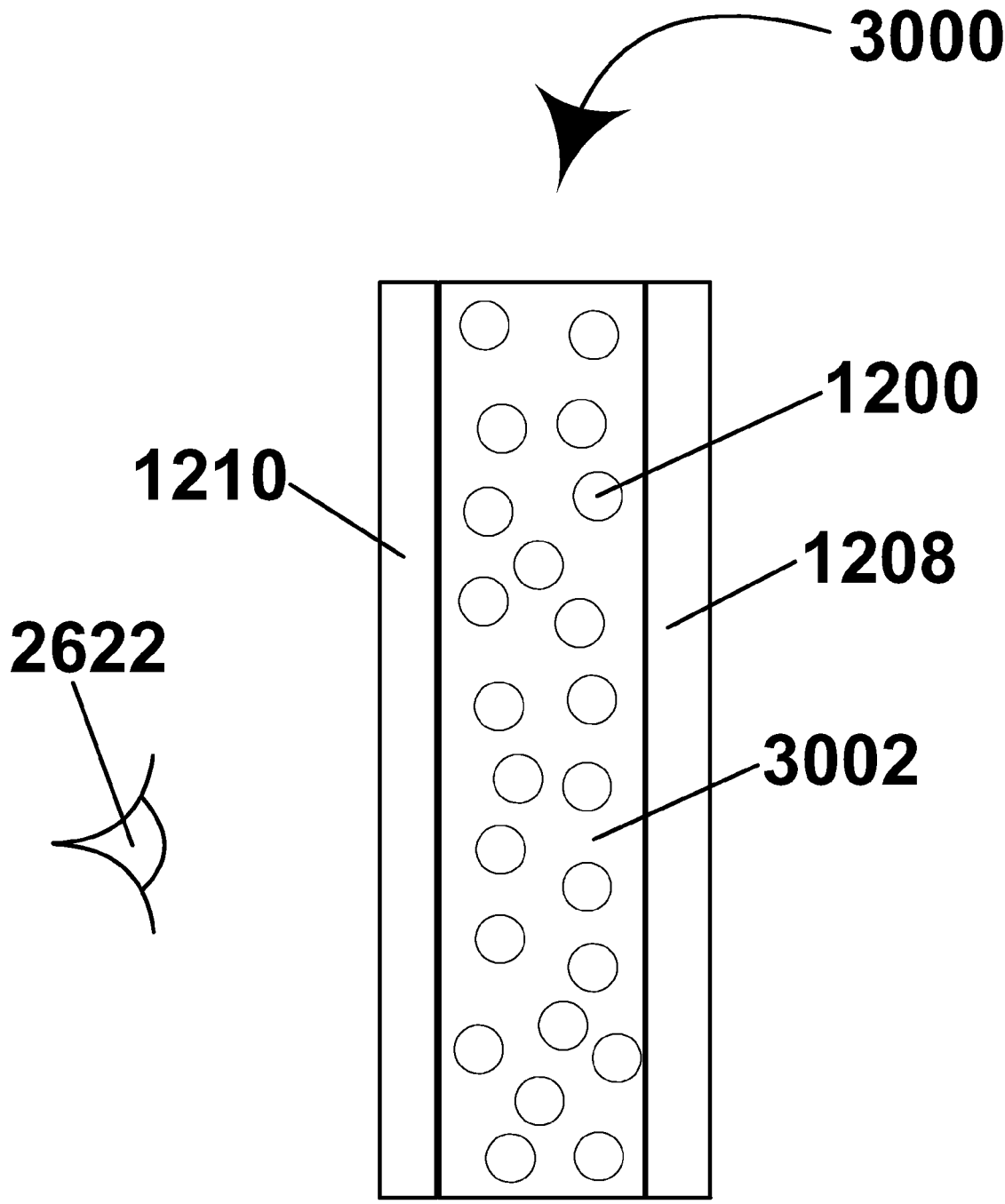
FIG. 30 is a schematic cross-section through an electrophoretic display formed from a plurality of electrophoretic display elements of the present invention.

FIG. 30 illustrates an electrophoretic display (generally designated 3000) comprising a plurality of electrophoretic display elements 1200 of the present invention. In FIG. 30, a plurality of encapsulated electrophoretic display elements in the form of capsules 1200 are combined in a binder material 3002, which may be colorless and transparent, between electrodes 1208 and 1210.

Figure 31:
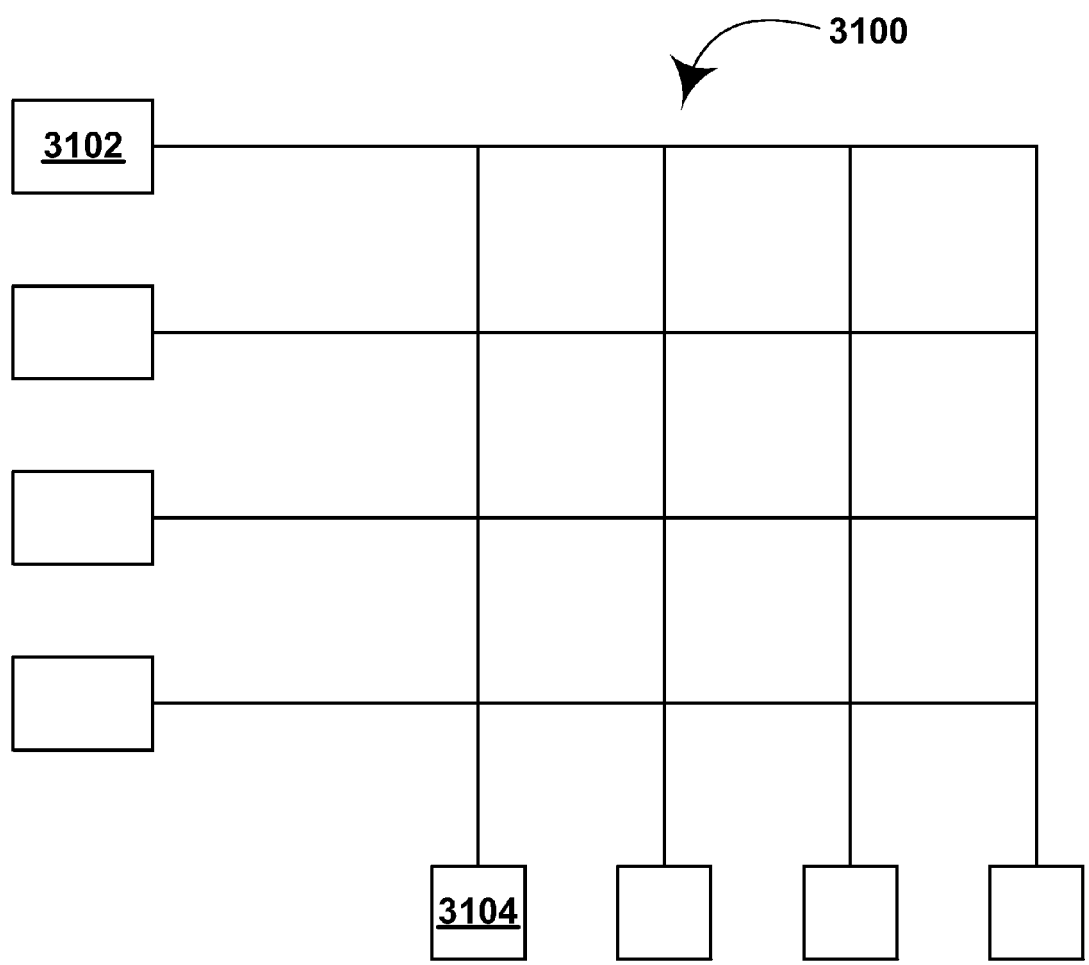
FIG. 31 illustrates schematically one method for addressing the electrophoretic display of FIG. 30.
Figure 32:
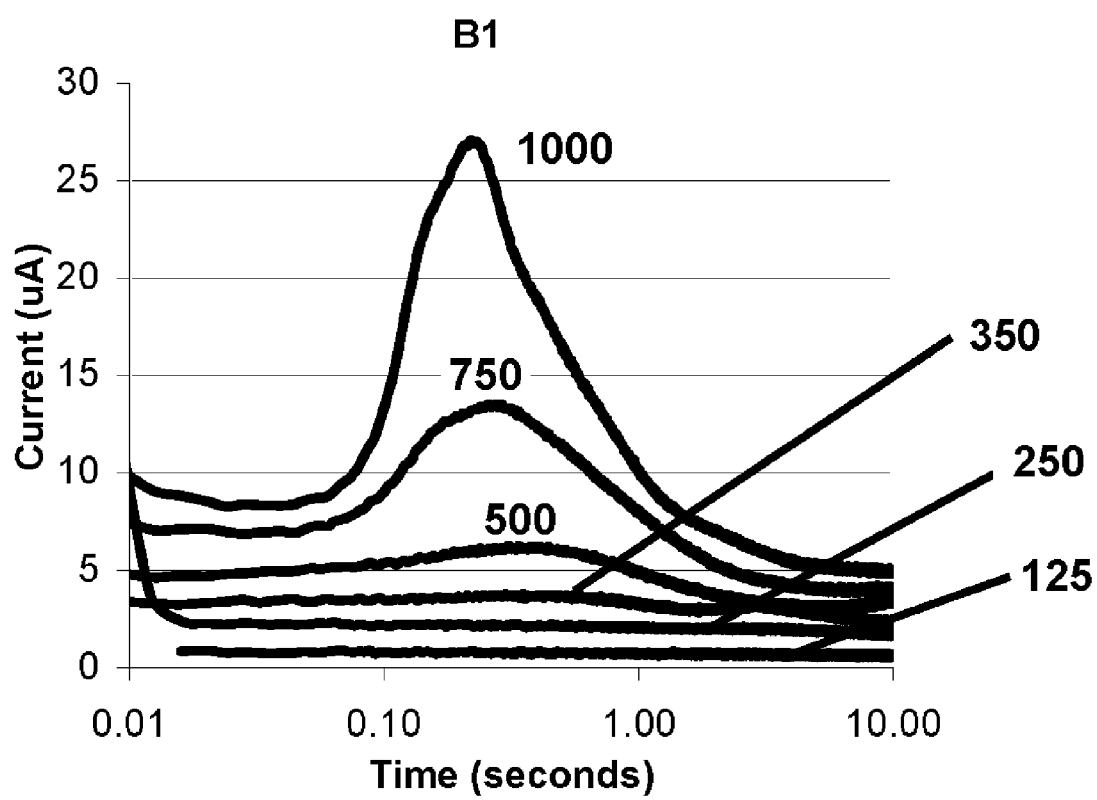
FIGS. 32 to 37 are graphs of current against time at various operating voltages for six different opposite charge dual particle electrophoretic displays.
Figure 33:
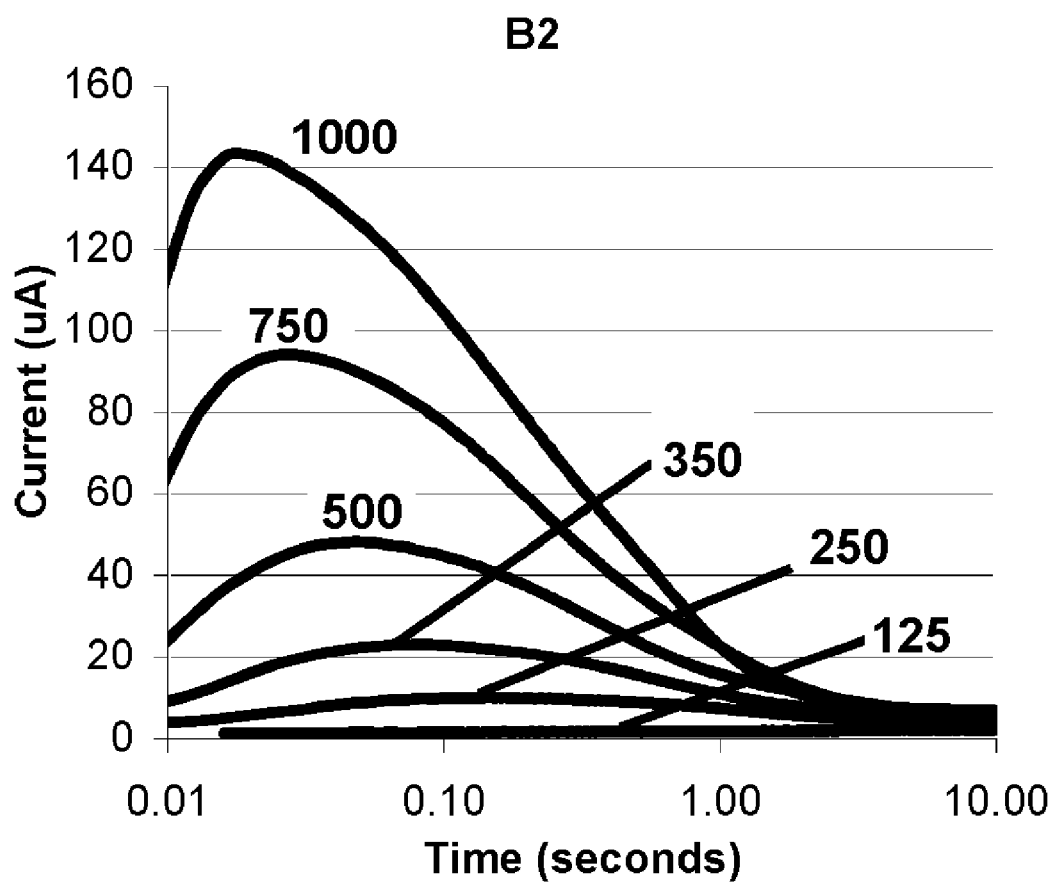
Figure 34:
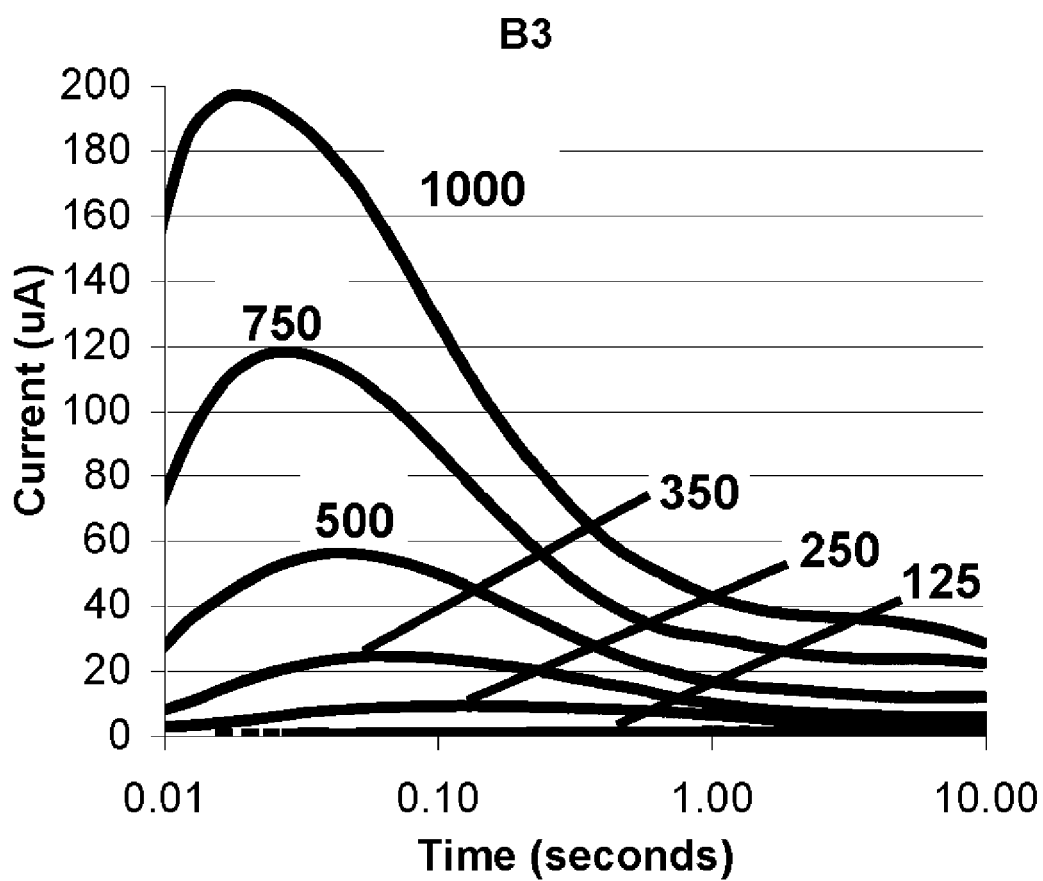
Figure 35:
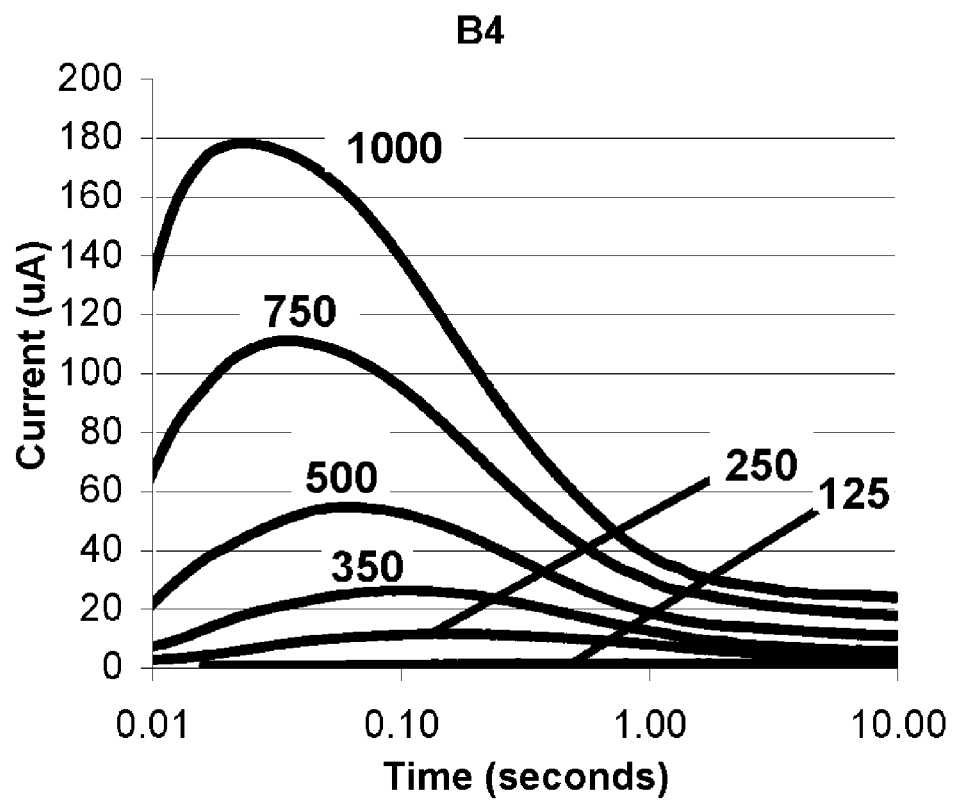
Figure 36:
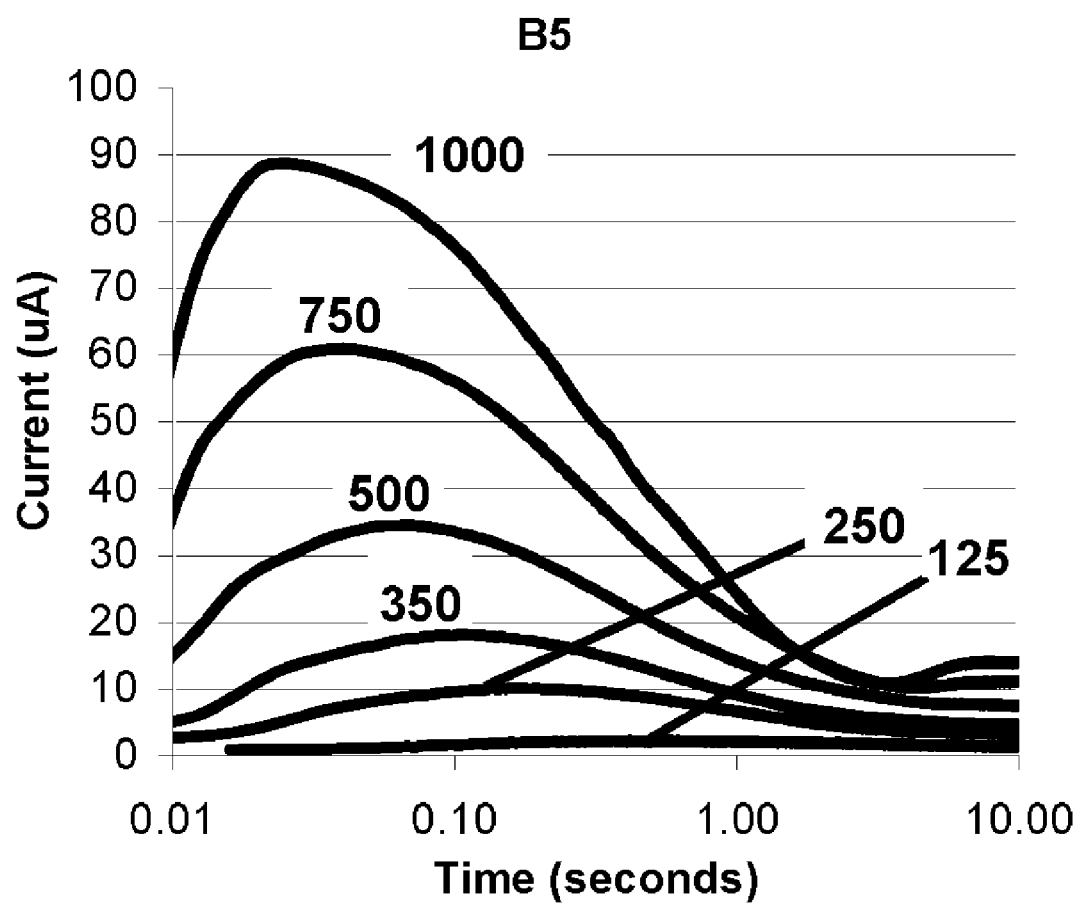
Figure 37:
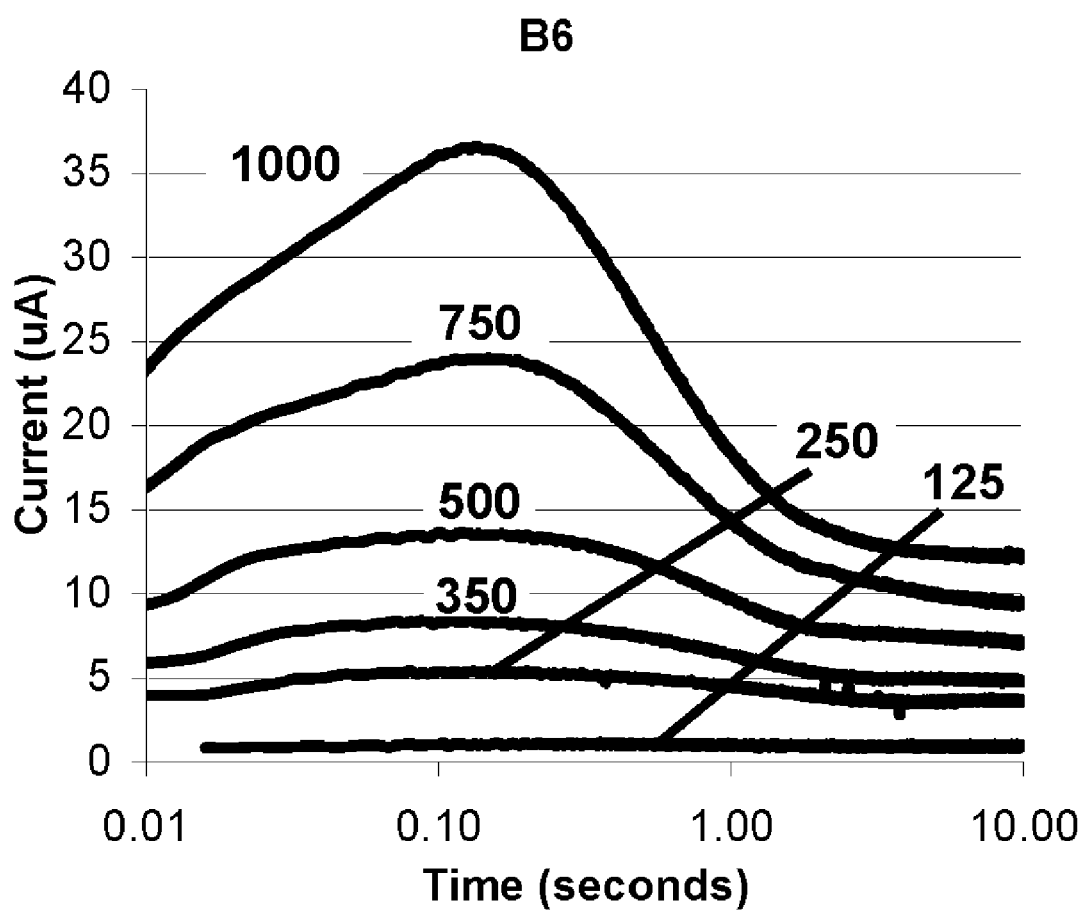

FIG. 31 illustrates an addressing grid (generally designated 3100) which may be used to introduce an electrical field near each electrophoretic display element in, for example, the display shown in FIG. 30. The grid 3100 may be used, for example, to address any desired portion of the electrophoretic display, without significantly affecting other portions of the electrophoretic display. Row address lines 3102 and column address lines 3104 are used to selectively address the electrophoretic display elements of the invention. By selectively activating and controlling row and column address lines, an electric field can be applied to the electrophoretic display elements, resulting in migration and positioning of the electrophoretic particles such that they present a desired display intensity, thereby creating a desired visual appearance.

The addressing grid 3100 may be manufactured through any of the processes known in the art. For example, the addressing grid may be constructed with one or more steps of photolithography and subsequent etching, or the addressing grid may be fabricated with a mask and a "sandblasting" technique. In another embodiment, the addressing grid is fabricated by an embossing technique on a plastic substrate. The grid electrodes may be deposited by vacuum deposition or sputtering, either before or after the embossing step. In another embodiment, the electrodes are printed onto the grid structure after it is formed. Suitable printable electrode materials include, but are not limited to, a metal, a carbon-doped polymer, or an intrinsically conducting polymer.

In one embodiment, the addressing grid is fabricated with a series of printing steps. The grid structure is built up in a series of one or more printed layers after the electrode has been deposited, and the electrode is printed on to the grid structure. There may be an additional insulator on top of the grid electrode, and there may be multiple grid electrodes separated by insulator in the grid structure. The grid electrode may not occupy the entire width of the grid structure, and may only occupy a central region of the structure, in order, for example, to stay within reproducible tolerances. In another embodiment, the addressing grid is fabricated by photo-etching away a glass, such as a photostructural glass.

X. Field Dependent Behavior in Dual Particle Opposite Charge Electrophoretic Displays The behavior of electrophoretic media in which the electrophoretic particles possess mobilities which vary with the electric field has been discussed at length above. It has now been found that in dual particles opposite charge electrophoretic media (i.e., electrophoretic media which contain two different types of particles bearing charges of opposite polarity) the response of the media to applied electric fields can be highly field dependent even though the electrophoretic particles do not exhibit field dependent behavior when tested in isolation (i.e., in the absence of the other type of electrophoretic particle). For reasons discussed below, this field dependent behavior of dual particle opposite charge media is believed to be a function of the tendency of the two types of particles to form aggregates which need to be broken up before the electrophoretic media can switch.

This type of field dependent behavior was found during a series of experiments intended to determine the charge to mass (Q/M) ratios of the electrophoretic particles in various dual particle opposite charge media. Each of the media used contained as a white electrophoretic particle a polymer-coated titania prepared substantially as described in Example 20 of the aforementioned U.S. Pat. No. 6,822,782. Six different carbon black based pigments, denoted B1 to B6 were used as follows:

B1: polymer coated carbon black prepared substantially as described in Example 20 of the aforementioned U.S. Pat. No. 6,822,782, Example 27;

B2: polymer coated carbon black prepared by initial reaction with 4-vinylaniline as in the aforementioned Example 27, followed by atom transfer radical polymerization (ATRP) to form a block copolymer with 2-ethylhexyl methacrylate; the proportion of polymer is substantially greater than in pigment B1;

B3: polymer coated carbon black prepared in a manner similar to B1 but using 10 percent by weight 2-(dimethylamino)ethyl methacrylate in the first polymer block; this pigment contained 34 percent by weight of polymer;

B4: similar to B3 but containing 53 percent by weight of polymer;

B5: similar to B3 and B4 but containing 73 percent by weight of polymer; and

B6: polymer coated carbon black prepared substantially as described in Example 14 of the aforementioned U.S. Pat. No. 6,822,782.

Each of the pairs of pigments was formulated into a dual particle electrophoretic internal phase substantially as described in Example 29 of the aforementioned U.S. Pat. No. 6,822,782. (Hereinafter for convenience each internal phase may be identified by its black pigment, thus "the B1 internal phase" etc.) However, for purposes of these tests, the internal phase was not encapsulated since the presence of a capsule wall complicates interpretation of data. Instead, each internal phase was placed in a test cell having a 1 mm gap, and a range of voltages was applied across this gap by a pair of electrodes. The current across the cell was measured as a function of time and voltage. The results are shown in FIGS. 32-37 for the B1 to B6 internal phases respectively. The charge is determined by measuring the current during the test, and the mass is determined from the weight increase on the collection electrode. Of interest here is the current as a function of time after the voltage is applied to the internal phase.

It was known from prior experiments that, typically, single particle electrophoretic media display current/time curves which start at an initial value and gradually decrease as the internal phase polarizes, exactly as would be predicted by theory for a limited set of charged particles moving through a liquid and eventually coming to rest against one electrode. However, as may be seen from FIGS. 32 to 37, the current/time curves obtained from the dual particle opposite charge internal phases were very different; for each of the six internal phases tested, at high voltages, the current starts at a relatively low value, increases to a maximum and thereafter gradually declines. (These results are not affected by the capacitive voltage spike which occurs when the drive voltage is first applied. It was found experimentally that this spike did not extend past 2 milliseconds, and to avoid readings being affected by the spike the first current reading was not taken until 4 milliseconds after the drive voltage was applied.) The final gradual decline parallels that experienced with single particle internal phases and can readily be explained as due to polarization of the internal phase. The initial rise in current is, however, peculiar to dual particle opposite charge internal phases and is also strongly dependent upon the drive voltage; as may be seen from FIGS. 32 to 37, at low voltages there is no rise in current and the current remains minimal throughout. In the case of the B1 internal phase, there is also a peculiar delay of about 0.1 seconds before the currents starts to rise. Finally, it should be noted that the maximum current is also strongly dependent upon the specific black pigment employed; the B1 internal phase showed a maximum current of only 27 μA, while the B3 internal phase showed a maximum current of about 200 μA.

The data shown in FIGS. 32 to 37 are consistent with a model in which the two oppositely charged pigments form essentially neutral aggregates when no electric field is applied to the internal phase, and in which these aggregates break up into smaller charged aggregates or individual charged pigment particles when a strong electric field is applied. The ideal mix of particles is believed to be one in which the total amount of positive charge on the black pigment equals the total amount of negative charge on the white pigment. Once mixed together in the internal phase, the oppositely charged pigments immediately aggregate to form approximately charge-neutral, gray aggregates. In this condition, the low-field conductivity is low since the charged particles and their counter ions (present in the fluid of the internal phase) do not contribute significantly, and the major contributor to this residual conductivity is believed to be the charge control agent. When the applied field is large enough to pull the aggregates apart, or peel individual particles from the aggregate, the "free" charged particles can carry current. Thus, an original slurry of essentially uncharged aggregates is changed to a slurry that contains at least a portion of charged particles. The easier it is to pull the aggregates apart, and the higher the field, the greater the percentage of the total pigment that will be in the form of charged particles free to move in the electric field. Once the charged particles and their counter ions start moving, however, they begin polarizing the cell and decreasing the field in the center thereof, thus leading to a decrease in current with time at long times.

The thickness of the steric barrier required to keep particles of a given charge from aggregating can be calculated. In a system composed of highly charged positive and negative particles, the steric barrier necessary to keep the particles from aggregating is quite large, and larger than the thickness of the polymer layers achievable by the processes used to form the polymer layers in the pigments used in these experiments. It is also possible to calculate the field required to pull the particles apart again once they have aggregated because of electrostatic attraction. Particles with a more effective steric barrier would be expected to require a smaller applied field to separate them from their oppositely charged neighbors (everything else held constant). The rate at which the system can be turned into a dispersion of charged particles and/or clusters with a net charge will affect the magnitude of the current maximum in these experiments. In these experiments, the B1 internal phase had a black pigment with a thinner layer of polymer than the other black pigments, so that aggregates in the B1 internal phase would be expected to be more difficult to disrupt than aggregates in the other internal phases. The results from the B1 internal phase, which shows a substantially longer time to maximum current, and the need for a substantially higher voltage to produce an increase in current during the early part of the application of the drive voltage, than the other internal phases, are consistent with the B1 internal phase aggregates being difficult to break up.

From visual inspection of the material collected on the electrodes in the test cell, it was apparent that at low drive voltages the electrodes collected dark gray and light gray coatings. As the drive voltage increased, the contrast between the positive and negative coatings increased, with the coatings becoming brighter white and jet black. This suggests that the applied field can also affect the palette of blacks, whites, and grays that are available for gray scale control.

Figure 38:
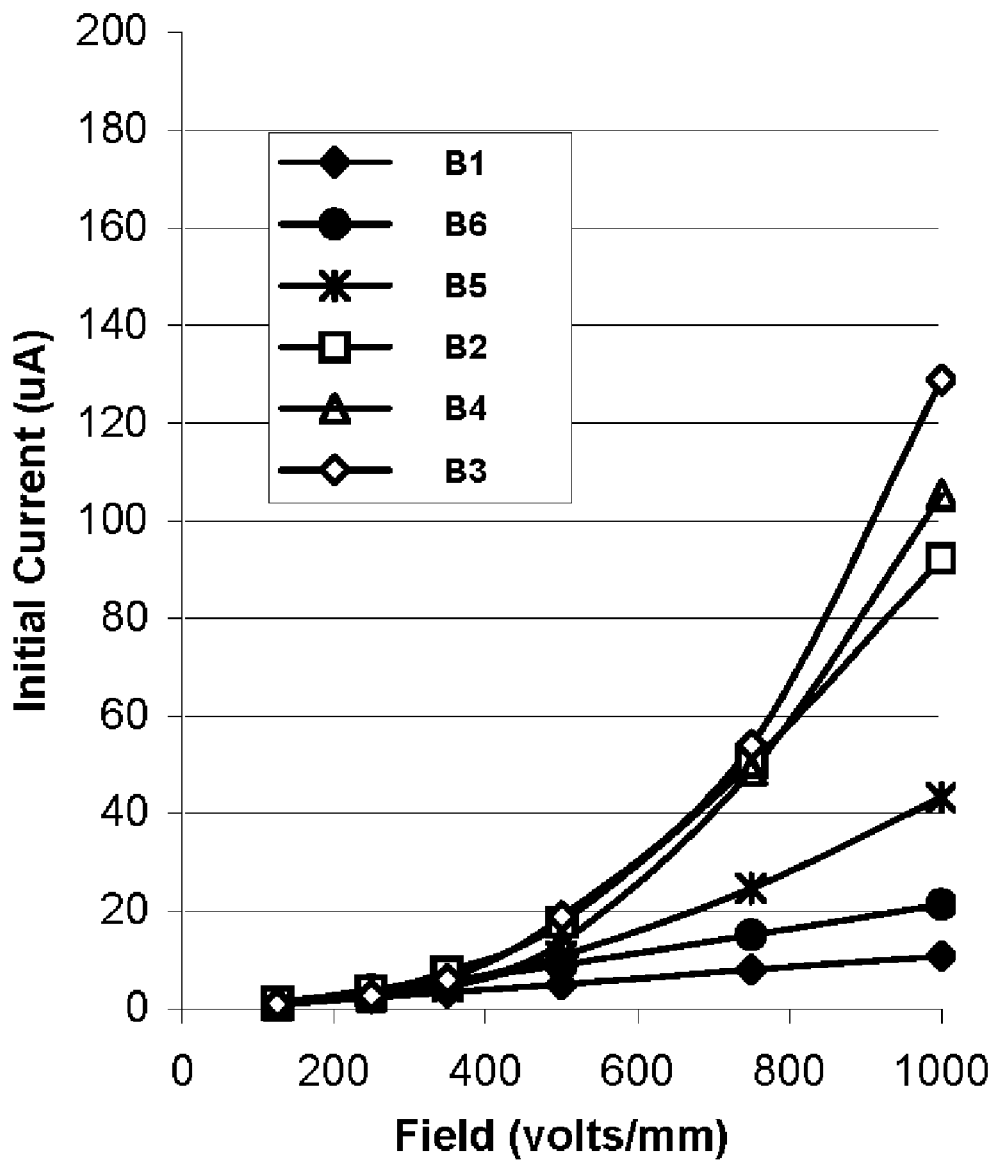
FIG. 38 is a graph showing initial current as a function of electric field for the six electrophoretic displays shown in FIGS. 32 to 37.
Figure 39:
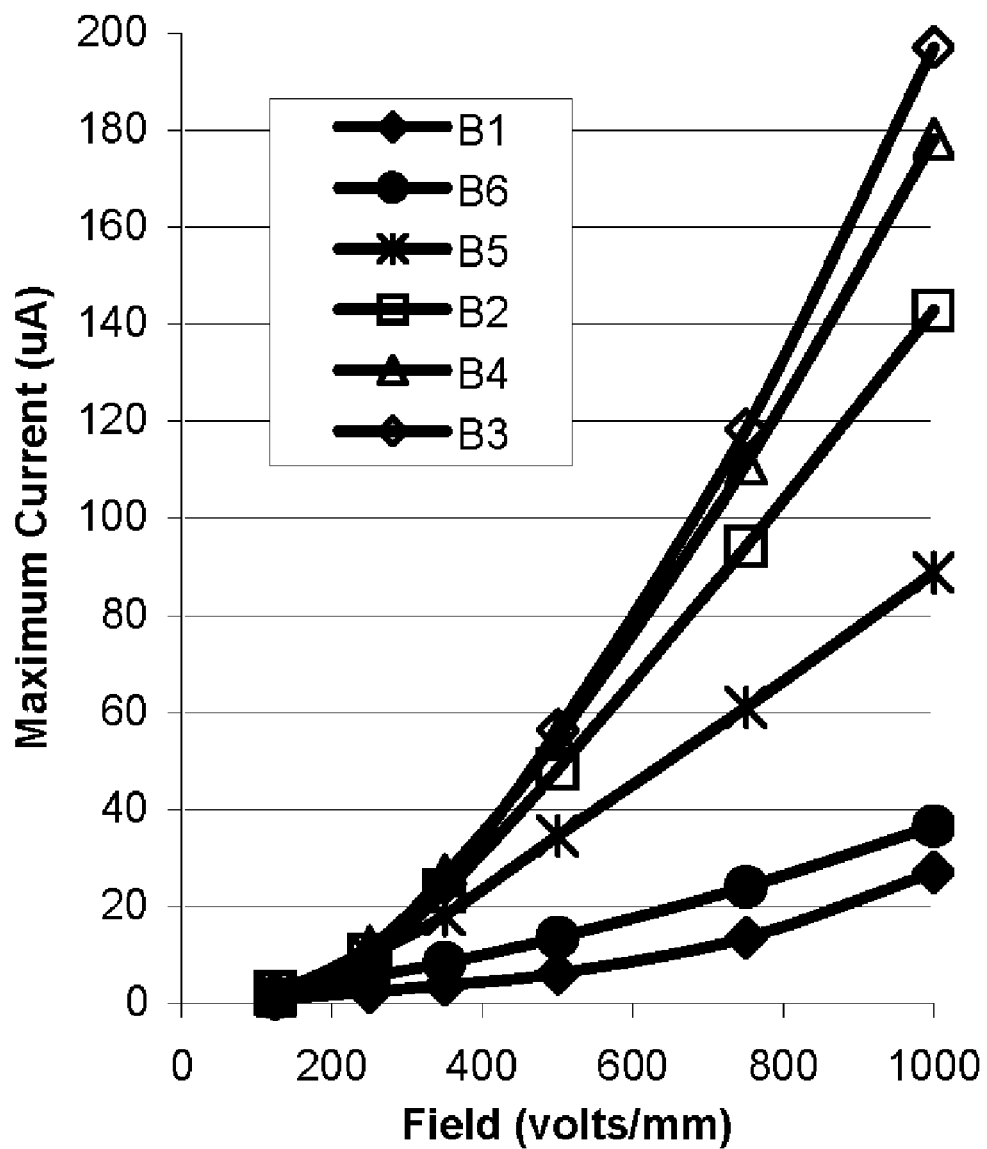
FIG. 39 is a graph showing maximum current as a function of electric field for the six electrophoretic displays shown in FIGS. 32 to 37.
Figure 40:
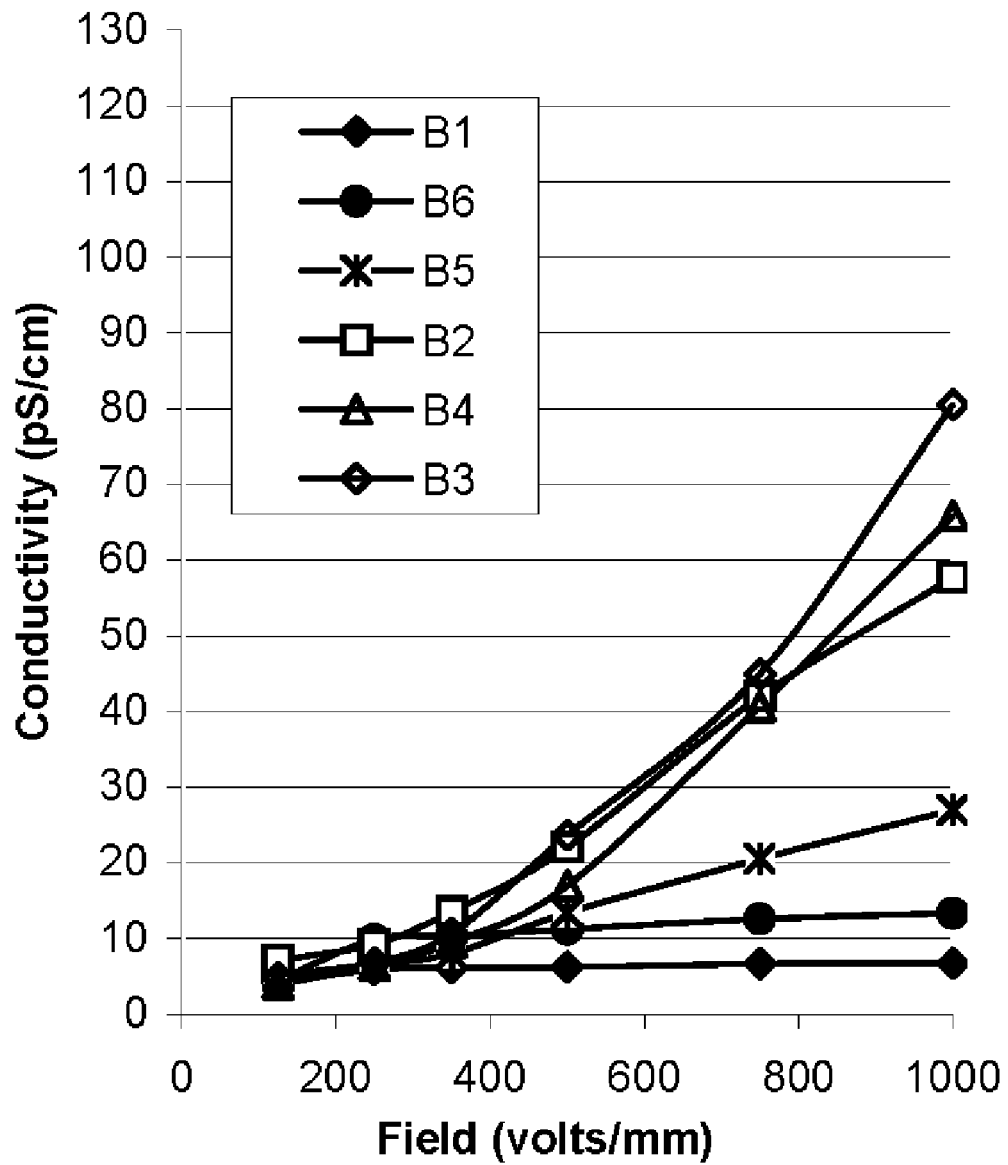
FIG. 40 is a graph showing initial conductivity as a function of electric field for the six electrophoretic displays shown in FIGS. 32 to 37.
Figure 41:
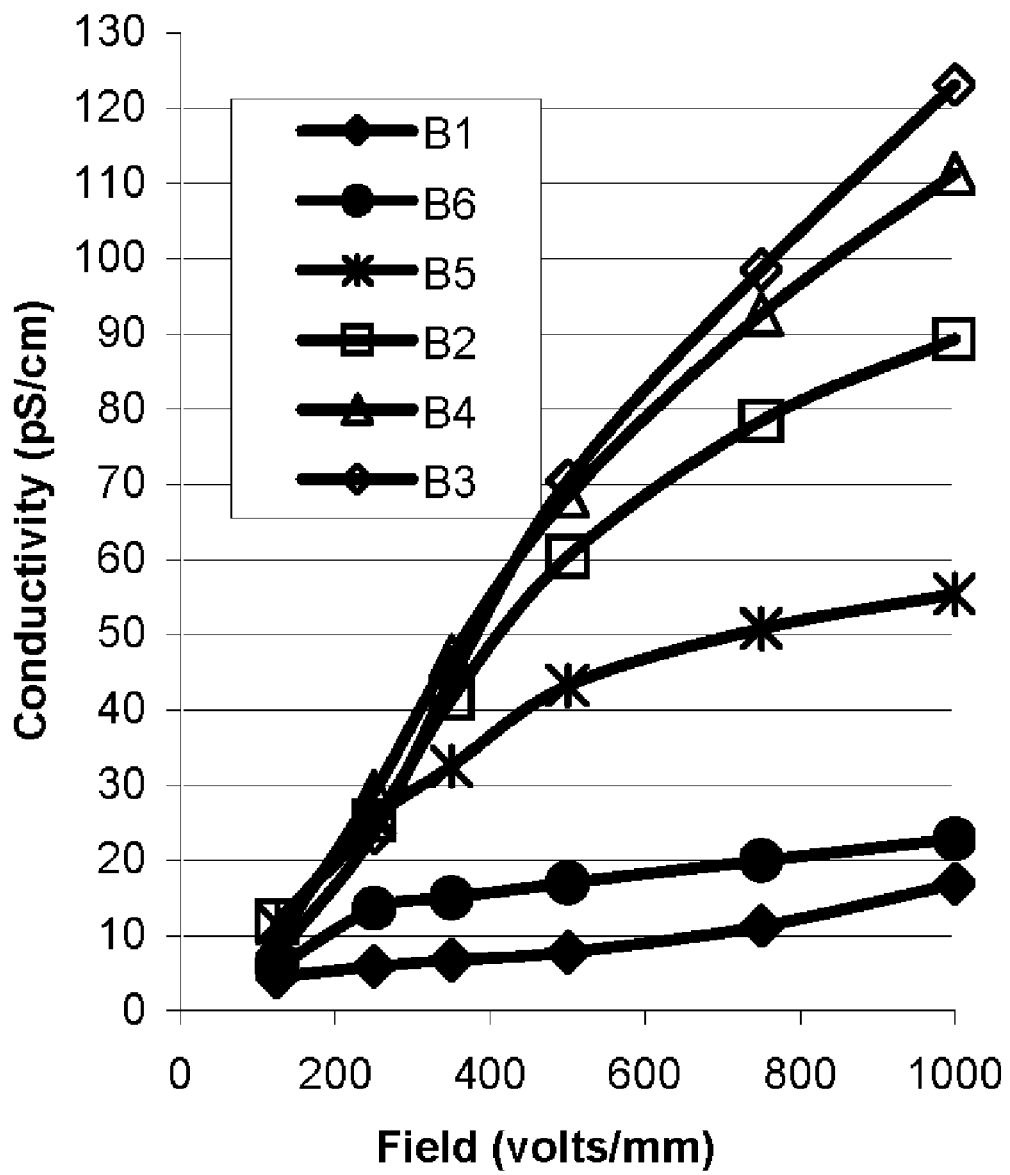
FIG. 41 is a graph showing maximum conductivity as a function of electric field for the six electrophoretic displays shown in FIGS. 32 to 37.

The effect of the magnitude of the drive voltage on the switching behavior of the electrophoretic media can be summarized by plotting current as a function of the drive voltage for each internal phase. FIG. 38 plots the initial current, while FIG. 39 plots the maximum current. The conductivity, $\lambda$, can be calculated from the applied voltage, V, and measured current, I:

$$\lambda = CI/V$$

where C is a cell constant. For the cell used in these experiments, C=625 for $\lambda$ in pS/cm. I in $\mu$A and V in volts. From the foregoing equation, initial and maximum conductivities can be calculated from the data in FIGS. 38 and 39 respectively, and these initial and maximum conductivities are plotted in FIGS. 40 and 41 respectively against the applied field.

For a single particle electrophoretic medium, in which the majority of the current is due to the mobility of individual charged particles and their counter ions, the conductivity of the dispersion is a function of the number density, mobility, and size of these charge carriers along with the viscosity of the fluid. Moreover, for non-field-dependent systems, the conductivity is independent of the applied field. Clearly, the conductivities of all the dual particle internal phases used in these experiments are strongly dependent on the applied field. Moreover, the differences between the various pigments become increasingly clear as the applied field is increased. The field and time dependencies demonstrated by these internal phases can be exploited through voltage and temporal modulation schemes to produce desired optical behaviors in full electrophoretic display systems. For example, some dual particle opposite charge electrophoretic media may have thresholds sufficient to enable them to be used in passive matrix displays.

Another use of field dependent mobility is the resistance which it provides to optical shifts caused by small, typically unintended, voltages. Such small voltages can arise from errors in drive voltages and parasitic voltages and in ionic and electrical responses inside the electrophoretic medium itself. For example, in an active-matrix display, parasitic voltages on the backplane can be caused by charging of pixel electrodes when the associated transistor is in its "off" state, through TFT leakage current. Further examples of such small voltages include voltages arising from capacitive coupling between source and select lines and pixel electrodes. It is desirable for the optical shifts arising from such parasitic voltages to be absent or small, while maintaining a large optical response to larger drive voltages. This can achieved through using an electrophoretic medium that exhibits a threshold one in which the response to the applied voltage is super-linear (as in the experiments described above), such that the optical shift in response to an impulse more than doubles when the amplitude of that impulse doubles.

A further use for field dependent conductivity or voltage super-linearity is to achieve small changes in optical state using series of drive pulses having zero net impulse (i.e., such that the integral of the applied voltage with respect to time is zero). As discussed in several of the aforementioned E Ink patents and applications, it is highly desirable that electrophoretic media be driven with so-called "DC balanced drive schemes", that is to say with drive schemes such that in any series of transitions beginning and ending at the same optical state, the integral of the applied voltage with respect to time is bounded. To provide such DC balanced drive schemes, it is advantageous to be able to effect at least small changes in the gray level of electrophoretic media using a waveform (i.e., a series of drive pulses) with zero net impulse. Field dependent conductivity provides one way of achieving such zero net impulse waveforms. For example, if the conductivity of a medium increases with increasing field, the effect of applying a drive voltage 2V (where V is an arbitrary voltage) for a time T will be greater than the effect of applying drive voltage V for a time 2 T. Hence, a waveform comprising a 2V pulse for time T following by a −V pulse for time 2 T will have a zero net impulse but will produce a final optical state different from the initial optical state.

Figure 42:
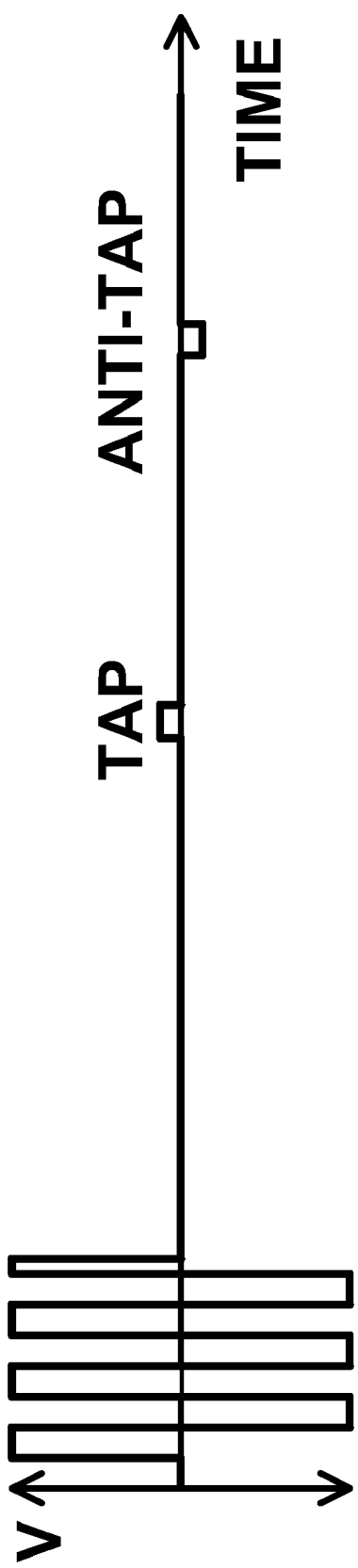
FIG. 42 shows the waveform used in certain experiments described below to examine the non-linear response of dual particle electrophoretic media to drive voltage.

To illustrate field dependent conductivity conducive to the use of such a zero impulse waveform, an electrophoretic medium comprising polymer-coated titania and polymer-coated carbon black in a hydrocarbon fluid was prepared, and formed into experimental single pixel displays substantially as described in Examples 27-29 of the aforementioned U.S. Pat. No. 6,822,782. The experimental displays were then subjected to the waveform shown in FIG. 42. This waveform comprises a series of alternating square wave initialization pulses having a predetermined voltage; such a series of initialization pulses is known to remove any "history" effect due the previous optical states of the display, thus putting the display in a known base state. After the initialization pulses, zero voltage is applied for a period of 15 to 20 seconds. The medium is then subjected to a short (50 milliseconds) "tap" pulse, the voltage of which is varied. After another substantial period of zero voltage, the medium is finally subjected to an "anti-tap" pulse having the same length and magnitude as the tap pulse but opposite polarity. Following, the anti-tap pulse, the medium is left at zero voltage for a period to enable the decay of the optical state following the anti-tap pulse to be measured.

Figure 43:
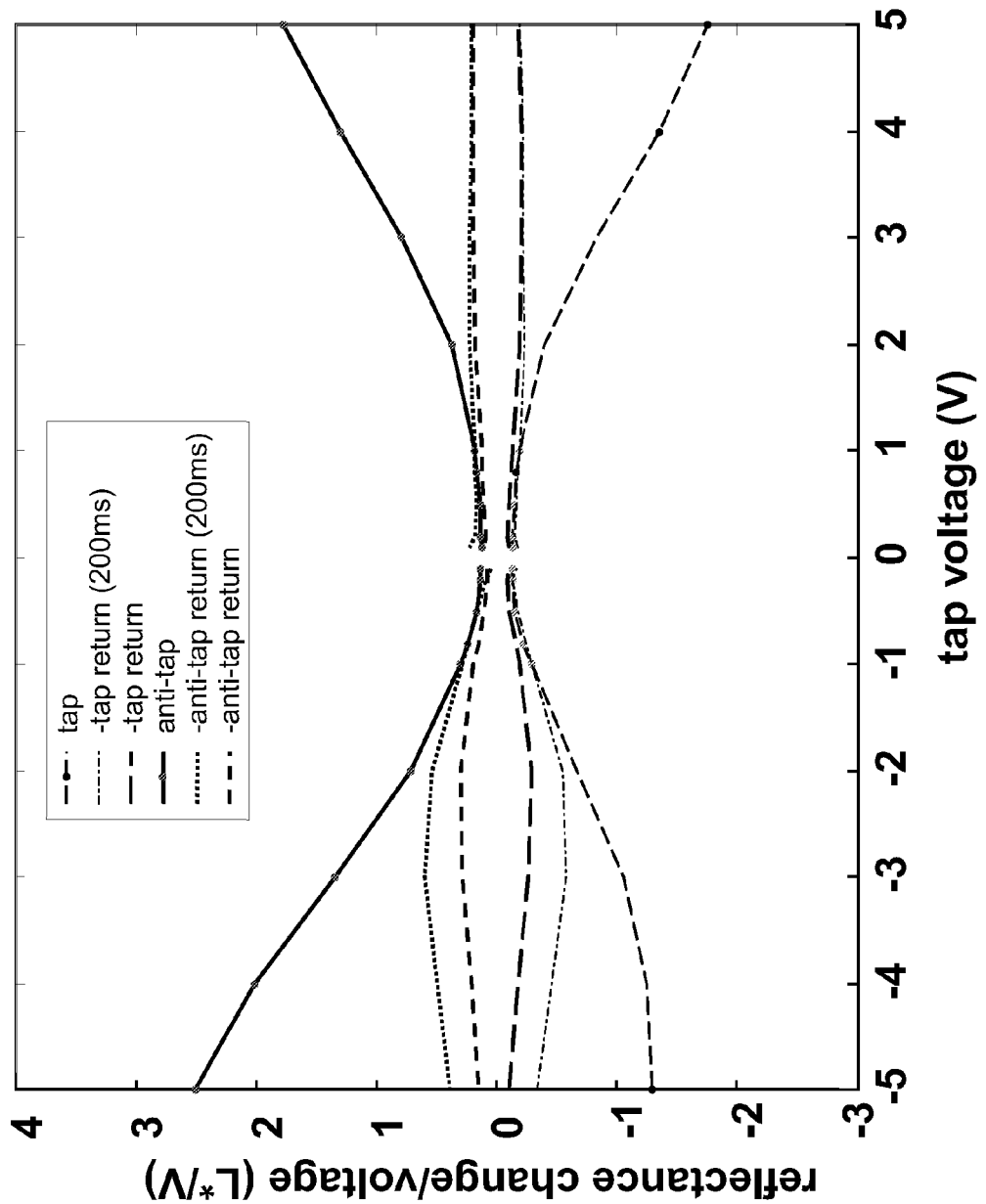
FIG. 43 is a graph showing the results obtained from the experiments using the waveform of FIG. 42.

FIG. 43 plots as a function of the tap voltage:

(a) the change in reflectance caused by the tap voltage divided by the tap voltage itself, of the end of the tap pulse;

(b) the corresponding change in reflectance divided by tap voltage measured 200 milliseconds after the end of the tap pulse;

(c) the same value as in (b) but measured a substantial period after the end of the tap pulse when the relaxation of the change caused by the tap pulse is complete; and (d) the corresponding three values for the anti-tap pulse (although note that, in FIG. 43, to keep the curves separate, the reflectance changes are divided by the tap pulse voltage, not the anti-tap pulse voltage).

If the reflectance change caused by the tap pulse was a linear function of the tap voltage, the curves in FIG. 43 would be horizontal lines parallel to the x-axis. FIG. 43 shows that this is far from the actual situation. At low tap voltages, below about 200 mV, the response to the tap voltage is essential directly proportional to that voltage, and the return is complete. However, above about 200 mV tap voltage, $\Delta R/V_{tap}$ increases with tap voltage, and indeed appears to increase substantially linearly with tap voltage, so that the change in reflectance is approximately proportional to the square of the tap voltage. Also, the return after the end of tap pulse becomes relatively small. This type of behavior is useful for achieving fast response to large drive voltage while giving small response to small parasitic voltages. Furthermore, this type of behavior can be used to create combinations of pulses with zero net impulse which change the optical state of the medium. For example, the response to a 4 V 50 ms pulse is substantially greater than twice the response to a 2 V 50 ms pulse. Accordingly, applying a 4 V 50 ms pulse followed by two −2V 50 ms pulses (or one −2V 100 ms pulse) applies zero net impulse to the medium but will result in a change in the optical state thereof. Those skilled in the technology of electro-optic displays will readily be able to devise other zero net impulse pulse combinations which effect desired changes in the reflectance of this and similar electrophoretic media.

While the invention has been particularly shown and described with reference to specific preferred embodiments, it should be understood by those skilled in the art that various changes in form and detail may be made therein without departing from the spirit and scope of the invention as defined by the appended claims. For example, an image pixel may include more than four types of particles.

What is claimed is:

1. An electrophoretic display element, the display element having a viewing surface and comprising at least one droplet of an electrophoretic phase and a wall surrounding the droplet, the droplet comprising:
   a fluid;
   a plurality of first particles disposed in the fluid and having a first optical characteristic and a first electrophoretic mobility;
   a plurality of second particles disposed in the fluid and having a second optical characteristic different from the first optical characteristic and a second electrophoretic mobility of opposite polarity to the first electrophoretic mobility; and
   a plurality of third particles disposed in the fluid and having a third optical characteristic different from the first and second optical characteristics, the third particles not undergoing electrophoretic motion in an electric field,
   the electrophoretic display element having a first display state in which the viewing surface displays the first optical characteristic, a second display state in which the viewing surface displays the second optical characteristic, and a third display state in which the viewing surface displays the third optical characteristic.

2. An electrophoretic display element according to claim 1 wherein the first, second and third optical characteristics comprise three different colors visible to the human eye.

3. An electrophoretic display element according to claim 2 wherein the three colors comprise red, green and blue.

4. An electrophoretic display element according to claim 2 wherein the three colors comprise yellow cyan and magenta.

5. An electrophoretic display element according to claim 2 wherein two of the three colors comprise black and white.

6. An electrophoretic display element according to claim 1 wherein the third particles are substantially spherical.

7. An electrophoretic display element according to claim 1 wherein the third particles are formed from silica, a metal or a polymer.

8. An electrophoretic display element according to claim 1 wherein the third particles occupy at least about 25 percent by volume of the droplet.

9. An electrophoretic display element according to claim 1 wherein the third particles occupy at least about 35 percent by volume of the droplet.

10. An electrophoretic display element according to claim 1 wherein the fluid is gaseous.

11. A method of driving an electrophoretic display element, the display element having a viewing surface and comprising at least one droplet of an electrophoretic phase and a wall surrounding the droplet, the droplet comprising
   a fluid;
   a plurality of first particles disposed in the fluid and having a first optical characteristic and a first electrophoretic mobility;
   a plurality of second particles disposed in the fluid and having a second optical characteristic different from the first optical characteristic and a second electrophoretic mobility of opposite polarity to the first electrophoretic mobility; and
   a plurality of third particles disposed in the fluid and having a third optical characteristic different from the first and second optical characteristics, the third particles not undergoing electrophoretic motion in an electric field,
   the method comprising:
   applying an electric field of one polarity to the droplet, thereby causing the first particles to approach the viewing surface and the second particles to become spaced from the viewing surface, so that the viewing surface displays the first optical characteristic;

applying an electric field of the opposite polarity to the droplet, thereby causing the second particles to approach the viewing surface and the first particles to become spaced from the viewing surface, so that the viewing surface displays the second optical characteristic; and applying to the droplet an electric field of such polarity and duration that both the first and second particles are hidden by the third particles, so that the viewing surface displays the third optical characteristic.

12. An electrophoretic display comprising a plurality of electrophoretic display elements according to claim 1 and electrode means for applying electric fields to each display element.

13. An electrophoretic display element, the display element comprising at least one droplet of an electrophoretic phase and a wall surrounding the droplet, the droplet comprising:

a fluid;

a plurality of first particles disposed in the fluid and having an optical characteristic and an electrophoretic mobility; and a plurality of second particles disposed in the fluid and forming a filler therein through which the first particles can move, the second particles not undergoing electrophoretic motion in an electric field, wherein in the absence of an electric field, the first particles are attracted to the second particles.

14. An electrophoretic display element according to claim 13 further comprising a plurality of third particles having a second optical characteristic different from the first optical characteristic and an electrophoretic mobility of opposite polarity to the electrophoretic mobility of the first particles.

15. An electrophoretic display element according to claim 13 wherein the fluid is colored.

16. An electrophoretic display element according to claim 13 wherein the fluid is gaseous.

17. An electrophoretic display element according to claim 13 wherein the second particles are substantially spherical.

18. An electrophoretic display element according to claim 13 wherein the second particles are formed from silica, a metal or a polymer.

19. An electrophoretic display element according to claim 13 wherein the second particles occupy at least about 25 percent by volume of the droplet.

20. An electrophoretic display element according to claim 19 wherein the second particles occupy at least about 35 percent by volume of the droplet.

21. An electrophoretic display comprising a plurality of electrophoretic display elements according to claim 13 and electrode means for applying electric fields to each display element.

22. An electrophoretic medium comprising a fluid; a plurality of a first type of particle having a first optical characteristic and a charge of one polarity; and a plurality of a second type of particle having a second optical characteristic different from the first optical characteristic and a charge of the opposite polarity, the first and second types of particles being dispersed in the fluid, the electrophoretic medium displaying essentially zero conductivity on application of an electric field below a threshold, and a non-zero conductivity on application of an electric field above the threshold.

23. An electrophoretic medium according to claim 22 wherein the first and second types of particles bear polymer coatings.

24. A method of varying the optical state of an electrophoretic medium, the medium comprising a fluid; a plurality of a first type of particle having a first optical characteristic and a charge of one polarity; and a plurality of a second type of particle having a second optical characteristic different from the first optical characteristic and a charge of the opposite polarity, the first and second types of particles being dispersed in the fluid, the electrophoretic medium exhibiting a non-linear response to an applied electric field, the method comprising applying to the electrophoretic medium in an initial optical state a first drive pulse having a first voltage and a first duration and thereafter applying to the electrophoretic medium a second drive pulse having a second voltage and a second duration such that the algebraic sum of the impulses applied by the two drive pulses is zero, thereby driving the electrophoretic to a final optical state different from the initial optical state.

* * * * *